United States Patent
Nomura et al.

(10) Patent No.: US 9,635,264 B2
(45) Date of Patent: *Apr. 25, 2017

(54) IMAGING APPARATUS

(71) Applicant: HOYA CORPORATION, Tokyo (JP)

(72) Inventors: Hiroshi Nomura, Saitama (JP); Shinya Suzuka, Saitama (JP); Takahiro Morinaga, Tokyo (JP); Toshiki Nakamura, Tokyo (JP); Eijiroh Tada, Saitama (JP)

(73) Assignee: HOYA CORPORATION, Tokyo (JP)

( * ) Notice: Subject to any disclaimer, the term of this patent is extended or adjusted under 35 U.S.C. 154(b) by 57 days.

This patent is subject to a terminal disclaimer.

(21) Appl. No.: 14/607,558

(22) Filed: Jan. 28, 2015

(65) Prior Publication Data

US 2015/0215541 A1  Jul. 30, 2015

(30) Foreign Application Priority Data

Jan. 30, 2014  (JP) .................................. 2014-015885

(51) Int. Cl.
*H04N 5/232* (2006.01)
*H04N 5/225* (2006.01)

(52) U.S. Cl.
CPC ....... *H04N 5/23287* (2013.01); *H04N 5/2254* (2013.01)

(58) Field of Classification Search
CPC .. H04N 5/23287; G02B 13/005; G02B 7/023; G02B 13/0065; G02B 27/646
See application file for complete search history.

(56) References Cited

U.S. PATENT DOCUMENTS 7,411,731 B2  8/2008  Ohtake et al.
8,238,736 B2  8/2012  Tsuruta et al.
(Continued)

FOREIGN PATENT DOCUMENTS

JP  09-251127  9/1997
JP  2006-166202  6/2006
(Continued)

OTHER PUBLICATIONS

U.S. Appl. No. 14/607,628 to Hiroshi Nomura et al., filed Jan. 28, 2015.
(Continued)

*Primary Examiner* — Christopher K Peterson
(74) *Attorney, Agent, or Firm* — Greenblum & Bernstein, P.L.C.

(57) ABSTRACT

An imaging apparatus includes a front lens group having a front lens element and a reflector, in that order from an object side. The reflector includes a reflection surface which reflects light rays, from the front lens element, toward a different direction; a rear lens group positioned closer to an image plane than the front lens group, the imaging apparatus performs an image-stabilizing operation by driving the front lens element, a movable frame holding the front lens element; a support member supporting the reflector and is immovable relative to an optical axis of the front lens element, in a reference state; and a support mechanism which supports the movable frame to spherically swing about a spherical-swinging center, positioned on an extension of the optical axis of the front lens element extending behind an underside of the reflection surface of the reflector.

25 Claims, 39 Drawing Sheets

(56) References Cited

U.S. PATENT DOCUMENTS

| | | | |
|---|---|---|---|
| 9,338,357 B2 * | 5/2016 | Nomura | H04N 5/23287 |
| 2006/0127073 A1 | 6/2006 | Yasuda | |
| 2006/0268431 A1 | 11/2006 | Jin | |
| 2008/0266404 A1 | 10/2008 | Sato | |
| 2010/0202766 A1 | 8/2010 | Takizawa et al. | |
| 2011/0181740 A1 | 7/2011 | Watanabe et al. | |
| 2011/0317282 A1 * | 12/2011 | Kimura | G02B 13/04 |
| | | | 359/716 |
| 2013/0278785 A1 * | 10/2013 | Nomura | H04N 5/23287 |
| | | | 348/208.11 |
| 2014/0119717 A1 | 5/2014 | Yasuda | |

FOREIGN PATENT DOCUMENTS

| | | |
|---|---|---|
| JP | 2006-259247 | 9/2006 |
| JP | 2006-330439 | 12/2006 |
| JP | 2007-228005 | 9/2007 |
| JP | 2008-268700 | 11/2008 |
| JP | 2009-086319 | 4/2009 |
| JP | 2010-128384 | 6/2010 |
| JP | 2010-204341 | 9/2010 |
| JP | 4717529 B2 | 4/2011 |
| JP | 4789655 B2 | 7/2011 |
| JP | 2013-238848 | 11/2013 |

OTHER PUBLICATIONS

U.S. Appl. No. 14/607,689 to Hiroshi Nomura et al., filed Jan. 28, 2015.

* cited by examiner

EXAMPLE 3

IMAGING APPARATUS

BACKGROUND OF THE INVENTION

1. Field of the Invention

The present invention relates to an imaging apparatus equipped with an image-stabilizing (image shake correction/shake reduction) system.

2. Description of the Related Art

In recent years, mobile electronic devices which are designed mainly for taking still/moving photographic images, such as digital cameras (still-video cameras) and digital camcorders (motion-video cameras), and other mobile electronic devices which are designed to be capable of taking such photographic images as a subsidiary function, such as mobile phones equipped with a camera and smart devices (smart phones or tablet computers, etc.) equipped with a camera, have become widespread, and there has been a demand to miniaturize the imaging units incorporated in these types of mobile electronic devices. In order to miniaturize an imaging unit, it is known in the art to construct an optical system of an imaging unit as a bending optical system which reflects (bends) light rays using a reflection surface of a reflector element such as a prism or a mirror. Using a bending optical system in an imaging unit makes it possible to achieve a reduction in thickness of the imaging unit, especially in the direction of travel of the incident light emanating from an object to be photographed.

In addition, there also has been a tendency for demand to equip imaging units with a so-called image-stabilizing (image shake correction/shake reduction) system that is designed to reduce image shake on the image plane that is caused by vibrations such as hand shake. The following four different types of imaging units are known in the art as imaging units using a bending optical system which are equipped with an image-stabilizing system: a first type (disclosed in Japanese Unexamined Patent Publication Nos. 2009-86319 and 2008-268700) in which an image sensor is moved in directions orthogonal to an optical axis to reduce image shake, a second type (disclosed in Japanese Unexamined Patent Publication No. 2010-128384 and Japanese Patent No. 4,789,655) in which a lens (image-stabilizing lens/image-stabilizing optical element) disposed behind a reflector element (on the image plane side) that has a reflection surface is moved in directions orthogonal to an optical axis to reduce image shake, a third type (disclosed in Japanese Unexamined Patent Publication Nos. 2007-228005, 2010-204341, 2006-330439, and Japanese Patent No. 4,717,529) in which the angle of a reflector element (a reflection surface thereof) and the angle of a lens adjacent to the reflector element are changed to reduce image shake, and a fourth type (disclosed in Japanese Unexamined Patent Publication Nos. 2006-166202 and 2006-259247) in which the entire imaging unit is obliquely moved to reduce image shake.

The applicant of the present invention has proposed an image-stabilizing system which only moves a front lens element(s) of a front lens group along a plane orthogonal to the optical axis of the front lens element(s) to reduce image shake in an imaging apparatus which contains a bending optical system, wherein the front lens group includes a reflector element and the aforementioned front lens element(s) that is positioned on the object side of the reflector element, and the front lens group is disposed on the object side in the entire optical system of the imaging apparatus (disclosed in Japanese Unexamined Patent Publication No. 2013-238848).

In Japanese Unexamined Patent Publication No. H09-251127, in a lens system having a straight optical axis, not a bending optical system, it is disclosed that the first lens element, which is positioned closest to the object side, or the second lens element, which is subsequently positioned behind the first lens element, is rotated (swung) about a rotational center on an optical axis to perform an image-stabilizing operation Bearing in mind that, in addition to still image photography, moving image photography is now commonly used in imaging apparatuses, there has been a need for further improvement in the image-stabilizing capability in imaging apparatuses. However, movements of an optical element to reduce image shake (image-stabilizing optical element) exert an adverse influence on the optical performance such as aberrations, and a space corresponding to the moving amount of the optical element is required. Accordingly, when attempts are made to improve the image-stabilizing capability, consideration is required to prevent, as much as possible, these conditions (namely, further miniaturization of the image-stabilizing system and minimalization of any reduction in the optical performance due to the image-stabilizing operation) from being impaired. In the first type of image-stabilizing system, a substrate which is connected to the image sensor moves while following the image sensor; accordingly, the peripheral electrical components, in addition to the image sensor, need to be designed so as to be compatible with such movements, so that the image-stabilizing system tends to be complicated in structure and high in production cost. In addition, although the periphery of the imaging surface of the image sensor needs to have a dust-resistant structure, it is difficult to secure a sufficient space which allows the image sensor to perform an image-stabilizing operation while maintaining a dust-resistant structure within a small imaging unit intended to be incorporated in a cellular phone or a smart device.

In the second type of image-stabilizing system, the moving direction of the image-stabilizing lens during an image-stabilizing operation corresponds to the thickness direction of the imaging unit (the forward/rearward direction with the direction toward an object to be photographed set to correspond to the forward direction), so that a problem occurs with it being difficult to incorporate the image-stabilizing system into the thin imaging unit because the internal space thereof is limited. Conversely, if this type of image-stabilizing system is used, reduction in thickness of the imaging unit becomes limited. A similar problem exists in the type of image-stabilizing system which moves an image sensor, not a lens element, in the thickness direction of the imaging unit.

In the third type of image-stabilizing system, a large space is required to obliquely move the reflector element and the lens adjacent to the reflector element relative to each other, which easily increases the size of the imaging unit. In the fourth type of image-stabilizing system, in which the entire imaging unit is obliquely moved, the increase in size of the image-stabilizing system unavoidable.

In the image-stabilizing system disclosed in Japanese Unexamined Patent Publication No. 2013-238848, the effect of miniaturizing (slimming) the imaging apparatus in a direction along the optical axis of the front lens element is obtained by making the front lens element of the front lens group, which is positioned in front of the reflector element, move in a plane orthogonal to the optical axis of the front lens element. However, in recent years, it has been desired to achieve, up to a high level, both miniaturization and improvement in image-stabilizing performance of the imaging apparatus equipped with an image-stabilizing system.

In the image-stabilizing system disclosed in Japanese Unexamined Patent Publication No. H09-251127, the conceptual rotational centers of the first lens element and the second lens element are set on an optical axis (optical path); however, to achieve this optical configuration, it is required to arrange the rotational supporters for the first lens element and the second lens element at positions deviating from the optical path so as not to cut off light rays traveling in the optical path, which makes it difficult to achieve a small and compact design of the image-stabilizing system.

SUMMARY OF THE INVENTION

Accordingly, the present invention provides an imaging apparatus equipped with an image-stabilizing system which is small in size (especially slim in the forward/rearward direction with the direction toward an object to be photographed set to correspond to the forward direction) and superior in image-stabilizing capability.

According to an aspect of the preset invention, an imaging apparatus is provided, including a front lens group which constitutes part of an imaging optical system of the imaging apparatus and includes at least one front lens element and a reflector, in that order from an object side, wherein the reflector includes a reflection surface which reflects light rays, exiting from the front lens element, toward a different direction, and wherein the imaging apparatus performs an image-stabilizing operation by driving the front lens element in response to vibrations applied to the imaging optical system in order to reduce image shake on the image plane; at least one rear lens group which constitutes another part of the imaging optical system and is positioned closer to an image plane than the front lens group; a movable frame which holds the front lens element; a support member which supports at least the reflector and is immovable relative to an optical axis of the front lens element in a reference state in which the imaging apparatus does not drive the front lens element when the image-stabilizing operation is not performed; and a support mechanism which supports the movable frame in a manner to allow the movable frame to spherically swing along an imaginary spherical surface about a spherical-swinging center which is positioned on an extension of the optical axis, of the front lens element, extending behind an underside of the reflection surface of the reflector.

It is desirable for a surface closest to the image side of the front lens element to include a concave surface.

In addition, it is desirable for a surface closest to the object side of the front lens element to be smaller in refractive power than that of a surface closest to the image side of the front lens element.

The sign (+/−) of each symbol in each condition below is defined with respect to the direction toward the image side from the object side being determined as positive (+).

It is desirable for the following condition (1) to be satisfied as an optical condition:

$$-0.6<(SC-R2)/f1<0.4, \quad (1)$$

wherein R2 designates the radius of curvature of the surface closest to the image side of the front lens element, SC designates the distance along the optical axis from the surface closest to the image side of the front lens element to the spherical-swinging center, and f1 designates the focal length of the front lens element. By satisfying condition (1), an effective image-stabilizing effect can be obtained by suppressing aberration fluctuations while achieving miniaturization of the imaging apparatus in the direction of the optical axis of the front lens element.

It is desirable for the following condition (2) to be further satisfied as an optical condition:

$$SF<-0.5, \quad (2)$$

wherein $SF=(R2+R1)/(R2-R1)$,

R1 designates the radius of curvature the surface closet to the object side of the front lens element. By satisfying condition (2), it is possible to suppress fluctuations in aberrations when the movable frame spherically swings about the spherical-swinging center.

The present invention does not specify the structure of the front lens element; a single lens element, a cemented lens or a plurality of lens element can be used as the front lens element. The configuration of the front lens element being a single lens element is advantageous for miniaturization and reduction in weight of the moving parts which are moved when an image-stabilizing operation is performed. In addition, a prism or a mirror can be used as the reflector.

It is desirable for the imaging apparatus to include an image sensor which receives the light rays that are passed through the imaging optical system, and a housing which is immovable relative to the optical axis of the front lens element in the reference state; the image sensor is fixedly mounted to the housing.

It is possible to position the second reflector at a position closer to the image side than the rear lens group, the second reflector including a reflection surface which reflects the light rays, which are passed through the rear lens group, toward a different direction.

It is desirable for the support mechanism to make a projecting portion, which is formed on one of the movable frame and the support member, abut against a contacting portion formed on the other of the movable frame and the support member, and for the support mechanism to make the movable frame spherically swing about the spherical-swinging center by obliquely moving the projecting portion relative to the contacting portion. In this case, it is advisable for the contacting portion to include a recess in which the projecting portion is engaged. Alternatively, it is desirable for the contacting portion to include a flat surface with which an end of the projecting portion is in contact.

It is desirable for the extension of the optical axis, of the front lens element, to extends through part of the support mechanism.

It is desirable for the support mechanism to include a pair of recessed portions, each having a hemispherical inner surface which are respectively formed on the movable frame and the support member to face each other; and a spherical guide member which is installed between the pair of recessed portions. The support mechanism makes the movable frame spherically swing about the spherical-swinging center by the hemispherical inner surfaces of the pair of recessed portions being sliding contact with the spherical guide member.

It is desirable for the support mechanism to include an intermediate member which supports the movable frame in a manner to allow the movable frame to spherically swing about a first axis, and is supported to be allowed to swing relative to the support member about a second axis orthogonal to the first axis. The support mechanism makes the movable frame spherically swing about the spherical-swinging center by making the movable frame and the intermediate member swing about the first axis and the second axis, respectively.

It is desirable for the support mechanism to include a spherical-swinging support portion provided on the support member, and a supported portion which is formed on the movable frame and abuts against the spherical-swinging support portion. The movable frame includes a pressed surface which is formed as a spherical surface that is centered about the spherical-swinging center, the pressed surface positioned rearwardly from the underside of the reflection surface of the reflector with respect to a direction along the optical axis of the front lens element. The imaging apparatus includes a biaser which is supported by the support member and is provided with a pressing portion, which abuts against the pressed surface of the movable frame, the biaser applying a biasing force against the movable member to cause the supported portion to abut against the spherical-swinging support portion via the pressing portion and the pressed surface.

It is desirable for the pressed surface of the movable frame to include a convex spherical surface facing toward the object side in a direction along the optical axis of the front lens element. The biaser biases the movable frame by pressing the pressed surface in a direction that is opposite to the direction toward the object side along the optical axis of the front lens element.

It is desirable for the biaser to include a mount which is mounted onto the support member at a position that is offset, from the optical axis of the front lens element, in a direction that is opposite to the light-ray traveling direction after light rays are reflected by the reflection surface of the reflector.

It is desirable for the biaser to include a mount which is mounted onto the support member at a position that is offset, from a second optical axis along which light rays travel toward the rear lens group after being reflected by the reflection surface of the reflector, toward the object side in a direction along the optical axis of the front lens element.

It is desirable for the biaser to include a leaf spring which is provided with a mount which is mounted onto the support member, and an elastically deformable portion. The elastically deformable portion projects from the mount, to be elastically deformable relative thereto, the pressing portion being provided on a free end of the elastically deformable portion. The pressing portion abuts against the pressed surface of the movable frame by elastically deforming the elastically deformable portion.

It is desirable for the pressed surface, of the movable frame, to be formed on an end portion of a support portion, which is formed into a cantilever projecting from a lens holding portion, which holds the front lens element.

It is desirable for the movable frame to be provided with a frame-shaped lens holding portion, which supports the front lens element, and a support portion which projects from the lens holding portion and is supported on the support member to spherically swing about the spherical-swinging center. The support portion includes a pair of first projecting portions which are provided at different positions in a circumferential direction centered about the optical axis of the front lens element, project from the lens holding portion toward a direction that is opposite to the direction toward the object side along the optical axis of the front lens element, and respectively pass along opposite sides of the reflector; a connecting portion which connects common end portions of the pair of first projecting portions; and a second projecting portion provided on the connecting portion, projects therefrom in a direction that intersects with a projecting direction of the pair of first projection portions, and is inserted at a position that is rearward from the underside of the reflection surface of the reflector to be supported by the support member. The pair of first projection portions is provided at a position that is offset, from the optical axis of the front lens element, in a direction that is opposite to the light-ray traveling direction after light rays are reflected by the reflection surface of the reflector.

It is desirable for the second projecting portion to project in a direction that is orthogonal to the optical axis of the front lens element.

It is desirable for the imaging apparatus to include an actuator which applies a driving force to the movable frame to spherically swing the movable frame about the spherical-swinging center in response to vibrations applied to the imaging optical system. The movable frame includes a pair of actuator support portions which project from the lens holding portion at different positions, with respect to a circumferential direction centered about the optical axis of the front lens element, and respectively support actuator components of the actuator. The pair of first projection portions are provided at circumferential positions that are further apart than the circumferential positions of the pair of actuator support portions.

It is desirable for the reflector to include a prism, the prism including, in addition to the reflection surface, an incident surface which faces toward the front lens element, an exit surface which faces toward the rear lens group, and a pair of side surfaces which connect the incident surface, the exit surface and the reflection surface. The pair of first projection portions are respectively positioned on either side of the pair of side surfaces of the prism. Part of the prism enters into an opening that is defined by the pair of first projection portions and the connecting portion.

According to the present invention, an imaging apparatus equipped with an image-stabilizing system which is slim in the forward/rearward direction (with the direction toward an object to be photographed set to correspond to the forward direction) and superior in image-stabilizing capability is obtained due to the structure in which the front lens element, which is an element of the front lens group that constitutes a bending optical system and positioned in front of the reflector element, is made to spherically swing about the spherical-swinging center to perform an image-stabilizing operation. Since the center of the spherical motion is set at a position on an extension of the optical axis, of the front lens element, which extends away from the back side of a reflection surface of the reflector element, the support mechanism for the movable frame that holds the front lens element can be constructed in a space-efficient manner.

The present disclosure relates to subject matter contained in Japanese Patent Application No. 2014-15885 (filed on Jan. 30, 2014) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
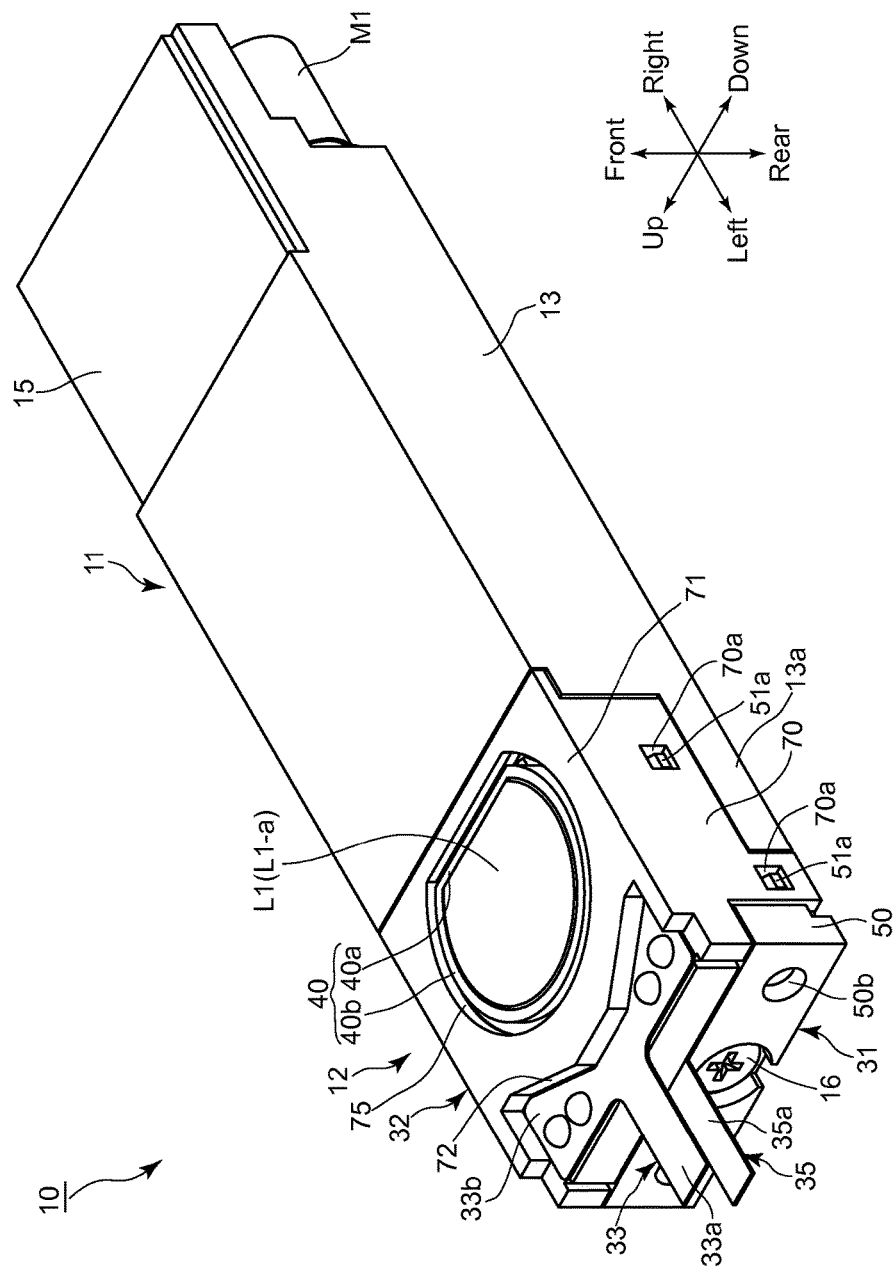
FIG. 1 is a perspective view of a first embodiment of an imaging unit (imaging apparatus) according to the present invention.
Figure 2:
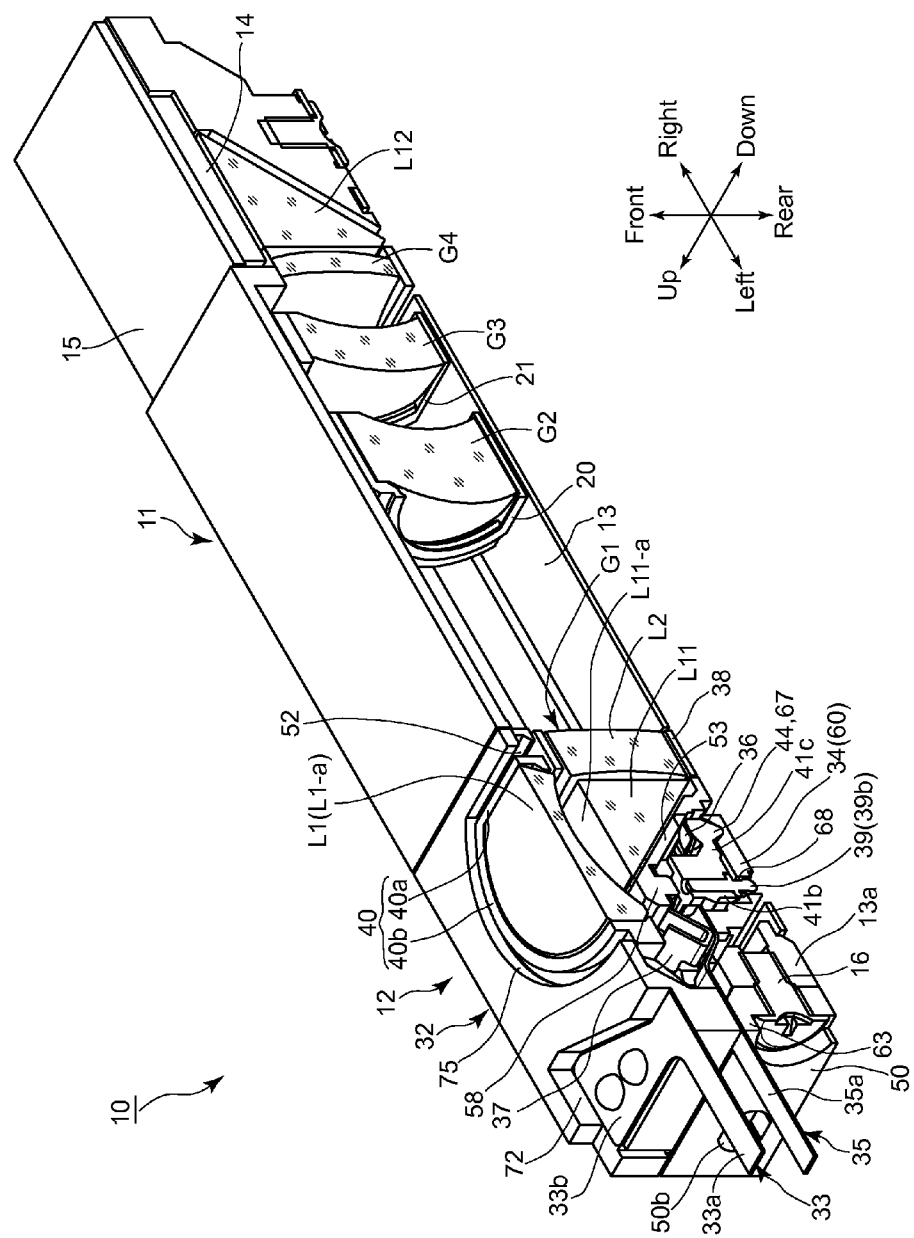
FIG. 2 is a perspective cut view of the imaging unit shown in FIG. 1, cut along a plane including the first optical axis, the second optical axis and the third optical axis of the imaging optical system provided in the imaging unit.

An embodiment (first embodiment) of an imaging unit (imaging apparatus) 10 according to the present invention will be discussed below with reference to FIGS. 1 through 21. In the following descriptions, forward and rearward directions, leftward and rightward directions, and upward and downward directions are determined with reference to the directions of the double-headed arrows shown in the drawings. The object side corresponds to the front side. As shown by the outward appearance of the imaging unit 10 in FIG. 1, the imaging unit 10 has a laterally elongated shape which is slim in the forward/rearward direction and elongated in the leftward/rightward direction.

As shown in FIGS. 2, 4, 6 and 7, an imaging optical system of the imaging unit 10 is provided with a first lens group (front lens group) G1, a second lens group (rear lens group) G2, a third lens group (rear lens group) G3 and a fourth lens group (rear lens group) G4. The first lens group G1 is provided with a first prism (reflector element) L11, and the imaging unit 10 is provided, on the right-hand side (image plane side) of the fourth lens group G4, with a second prism (second reflector element) L12. The imaging optical system of the imaging unit 10 is configured as a bending optical system which reflects (bends) light rays at substantially right angles at each of the first prism L11 and the second prism L12. As shown in FIGS. 2, 4, 6 through 8, 13 and 16 through 18, the first lens group G1 is configured of a first lens element (at least one front lens element of the front lens group) L1, the first prism L11 and a second lens element L2. The first lens element L1 is positioned in front of (on the object side of) an incident surface L11-$a$ of the first prism L11, while the second lens element L2 is positioned on the right-hand side (image plane side) of an exit surface L11-$b$ of the first prism L11. In the illustrated embodiments, the first lens element L1 is a single lens element which is disposed so that an incident surface L1-$a$ thereof faces toward the object side and so that an exit surface L1-$b$ thereof faces toward the incident surface L11-$a$ of the first prism L11. Each of the second lens group G2, the third lens group G3 and the fourth lens group G4 is a lens group including no reflector element such as a prism.

Figure 7:
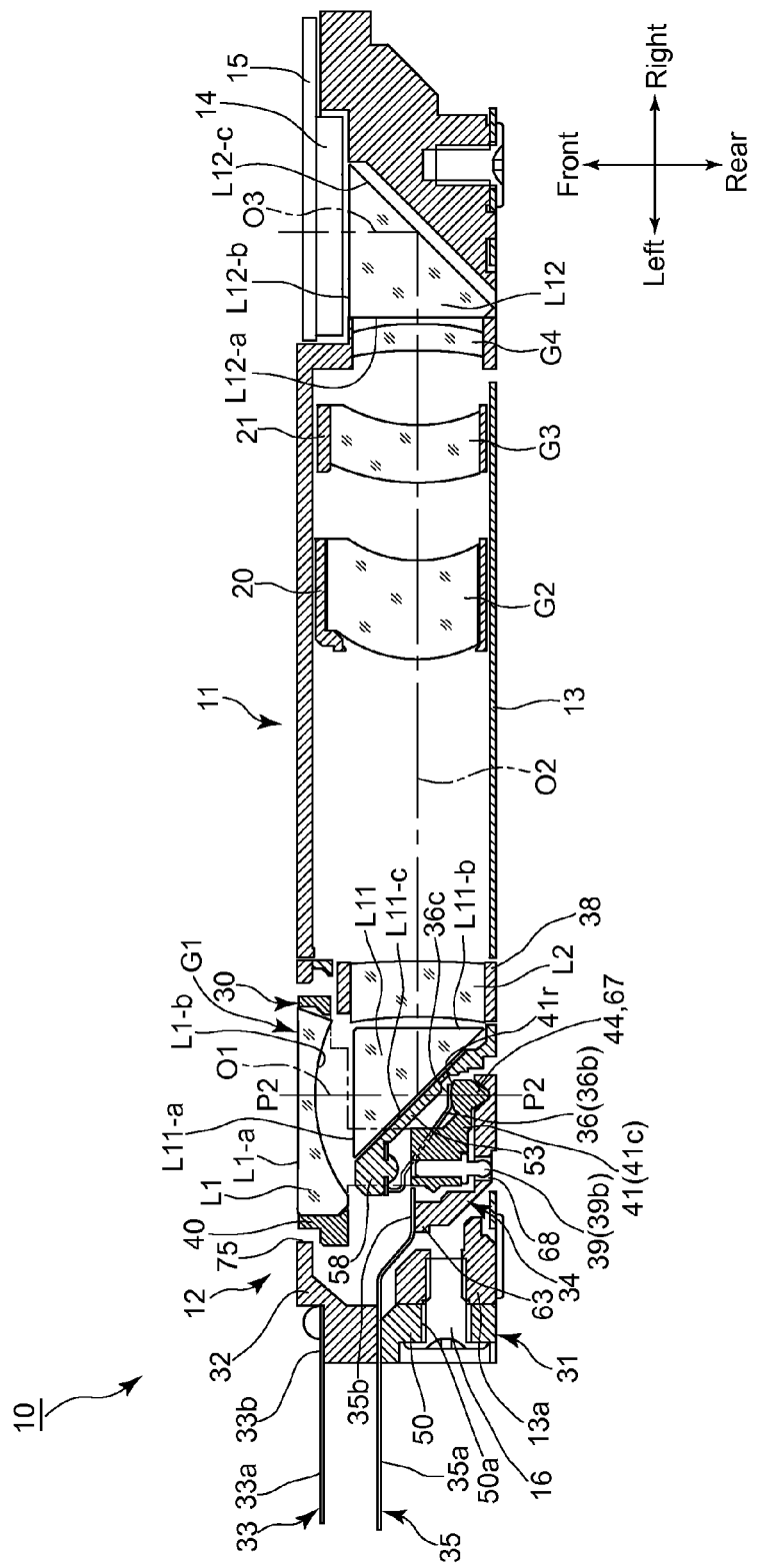
FIG. 7 is a transverse sectional view of the imaging unit, taken along a plane including the first optical axis, the second optical axis and the third optical axis.

As shown in FIG. 7, light rays emanated from the photographic object and incident on the first lens element L1 along a first optical axis O1 extending in the rearward direction from the front of the imaging unit 10 enter the first prism L11 through the incident surface L11-$a$ and are reflected by a reflection surface L11-$c$ of the first prism L11 in a direction along a second optical axis O2 (extending from left to right) to exit from the exit surface L11-$b$ of the first prism L11. Subsequently, the light rays exiting from the exit surface L11-$b$ pass through the second lens element L2 of the first lens group G1 and the second through fourth lens groups G2, G3 and G4, which lie on the second optical axis O2, and are incident on the second prism L12 through an incident surface L12-$a$ thereof. Subsequently, the light rays which are passed through the incident surface L12-$a$ are reflected by a reflection surface L12-$c$ of the second prism L12 in a direction along a third optical axis O3 (extending forwardly) and are incident on the imaging surface of an image sensor (image pickup device) 14 to form an object image thereon. The first optical axis O1 and the third optical axis O3 are substantially parallel to each other and lie, together with the second optical axis O2, on a common plane. The imaging unit 10 has a shape elongated in a direction along the second optical axis O2, and the first lens group G1 is positioned in the vicinity of an end (the left end) of the imaging unit 10 in the lengthwise direction thereof.

Figure 12:
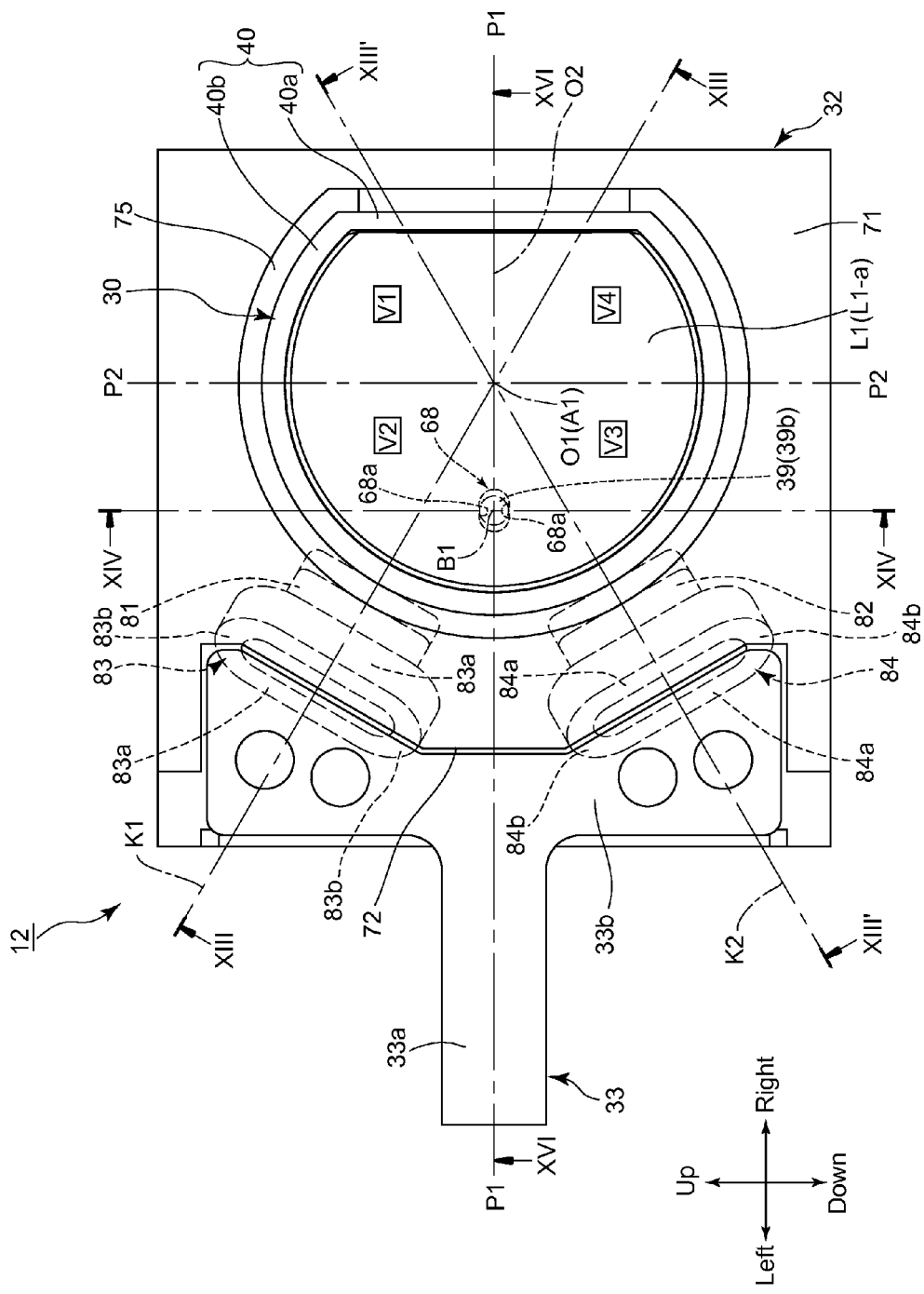
FIG. 12 is a front elevational view of the first lens-group unit, viewed from the object side.

An imaginary plane on which the first optical axis O1, the second optical axis O2 and the third optical axis O3 lie is represented by a reference plane (first reference plane) P1 (see FIGS. 10, 12, 14 and 15). An imaginary plane which is orthogonal to the first reference plane P1 and on which the first optical axis O1 lies is represented by a reference plane (second reference plane) P2 (see FIGS. 7, 10, 12 and 16 through 18). In addition, when four quadrants V1, V2, V3 and V4, divided from each other by the first reference plane P1 and the second reference plane P2, are determined with respect to a front view as shown in FIG. 12, the first quadrant V1 and the fourth quadrant V4 are positioned on the side of the second reference plane P2 (the right side of the second reference plane P2) toward the light-ray traveling direction along the second optical axis O2 upon the light rays being reflected by the first prism L11, while the second quadrant V2 and the third quadrant V3 are positioned on the opposite side (the left side of the second reference plane P2) of the second reference plane P2 from the first quadrant V1 and the fourth quadrant V4.

Figure 5:
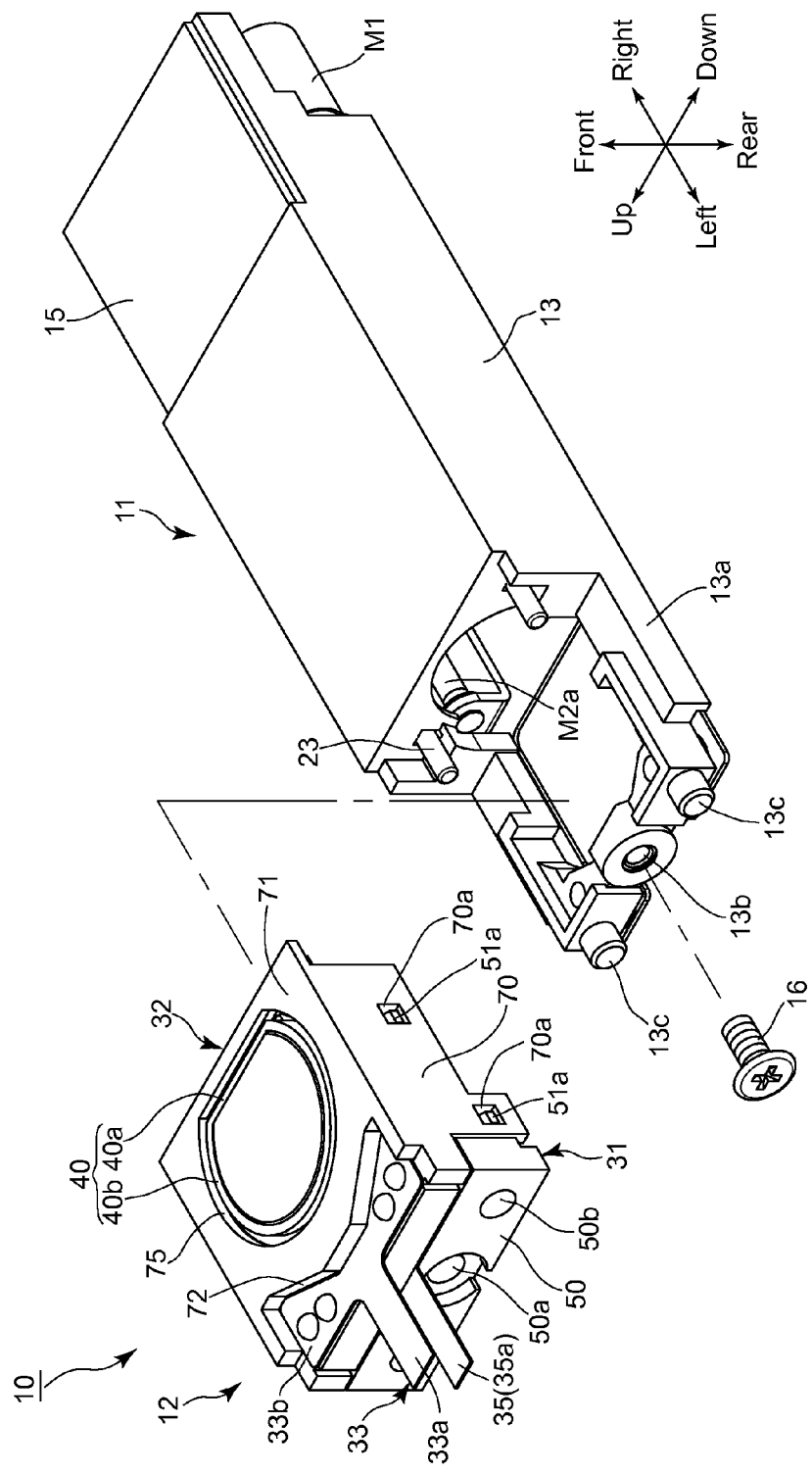
FIG. 5 is an exploded perspective view of the imaging unit, illustrating a state where a body module and a first lens-group unit, which are components of the imaging unit, are separated from each other.
Figure 6:
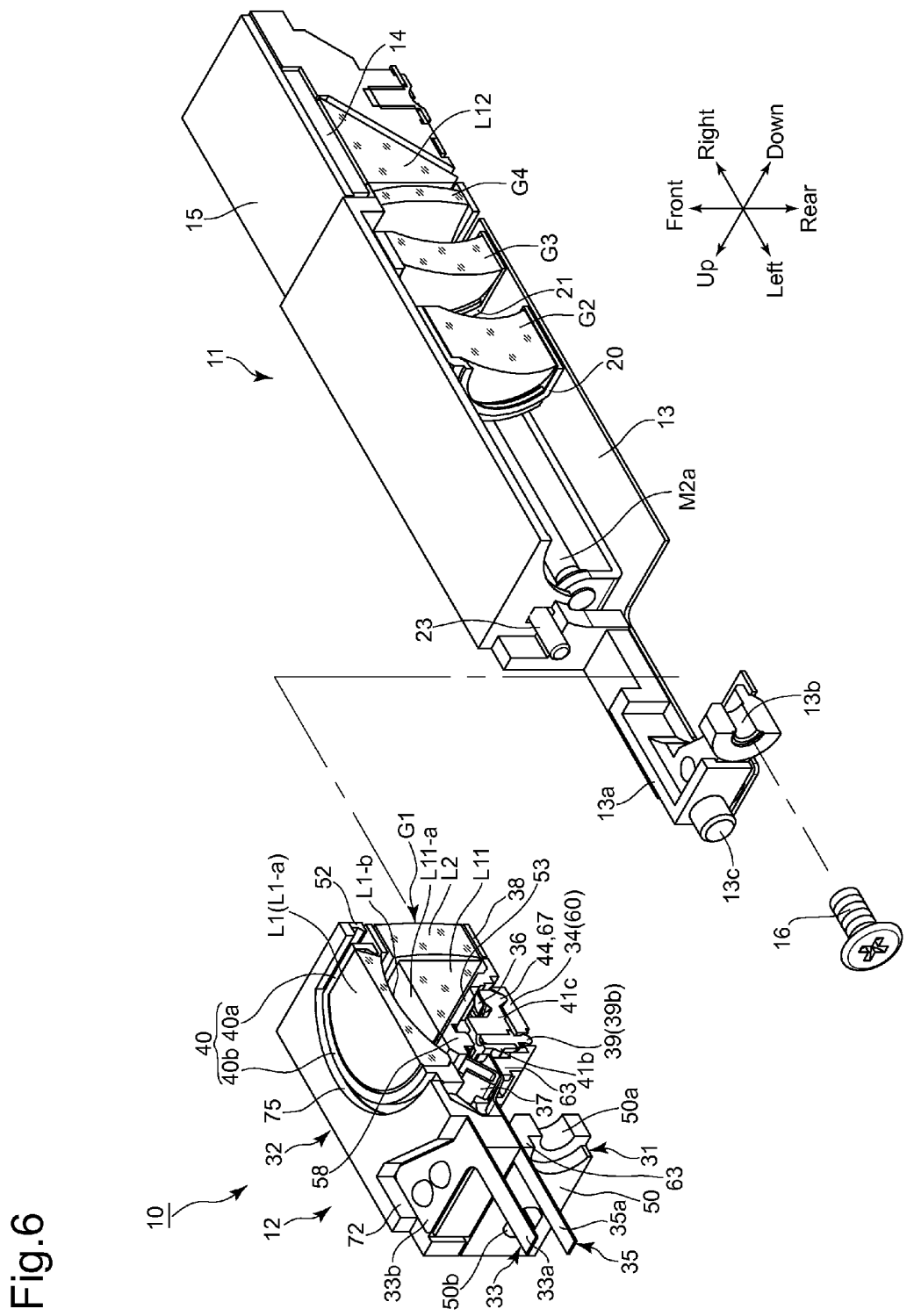
FIG. 6 is an exploded perspective cut view of the imaging unit shown in FIG. 5, illustrating a state where the body module and the first lens-group unit are separated from each other and cut along a plane including the first optical axis, the second optical axis and the third optical axis.

As shown in FIGS. 5 and 6, the imaging unit 10 is provided with a body module 11 which holds the second lens group G2, the third lens group G3, the fourth lens group G4, the second prism L12 and the image sensor (image pickup device) 14, and a first lens-group unit 12 which holds the first lens group G1. The body module 11 is provided with a box-shaped housing 13 which is elongated in the leftward/rightward direction and has a small thickness (slim) in the forward/rearward direction. The first lens-group unit 12 is fixed to one end (the left end), with respect to the lengthwise direction, of the housing 13, and the fourth lens group G4 and the second prism L12 are fixedly held at the other end (the right end), with respect to the lengthwise direction, of the housing 13. The image sensor 14, which is positioned immediately in front of the second prism L12, is fixedly mounted to an image sensor substrate 15 which is fixed to the housing 13.

Figure 3:
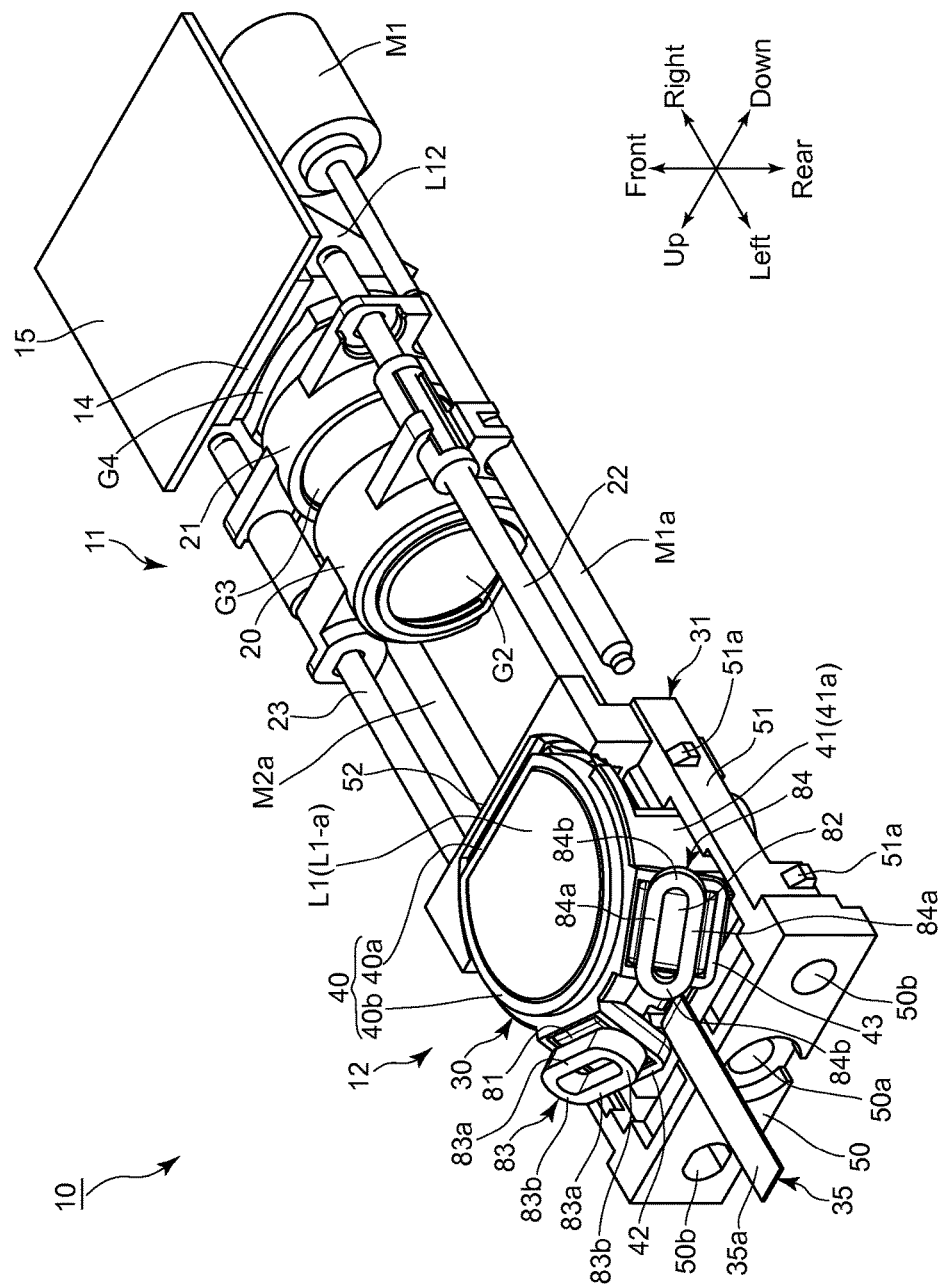
FIG. 3 is a perspective view of the imaging unit with the housing removed, illustrating the internal structure thereof.
Figure 4:
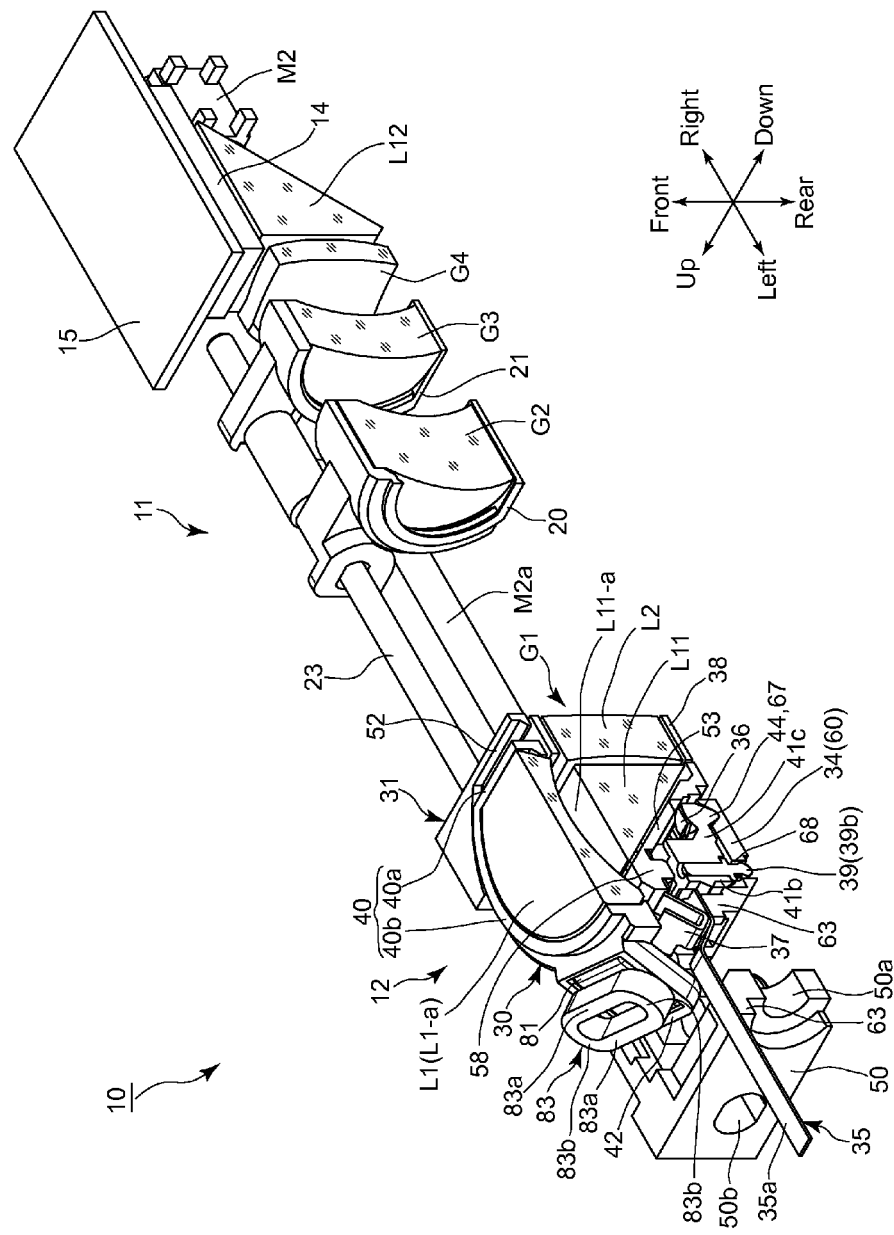
FIG. 4 is a perspective cut view of the internal structure of the imaging unit shown in FIG. 3, cut along a plane including the first optical axis, the second optical axis and the third optical axis.

As shown in FIGS. 3 and 4, the second lens group G2 and the third lens group G3 are held by a second lens group frame 20 and a third lens group frame 21, respectively, which are supported to be movable along the second optical axis O2 by a pair of rods 22 and 23 provided in the housing 13. The imaging unit 10 is provided with a first motor M1 (see FIGS. 1, 3 and 5) and a second motor M2 (see FIG. 4) that are supported by the housing 13. When the first motor M1 is driven to rotate a screw shaft M1$a$ thereof which projects from the body of the first motor M1, this rotation is transmitted to the second lens group frame 20 to move the second lens group frame 20 along the pair of rods 22 and 23. When the second motor M2 is driven to rotate a screw shaft M2$a$ thereof which projects from the body of the second motor M2, this rotation is transmitted to the third lens group frame 21 to move the third lens group frame 21 along the pair of rods 22 and 23. The imaging optical system of the imaging unit 10 is a zoom lens system (variable-focal length lens system), and a zooming operation (power-varying operation) is performed by moving the second lens group G2 and the third lens group G3 along the second optical axis O2. In addition, a focusing operation is performed by moving the third lens group G3 along the second optical axis O2.

The imaging unit 10 is provided with an image-stabilizing (image shake correction/shake reduction) system that reduces image shake on an image plane which is caused by vibrations such as hand shake. This image-stabilizing system causes the first lens element L1 of the first lens group G1 to spherically swing along an imaginary spherical surface about a spherical-swinging center A1 (see FIGS. 13 and 16 through 18) which is positioned on a straight line extended from the first optical axis O1. This swinging operation of the first lens element L1 along the imaginary spherical surface about the spherical-swinging center A1 will be hereinafter referred to as the spherical swinging operation. The first optical axis O1 in the drawings of the present embodiment denotes the position of the first optical axis O1 in a state where the first lens element L1 is positioned at an initial optical-design position of the first lens element L1 when no image shake correction operation is performed (i.e., at the center of the driving range thereof in the spherical swinging operation by the image-stabilizing system). This state will be hereinafter referred to as the image-stabilizing initial state.

Additionally, a third reference plane P3 which passes through the spherical-swinging center A1 and is orthogonal to the first optical axis O1 is shown in FIGS. 13 through 18.

The incident surface L1-*a* and the exit surface L1-*b* of the first lens element L1 face toward the object side and the first prism L11, respectively, and the first lens element L1 has a D-cut shape that is formed (defined) with a portion of the outer edge (circular edge with its center on the first optical axis O1) of the first lens element L1 which is positioned in the first quadrant V1 and the fourth quadrant V4 cut out along a plane extending in the upward/downward direction (i.e., the edge of the cut-out portion appears as a straight line that is substantially orthogonal the second optical axis O2 when viewed from the front side (from the object side)) as shown in FIG. 12. Specific conditions for the shape of the first lens element L1 will be discussed in detail later.

Figure 8:
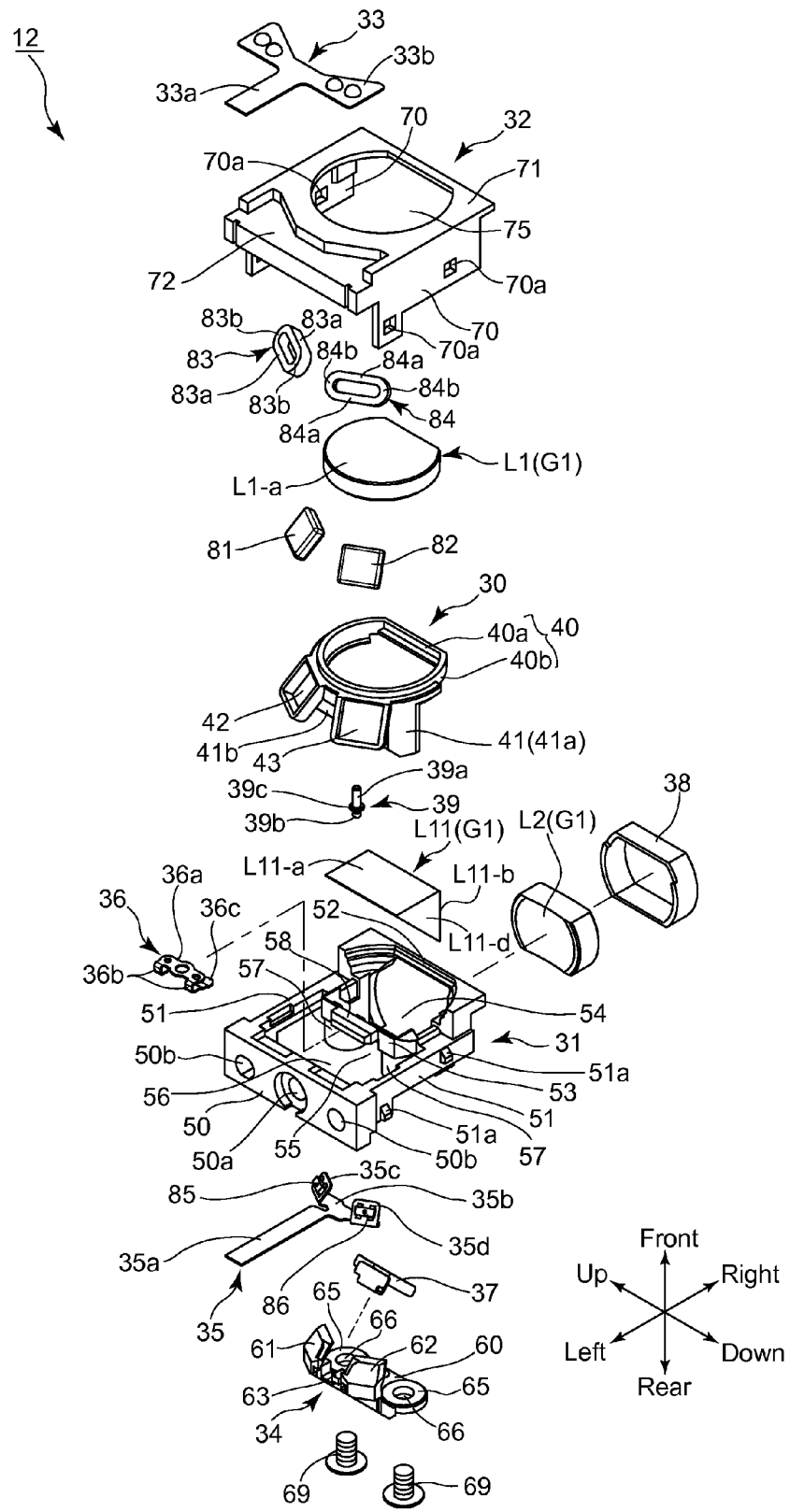
FIG. 8 is an exploded perspective view of the first lens-group unit of the imaging unit.

As shown in FIG. 8, the first lens-group unit 12 is provided with a first lens frame (movable frame) 30 which holds the first lens element L1, a base member (support member) 31 which holds the first prism L11, and a cover member 32 which covers the first lens frame 30 and the base member 31 from the front. The first lens-group unit 12 is further provided with a coil connecting board 33, a sensor holder (support member) 34, a sensor support board 35, a leaf spring (biaser) 36, a sensor fixing plate 37, a second lens frame 38 which holds the second lens element L2, and a pivot guide 39. In addition, the first lens-group unit 12 is provided with a pair of permanent magnets (actuator components) 81 and 82 and a pair of coils 83 and 84 which constitute an electromagnetic actuator for driving the first lens frame 30 (the first lens element L1), and is further provided with a pair of Hall sensors 85 and 86 for detecting the position of the first lens frame 30 (the first lens element L1) that is controlled by the electromagnetic actuator.

Each of the permanent magnets 81 and 82 is in the shape of a rectangular thin plate. The permanent magnets 81 and 82 are substantially identical in shape and size to each other. The coil 83 is an air-core coil which includes a pair of linear portions 83*a* that are substantially parallel to each other and a pair of curved (U-shaped) portions 83*b* which connect the pair of linear portions 83*a* at the respective ends thereof. Likewise, the coil 84 is an air-core coil which includes a pair of linear portions 84*a* that are substantially parallel to each other and a pair of curved (U-shaped) portions 84*b* which connect the pair of linear portions 84*a* at the respective ends thereof. The coils 83 and 84 are substantially identical in shape and size to each other.

The first lens frame 30 is provided with a lens holding portion 40, a support portion 41 and a pair of magnet holding portions (actuator support portions) 42 and 43. The lens holding portion 40 is in the shape of a lens frame, and the first lens element L1 is fixedly fitted into the lens holding portion 40. The support portion 41 extends rearward from the lens holding portion 40, and the pair of magnet holding portions 42 and 43 are connected to the outer periphery of the lens holding portion 40. A portion of the outer edge of the lens holding portion 40 which is positioned in the first quadrant V1 and the fourth quadrant V4 is cut out along a plane parallel to the second reference plane P2 to be formed into a linear-cut portion 40*a* to correspond in outer profile of the first lens element L1. The other portion of the outer edge of the lens holding portion 40 is formed into a circular frame portion 40*b*, so that the lens holding portion 40 is in the shape of an imperfect circular frame.

Figure 13:
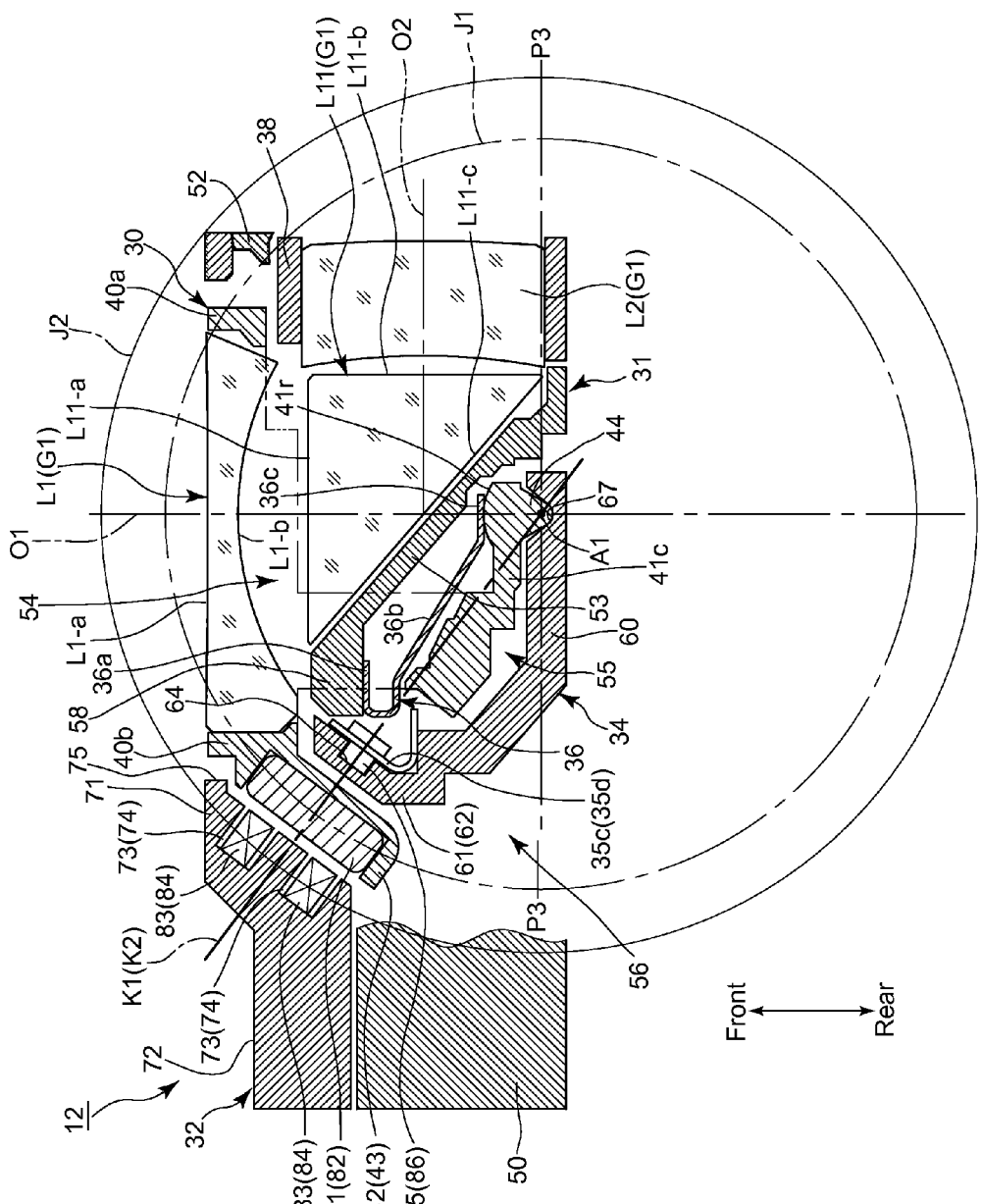
FIG. 13 is a sectional view of the first lens-group unit, taken along the line XIII-XIII shown in FIG. 12.
Figure 14:
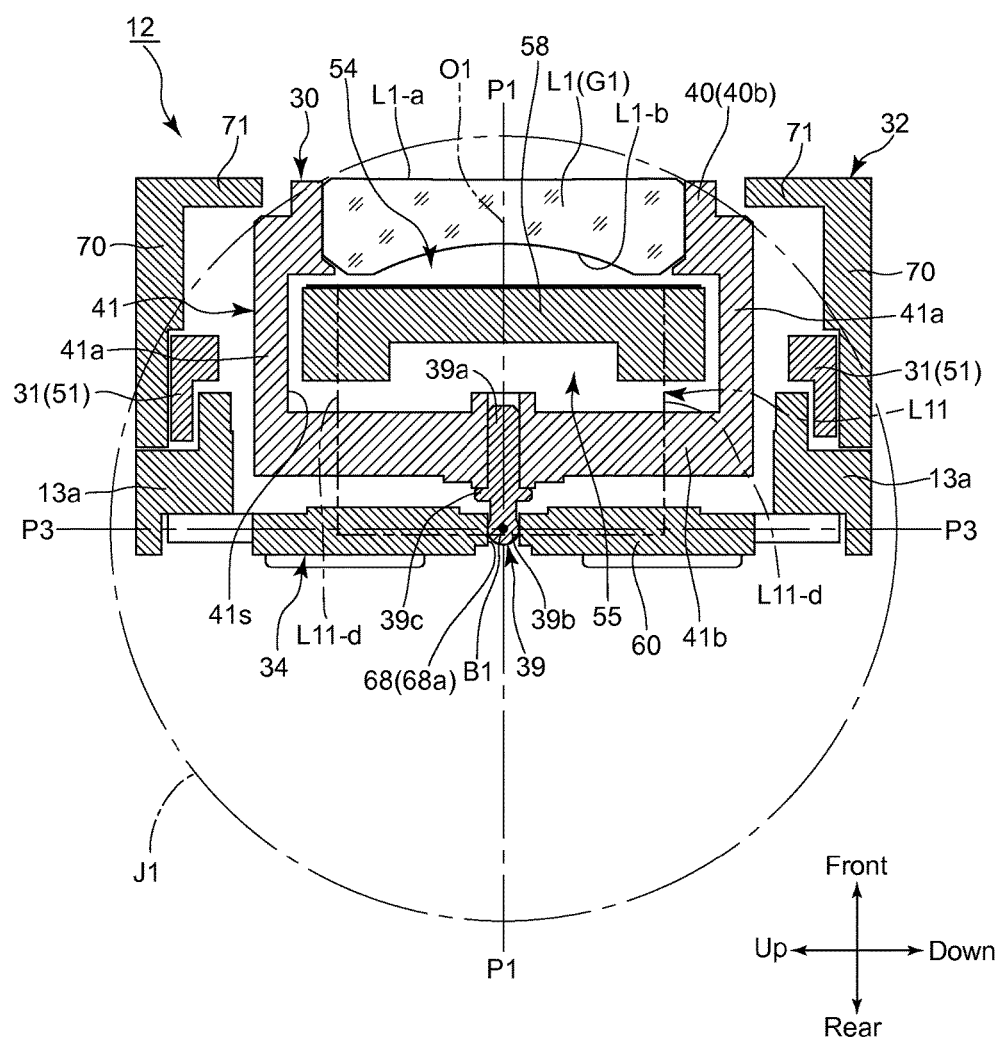
FIG. 14 is a sectional view of the first lens-group unit, taken along the line XIV-XIV shown in FIG. 12.
Figure 15:
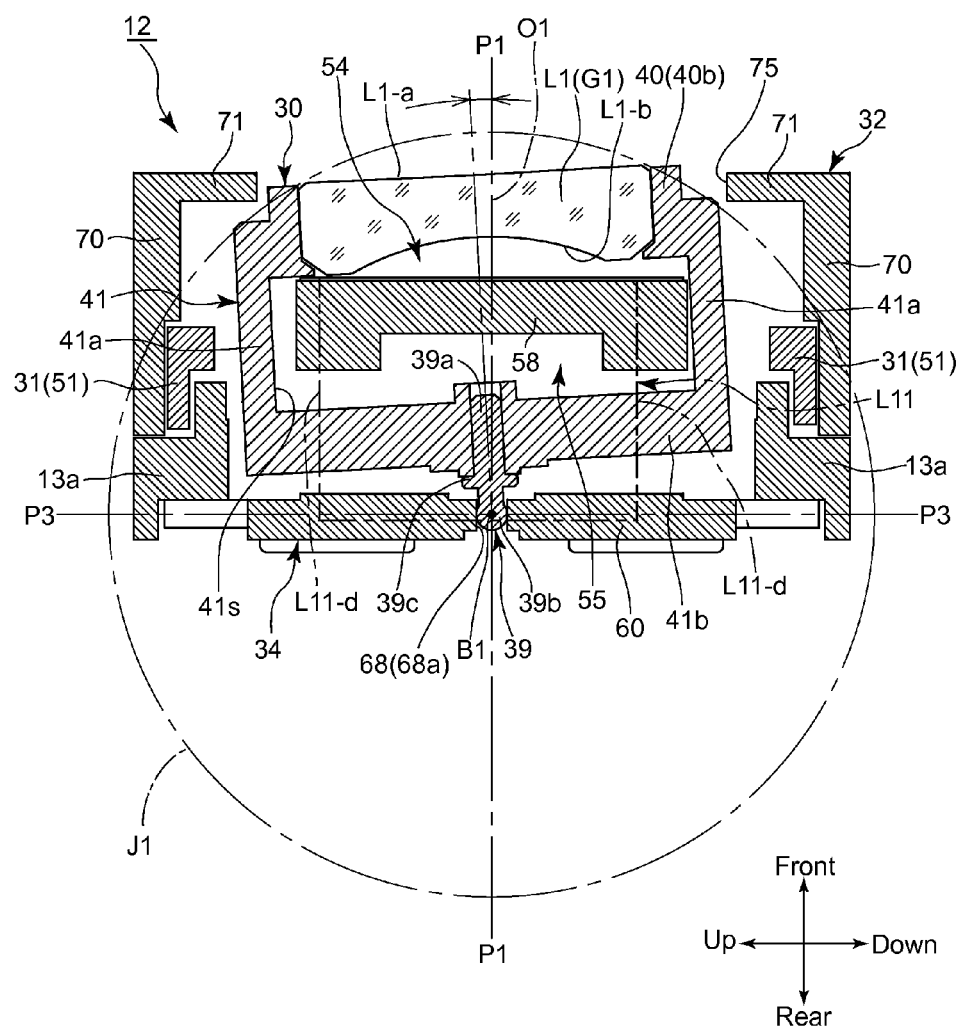
FIG. 15 is a sectional view of the first lens-group unit, taken along the line XIV-XIV shown in FIG. 12 in a state where the first lens frame has been made to swing about the spherical-swinging center of the first lens frame.
Figure 16:
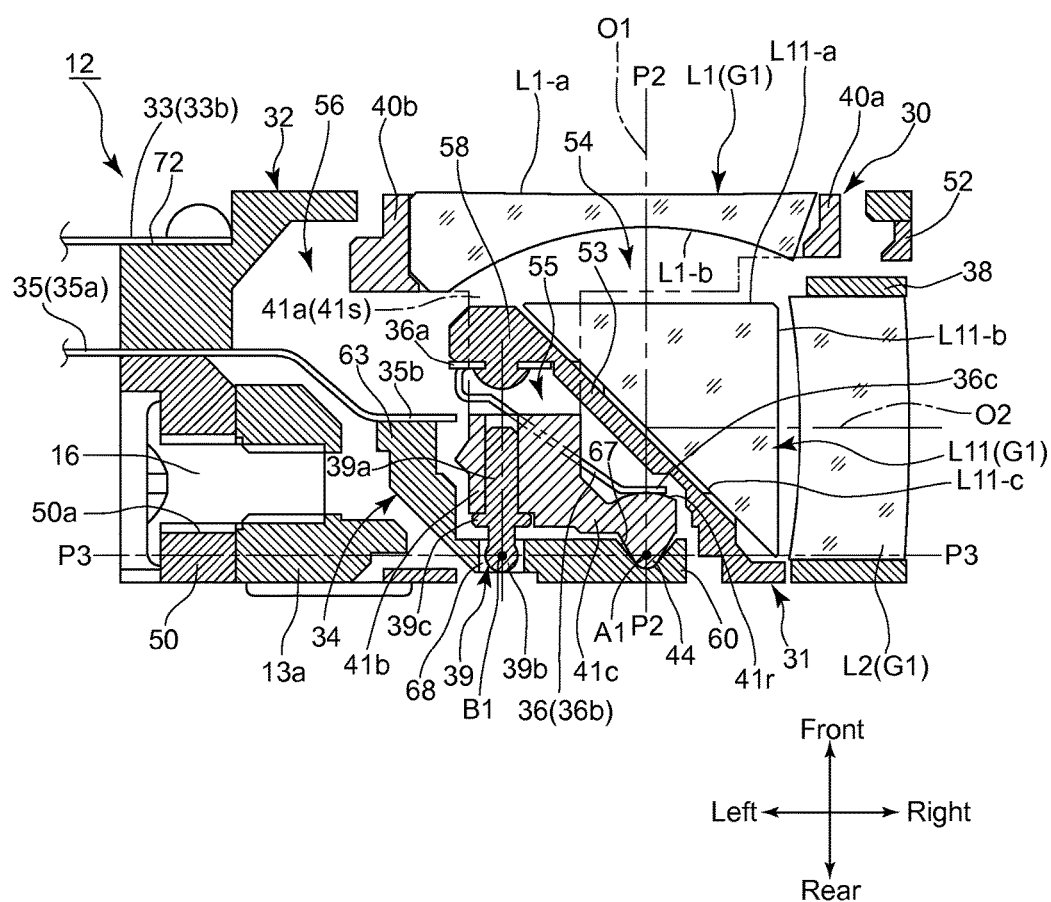
FIG. 16 is a sectional view of the first lens-group unit, taken along the line XVI-XVI shown in FIG. 12.
Figure 17:
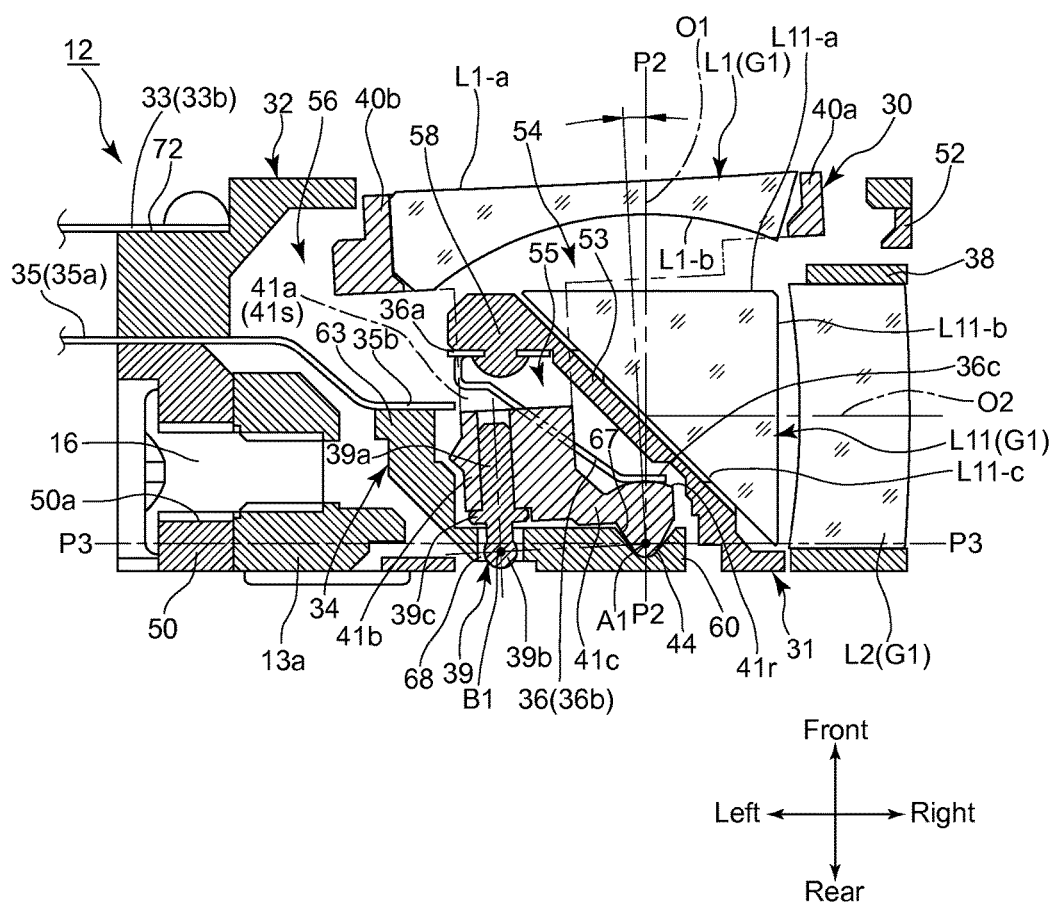
FIG. 17 is a sectional view of the first lens-group unit, taken along the line XVI-XVI shown in FIG. 12 in a state where the first lens frame has been made to swing about the spherical swinging center.
Figure 18:
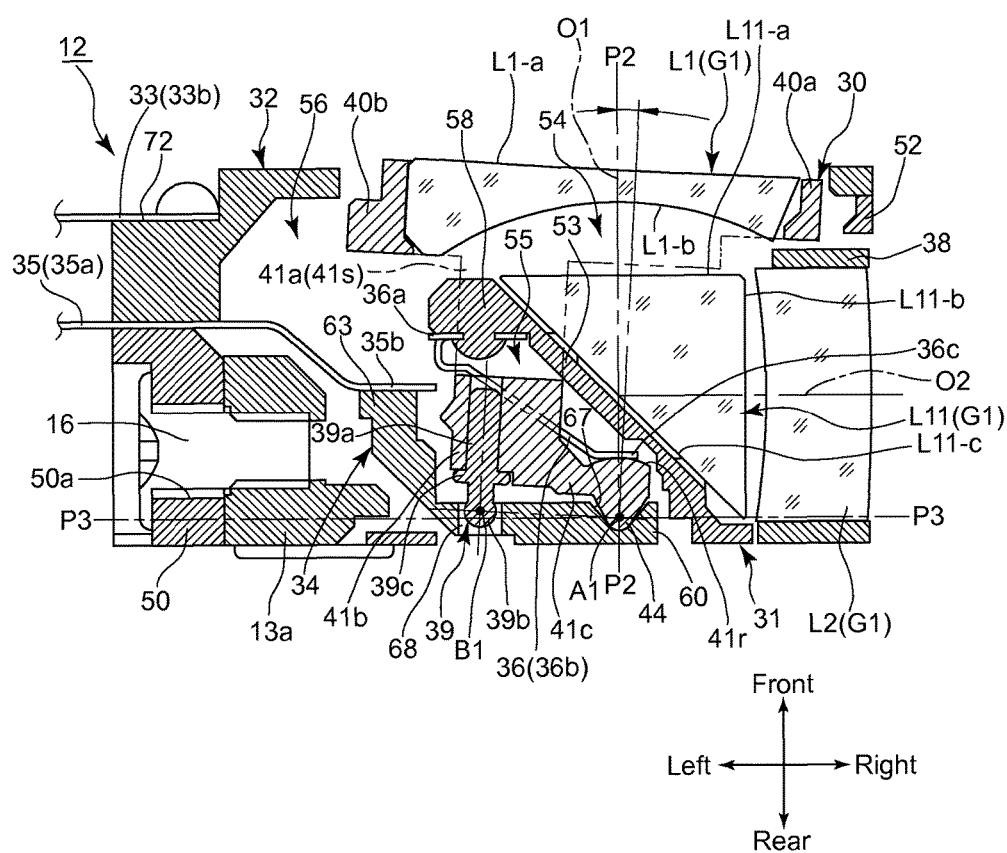
FIG. 18 is a sectional view of the first lens-group unit, taken along the line XVI-XVI shown in FIG. 12 in a state where the first lens frame has been made to swing about the spherical swinging center in the opposite direction from the direction in the case of FIG. 17.

As shown in FIGS. 14 and 15, the support portion 41 of the first lens frame 30 is provided with a pair of leg portions (first projecting portions) 41*a* which are spaced from each other in the upward/downward direction (in a circumferential direction about the first optical axis O1) and a connecting portion 41*b* which extends in the upward/downward direction. The pair of leg portions 41*a* project rearward from the circular frame portion 40*b* of the lens holding portion 40, and the rear ends of the pair of leg portions 41*a* are connected via the connecting portion 41*b* (see FIG. 14). An opening 41*s* (see FIGS. 14 and 15), extending in the leftward/rightward direction, is formed through an inner side of a frame shape defined by the lens holding portion 40, the pair of leg portions 41*a* and the connecting portion 41*b*. As shown in FIGS. 16 through 18, the pair of leg portions 41*a* and the connecting portion 41*b* are positioned on the opposite side of the second reference plane P2 (the left side of the second reference plane P2) from the side on which the second optical axis O2 extends, and a cantilever pivot arm (second projecting portion) 41*c* projects from the connecting portion 41*b* in a direction to approach the second reference plane P2 (the first optical axis O1). A pivot projection (projecting portion/supported portion) 44 is formed at the free end of the pivot arm 41*c*. As shown in FIGS. 11, 13 and 16 through 18, the pivot projection 44 is conical in shape which tapers in the rearward direction, i.e., reducing in diameter in the rearward direction, and the end of the pivot projection 44 is shaped into a smooth spherical ball (spherical tip). As shown in FIGS. 7, 11, 13 and 16 through 18, the pivot arm 41*c* is further provided with a pressed surface 41*r* which faces forwardly in an opposite direction to the projecting direction of the pivot projection 44. The pressed surface 41*r* is formed as a forwardly-facing convex spherical surface. The center of an imaginary spherical surface that includes the pressed surface 41*r* is coincident with the spherical-swinging center A1.

The pivot guide 39 is provided at the end (rear end) of a columnar base 39*a* thereof with a spherical guide projection 39*b* and is provided with a flange 39*c*, which is greater in diameter than the guide projection 39*b*, between the base 39*a* and the guide projection 39*b*. As shown in FIGS. 11 and 14 through 18, the base 39*a* of the pivot guide 39 is inserted into a hole from behind, which is formed in the connecting portion 41*b* of the support portion 41 of the first lens frame 30, and the flange 39*c* is made to contact the connecting portion 41*b* to thereby define the inserted position of the base 39*a* relative to the connecting portion 41*b* (the support portion 41). In this state, the guide projection 39*b* projects rearward from the support portion 41.

As shown in FIG. 13, the pair of magnet holding portions 42 and 43 of the first lens frame 30 are formed to project obliquely rearward from the circular frame portion 40*b* to be inclined so that the distance from the first optical axis O1 to each of the magnet holding portions 42 and 43 increases with respect to a the direction toward the outer ends of the magnet holding portions 42 and 43 (i.e., in a direction away from the circular frame portion 40*b*). Although FIG. 13 shows a cross section taken along the line XIII-XIII shown in FIG. 12 that passes through the permanent magnet 81 and the coil 83, the structure taken along the line XIII'-XIII' shown in FIG. 12 that passes through the permanent magnet 82 and the coil 84 is similar to that taken along the line XIII-XIII shown in FIG. 12, and accordingly, the elements shown in FIG. 13 which appear only in the cross section taken along the line XIII'-XIII' shown in FIG. 12 are represented by parenthesized reference numerals shown in FIG. 13. In a state where the first lens frame 30 is in the image-stabilizing initial state, in which the first lens element L1 is positioned at the center of the driving range thereof by the image-stabilizing system (i.e., at an initial optical-design position of the first lens element L1 when no image shake correction operation is performed), the magnet holding portions 42 and 43 are positioned in the second quadrant V2 and the third quadrant V3 to be substantially symmetrical with respect to the first reference plane P1 (see FIG. 12). The permanent magnet 81 is fitted into and held by a recess formed in the magnet holding portion 42, and the permanent magnet 82 is fitted into and held by a recess formed in the magnet holding portion 43.

The base member 31 is a frame-like member which is substantially rectangular in outer shape as viewed from front. The base member 31 is provided with a pair of side walls 51 which are spaced from each other in the upward/downward direction and project rightward from a mounting portion 50, which constitutes the left end portion of the base member 31. The base member 31 is further provided with a front bridging portion 52, which connects the front sides of the right ends of the pair of side walls 51, and a prism holding wall 53 which connects middle portions of the pair of side walls 51. As shown in FIGS. 11, 13 and 16 through 18, the prism holding wall 53 has a shape extending along the reflection surface L11-c of the first prism L11 and constitutes an inclined wall which projects progressively forward in the direction from the right end side of the first lens-group unit 12, on which the second lens element L2 is positioned, to the left end side of the first lens-group unit 12, on which the mounting portion 50 is provided. As shown in FIGS. 13 through 18, in the base member 31, an optical path space 54 is formed in front of the prism holding wall 53, and a rear space 55 is formed behind the prism holding wall 53. In addition, a side space 56 which is communicatively connected with the rear space 55 is formed between the mounting portion 50 and the prism holding wall 53. The optical path space 54 is open at the front side and the right end side of the base member 31 with the front bridging portion 52 as a border.

The first prism L11 is fixedly fitted into the optical path space 54 of the base member 31. The first prism L11 is provided with the reflection surface L11-c which is positioned at an angle of substantially 45 degrees with respect to the incident surface L11-a and the exit surface L11-b, and a pair of side surfaces L11-d (only one of which is shown in FIG. 8, and is shown as a single-dot chain line in FIG. 14) which are substantially orthogonal to both the incident surface L11-a and the exit surface L11-b. The position of the first prism L11 in the optical path space 54 is defined by the back side (underside) of the reflection surface L11-c being held by the prism holding wall 53 and by the pair of side surfaces L11-d being sandwiched between the pair of side walls 51. In this supported state of the first prism L11, the incident surface L11-a is positioned on the first optical axis O1 and faces forward, and the exit surface L11-b is positioned on the second optical axis O2 and faces rightward. Additionally, the second lens frame 38 that holds the second lens element L2 is fixedly installed in the optical path space 54 of the base member 31 to be positioned on the right-hand side of the first prism L11 (behind the front bridging portion 52).

The base member 31 is provided, in the rear of the prism holding wall 53, with a pair of cylindrical support seats 57 (see FIG. 8) which are formed as mounts for the sensor holder 34 at different positions in the upward/downward directions. A screw hole (not shown) which opens at the rear is formed in each support seat 57. The base member 31 is further provided at the left end of the prism holding wall 53 with a spring support 58 which serves as a mount to which the leaf spring 36 is mounted.

As shown in FIGS. 13 and 16 through 18, the leaf spring 36 is arranged behind and along the prism holding wall 53 of the base member 31. The leaf spring 36 is provided with a mounting plate (mount) 36a in which a through-hole is formed and a resilient arm (elastically deformable portion) 36b which is formed into a cantilever extending from the mounting plate 36a. The leaf spring 36 is supported by the base member 31 by fitting the through-hole of the mounting plate 36a onto a projection formed on the spring support 58. In this supported state of the leaf spring 36, the resilient arm 36b can be resiliently deformed in the rear space 55 that is formed behind the prism holding wall 53. As shown in FIGS. 7, 8, 11, 13 and 16 through 18, a flat pressing portion 36c is formed at the free end of the resilient arm 36b. In a state where the leaf spring 36 is supported on the base member 31, the pressing portion 36c is located at a position on an extension of the first optical axis O1, and the rearward facing surface of the pressing portion 36c is substantially orthogonal to the first optical axis O1.

Figure 9:
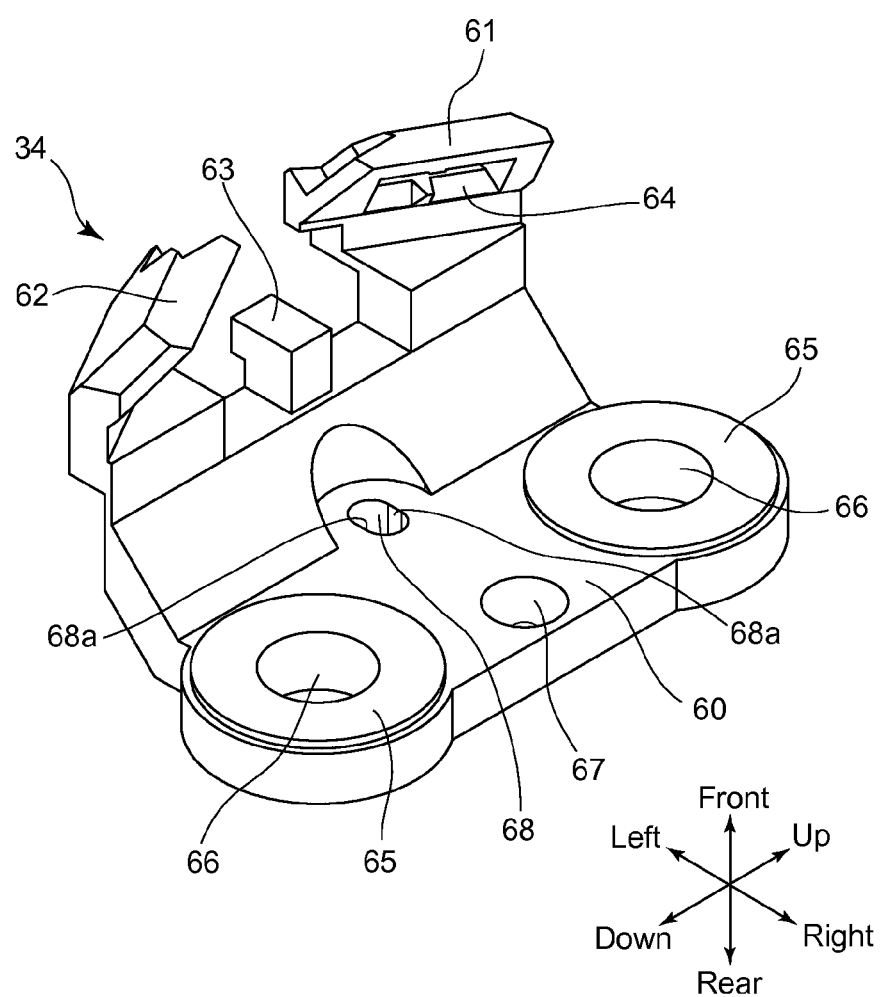
FIG. 9 is a perspective view of a sensor holder shown in FIG. 8 that constitutes an element of the first lens-group unit.
Figure 10:
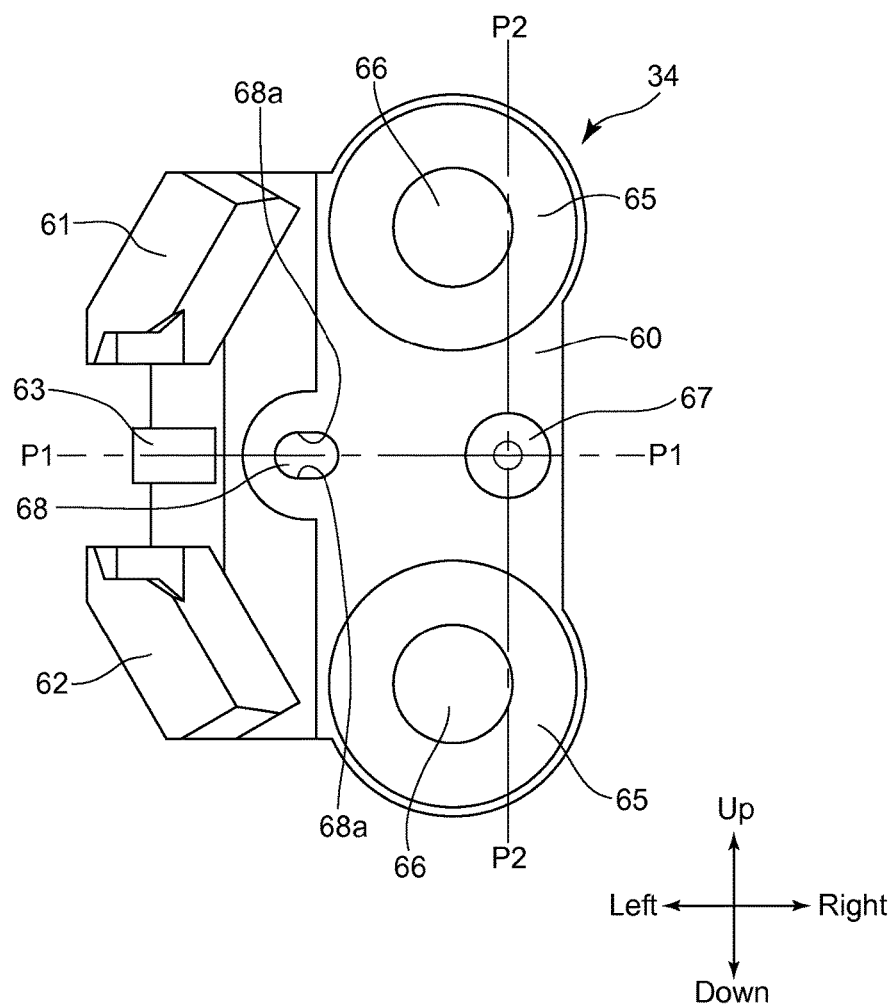
FIG. 10 is a front elevational view of the sensor holder, viewed from the object side.
Figure 11:
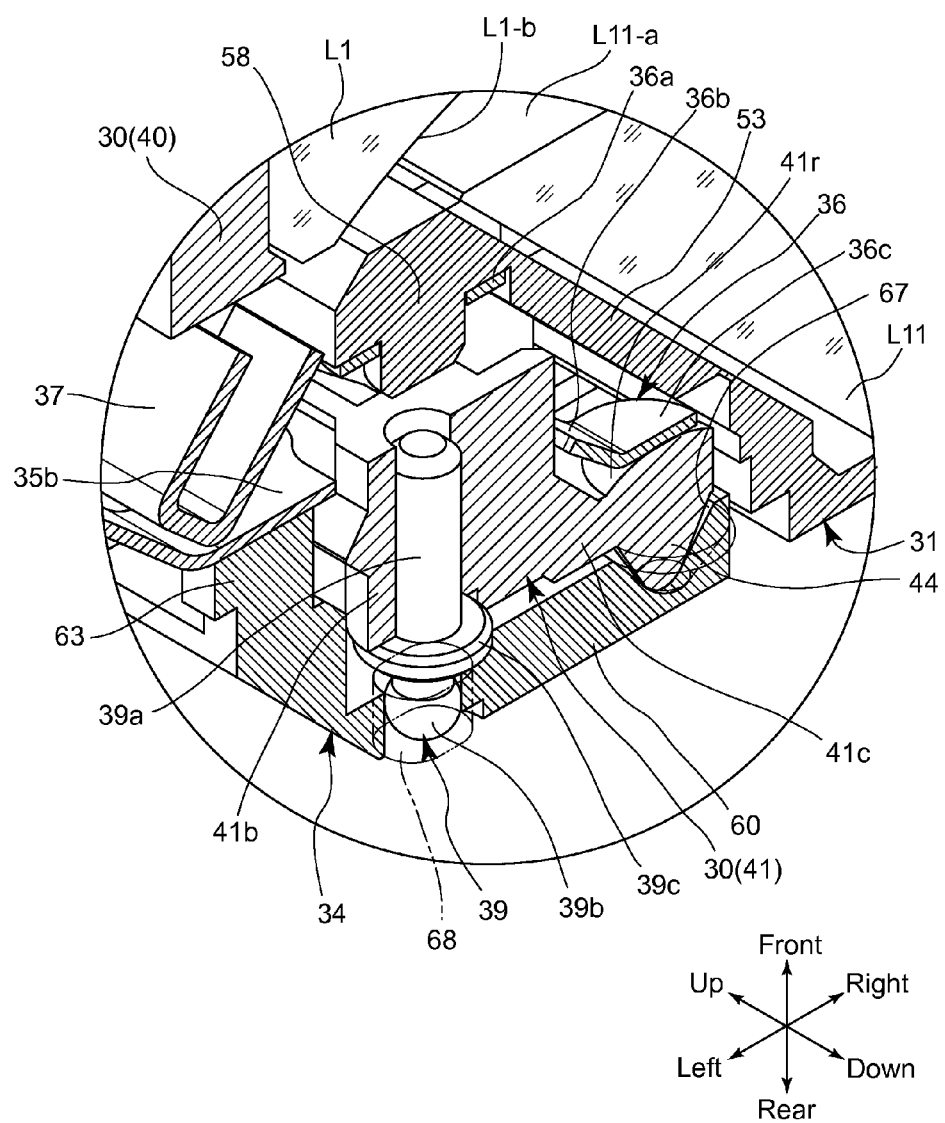
FIG. 11 is a perspective sectional view of part of a support mechanism for the first lens element of the first lens-group unit, taken along a plane including the first optical axis and the second optical axis.

As shown in FIGS. 9 and 10, the sensor holder 34 is provided with a base plate portion 60, a pair of sensor support projections 61 and 62 and a base plate support projection 63. Each of the pair of sensor support projections 61 and 62 is formed on the base plate portion 60 to project like an upright wall, and the base plate support projection 63 projects forward from the base plate portion 60 to be positioned between the pair of sensor support projections 61 and 62. As shown in FIG. 13 that shows the assembled state of the first lens-group unit 12, the pair of sensor support projections 61 and 62 project obliquely forward from the base plate portion 60 so as to face the magnet holding portions 42 and 43 of the first lens frame 30, respectively. A sensor insertion recess 64 is formed in each of the sensor supporting projections 61 and 62. The base plate support projection 63 is formed as a small (low) projection which projects from the base plate portion 60 by a smaller amount of projection than the sensor support projections 61 and 62.

The sensor support board 35 is a flexible board and provided with, at an end of a narrow strip portion 35a thereof, a support sheet portion 35b having the shape of a thin flat plate as shown in FIG. 8. The sensor support board 35 is further provided on both sides of the strip portion 35a with a pair of sensor support lugs 35c and 35d which are formed so that the support sheet portion 35b are partly bent and raised. The Hall sensor 85 and the Hall sensor 86 are mounted to and supported by the sensor support lug 35c and the sensor support lug 35d, respectively. The sensor support board 35 is fixed to the sensor holder 34 using the sensor fixing plate 37 by making the support sheet portion 35b supported by the base plate support projection 63 (see FIGS. 7, 11 and 16 through 18) and by inserting the Hall sensors 85 and 86, which are respectively mounted on the sensor support lugs 35c and 35d, into the sensor insertion recesses 64, which are formed in the pair of sensor support projections 61 and 62 (see FIG. 13). The strip portion 35a of the sensor support board 35 is electrically connected to a control circuit (not shown) which controls the operation of the imaging unit 10 so that information on the outputs of the Hall sensors 85 and 86 is transmitted to the control circuit via the sensor support board 35.

As shown in FIGS. 9 and 10, the sensor holder 34 is provided on the base plate portion 60 with a pair of ring-shaped abutting portions 65, a pair of screw insertion holes 66, a pivot recess (contacting portion/spherical-swinging support portion) 67 and a rotation prevention hole 68. The pair of ring-shaped abutting portions 65 abut against the ends of the pair of support seats 57 of the base member 31.

The pair of screw insertion holes 66 are formed at the centers of the pair of ring-shaped abutting portions 65, respectively. The pivot recess 67 and the rotation prevention hole 68 are formed between the pair of abutting portions 65. As shown in FIGS. 9 through 11, 13 and 16 through 18, the pivot recess 67 is a recess having a mortar-shaped (conical-shaped) inner surface which allows the pivot projection 44 to fit into, and the innermost base portion of the pivot recess 67 is formed into a spherical shape which corresponds to the end shape (spherical tip) of the pivot projection 44. The rotation prevention hole 68 is an elongated hole which is elongated in a radial direction of the pivot recess 67 at a position spaced away from the axis of the pivot recess 67, and the rotation prevention hole 68 allows the guide projection 39b of the pivot guide 39 to enter therein, as will be discussed later. The width of the rotation prevention hole 68 corresponds to the diameter of the guide projection 39b, so that the rotation prevention hole 68 does not allow the guide projection 39b to move in the widthwise direction of the rotation prevention hole 68 when the guide projection 39b is in the rotation prevention hole 68. On the other hand, the length of the rotation prevention hole 68 is greater than the diameter of the guide projection 39b, so that the rotation prevention hole 68 allows the guide projection 39b to move in the lengthwise direction of the rotation prevention hole 68 when the guide projection 39b is in the rotation prevention hole 68.

With the sensor support board 35 mounted to the sensor holder 34, the sensor holder 34 is fixed to the base member 31 by inserting the pair of sensor support projections 61 and 62 into the side space 56 (see FIG. 13), making the pair of abutting portions 65 abut against the pair of support seats 57 and screwing two set screws 69 (see FIG. 8) into screw holes formed in the pair of support seats 57 through the screw insertion holes 66 of the pair of abutting portions 65. In this fixed state, the base plate portion 60 of the sensor holder 34 closes the back of the rear space 55 of the base member 31, and the center of the pivot recess 67, which is formed on the base plate portion 60, lies on an extension of the first optical axis O1 (see FIGS. 13 and 16 through 18). In addition, the rotation prevention hole 68 is positioned on the left-hand side of the pivot recess 67 and elongated along the first reference plane P1 (see FIGS. 10 and 12).

Upon assembling the first lens-group unit 12, the leaf spring 36 is made to be supported by the base member 31, subsequently the first lens frame 30 is disposed at a predetermined position with respect to the base member 31, and the sensor holder 34 is fixed to the base member 31. In this state, the first lens frame 30 is supported by the base member 31 with the pivot arm 41c inserted into the rear space 55 so that the pivot projection 44 fits into the pivot recess 67 and with the guide projection 39b of the pivot guide 39 inserted into the rotation prevention hole 68. As shown in FIGS. 7, 11, 13 and 16 through 18, the pressed surface 41r of the pivot arm 41c, which is inserted into the rear space 55, abuts against the pressing portion 36c to resiliently deform the resilient arm 36b forward; the end of the pivot projection 44 is pressed against the bottom of the pivot recess 67 by the resiliency of the resilient arm 36b of the leaf spring 36. In this supported state of the first lens frame 30, the lens holding portion 40 is positioned at the front opening of the optical path space 54, and the first lens element L1 is positioned in front of the incident surface L11-a of the first prism L11. As shown in FIG. 13, the pair of magnet holding portions 42 and 43 are inserted into the side space 56 of the base member 31 so that the magnet holding portion 42 is positioned adjacent to the sensor support projection 61 of the sensor holder 34 and so that the magnet holding portion 43 is positioned adjacent to the sensor support projection 62 of the sensor holder 34.

A desirable position for providing the leaf spring 36 is at a position in which the mounting plate 36a, which is supported by the spring support 58 of the base member 31, is offset toward the leftward direction (in the opposite direction to the light-ray traveling direction along the second optical axis O2 after being reflected by the reflection surface L11-c of the first prism L11), with respect to the leftward/rightward direction of the imaging unit 10, from the second reference plane P2 that includes the first optical axis O1. Furthermore, it is also desirable for the mounting plate 36a to be positioned offset toward the forward direction (along the optical axis O1 toward the object side) from the second optical axis O2 (along which the light rays travel after being reflected by the reflection surface L11-c of the first prism L11), with respect to the forward/rearward direction of the imaging unit 10. By satisfying such conditions, the leaf spring 36 can be supported in a space efficient manner in a vicinity at which the thickness, in the forward/rearward direction, of the first prism L11 is small, while the distance (the swing radius of the resilient arm 36b) from the mounting plate 36a to the pressing portion 36c, which is positioned on an extension of the first optical axis O1, can be increased. If the swing radius of the resilient arm 36b is large, the change in position of the pressing portion 36c, with the mounting plate 36a as a fulcrum, becomes near-linear movement along the forward/rearward direction, so that a high-precision biasing against the pressed surface 41r of the first lens frame 30 (pivot arm 41c) can be carried out. Moreover, with respect to the leftward/rightward direction of the imaging unit 10, the mounting plate 36a of the leaf spring 36 and the spring support 58 of the base member 31 are positioned in the close vicinity of the boundary between the incident surface L11-a and the reflection surface L11-c of the first prism L11, and the mounting plate 36a of the leaf spring 36 is positioned close to the incident surface L11-a of the first prism L11, with respect to the forward/rearward direction, thereby satisfying the above conditions.

The cover member 32 is provided with a pair of side walls 70, a front portion 71 and a stepped portion 72. The pair of side walls 70 are shaped to be fitted onto the outer sides of the pair of side walls 51 of the base member 31, respectively, the front portion 71 covers the front of the pair of side walls 70, and the stepped portion 72 is formed at the left end of the front portion 71. The cover member 32 is mounted to the base member 31 by abutting the front portion 71 against the front of the base member 31 and by engaging projections 51a which are formed on a side of each side wall 51 of the base member 31 engaging into engaging holes 70a which are formed in the associated side wall 70. A photographing aperture 75 through which the first lens element L1 is exposed is formed in the front portion 71.

As shown in FIG. 13, two coil holding portions 73 and 74 which are each shaped into a recess are formed in an inner side of the cover member 32 in the vicinity of the boundary between the front portion 71 and the stepped portion 72 of the cover member 32, and the coils 83 and 84 are fitted into and held by the coil holding portions 73 and 74, respectively. Mounting the cover member 32 to the base member 31 causes the coils 83 and 84 to be positioned to face the permanent magnets 81 and 82, respectively. A driving current is passed through the coils 83 and 84 via the coil connecting board 33. The coil connecting board 33 is a flexible board, provided with a narrow strip portion 33a and a coil connecting portion 33b. The coil connecting portion 33b is supported by the stepped portion 72 and is electrically connected to the coils 83 and 84, which are fitted into the coil holding portions 73 and 74.

The first lens-group unit 12 is constructed as described above, and is combined with the body module 11 as shown in FIGS. 5 and 6. The housing 13, which constitutes part of the body module 11, is provided with a unit support portion 13a, into which the rear of the base member 31 of the first lens-group unit 12 is fitted and supported thereby. The housing 13 is provided at the left end of the unit support portion 13a with a screw hole 13b and a pair of positioning pins 13c. The mounting portion 50 of the base member 31 is provided with a screw insertion hole 50a which is aligned with the screw hole 13b, and is further provided with a pair of positioning holes 50b into which the pair of positioning pins 13c are fitted. By supporting the first lens-group unit 12 by the unit support portion 13a thereon while fitting the pair of positioning pins 13c into the pair of positioning holes 50b and by screwing a set screw 16 into the screw hole 13b through the screw insertion hole 50a, the body module 11 and the first lens-group unit 12 are connected to complete the assembly of the imaging unit 10.

As described above, in the first lens-group unit 12, the first lens frame 30 is supported by a combination of the base member 31 and the sensor holder 34 (which is fixed with respect to the housing 13) via the engagement between the pivot projection 44 and the pivot recess 67. The pivot recess 67 is a recess which is open at the front of the base plate portion 60 of the sensor holder 34 and has a mortar-shaped (conical-shaped) inner surface which progressively reduces the diameter thereof in the direction toward the bottom of the recess, and the innermost base portion of the pivot recess 67 is formed into a concave spherical shape. This concave spherical surface is a part of a spherical surface about the spherical-swinging center A1. The pivot projection 44 is a projection having a conical outer surface which progressively reduces the diameter thereof in the direction toward the end of the pivot projection 44, and the end of the pivot projection 44 is shaped as a convex spherical tip. This convex spherical tip is a part of a spherical surface that is centered about the spherical-swinging center A1. The leaf spring 36 provides a force that presses the end of the pivot projection 44 against the bottom of the pivot recess 67, and the first lens frame 30 is supported to be capable of spherically swinging about the spherical-swinging center A1 (inclining the pivot projection 44 relative to the pivot recess 67) by being guided by the contacting portion between the pivot projection 44 and the pivot recess 67. Since the end of the pivot projection 44 is formed as a part of a spherical surface about the spherical-swinging center A1, this spherical swinging operation is performed while changing the point of contact between the pivot projection 44 and the pivot recess 67 without changing the position of the spherical-swinging center A1. As can be seen from FIGS. 11 and 13, the conical inner surface of the pivot recess 67 is formed into the shape of a circular cone having a greater central angle than that of the conical outer surface of the pivot projection 44, thereby allowing the first lens frame 30 to perform the spherical swinging operation without interference. In addition, since the contacting portion between the pivot projection 44 and the pivot recess 67 forms part of a spherical surface about the spherical-swinging center A1 (the aforementioned convex spherical tip and the aforementioned concave spherical surface), and since the pressed surface 41r of the pivot arm 41c forms part of a (another) spherical surface about the spherical-swinging center A1, when the first lens frame 30 performs the spherical swinging operation, the resilient arm 36b (the pressing portion 36c) of the leaf spring 36 does not move in the forward/rearward direction, so that the spring load of the leaf spring 36 does not vary (the resilient arm 36b gives a fixed degree of load onto the end of the pivot projection in the forward/rearward direction and prevents no superfluous load from occurring in directions other than the forward/rearward direction). More specifically, the rearward facing surface of the pressing portion 36c of the leaf spring 36 is a flat surface lying on a plane that is orthogonal to the first optical axis O1, and the convex pressed surface 41r is in point-contact with this flat surface (pressing portion 36c). When a spherical swinging operation is performed on the first lens frame 30 about the spherical-swinging center A1, the pressed surface 41r slides on the pressing portion 36c. During this time, due to the pressed surface 41r being a spherical surface that is centered about the spherical-swinging center A1, the position of the point of contact of the pressing portion 36c against the pressed surface 41r does not change (with respect to the pressing portion 36c), so that the magnitude and the direction of the load applied onto the pressed surface 41r from the pressing portion 36c does not change. Accordingly, the leaf spring 36 can always apply a constant (substantially unchanging) load against the first lens frame 30 (the pressed surface 41r) during a spherical swinging operation. This makes it possible to achieve a stable image-stabilizing control with high precision without the electromagnetic actuator (the permanent magnets 81 and 82 and the coils 83 and 84) exerting an adverse influence on the drive control of the first lens frame 30.

As shown in FIGS. 7, 13 and 16 through 18, the spherical-swinging center A1 lies on an extension of the first optical axis O1 which extends to the rear of the reflection surface L11-c of the first prism L11, and the exit surface L1-b of the first lens element L1 is a concave surface which faces the spherical-swinging center A1. FIGS. 7, 12, 13 and 14 through 16 show the aforementioned image-stabilizing initial state, in which the first lens frame 30 (the first lens element L1) is positioned at the center of the driving range thereof in the spherical swinging operation by the image-stabilizing system, and FIGS. 15, 17 and 18 each show a state where the first lens frame 30 (the first lens element L1) has been swung in the spherical swinging operation from the image-stabilizing initial state. More specifically, FIG. 15 shows a state where the first lens frame 30 has been tilted toward the upper side of the imaging unit 10, FIG. 17 shows a state where the first lens frame 30 has been tilted toward the left side of the imaging unit 10 and FIG. 18 shows a state where the first lens frame 30 has been tilted toward the right side of the imaging unit 10.

The pivot guide 39 and the rotation prevention hole 68 serve as a guider (guiding device) which prevents rotation of the first lens frame 30 about the first optical axis O1 while allowing the first lens frame 30 to perform the spherical swinging operation. In the completed assembled state of the imaging unit 10, the rotation prevention hole 68 is formed as an elongated hole, which is elongated in a radial direction of an imaginary line extended rearward from the first optical axis O1. More specifically, as the first lens-group unit 12 is viewed from the front along the first optical axis O1, as shown in FIG. 12, the rotation prevention hole 68 is positioned on the boundary between the second quadrant V2 and the third quadrant V3, and a pair of facing surfaces 68a which are formed in the rotation prevention hole 68 on the opposite sides of the center of the rotation prevention hole 68 with respect to the forward/rearward direction are positioned on the opposite sides of the first reference plane P1. Each facing surface 68a is parallel to the first reference plane P1. As shown in FIGS. 11 and 16 through 18, the rotation prevention hole 68 is formed at a position substantially identical to the position of the pivot recess 67, with respect to the forward/rearward direction of the imaging unit 10. The guide projection 39b of the pivot guide 39 which is inserted into the rotation prevention hole (that is positioned in the aforementioned manner) is sandwiched between the pair of facing surfaces 68a of the rotation prevention hole 68 to prevent the first lens frame 30 from rotating about the first optical axis O1 (to prevent the first lens element L1 from rotating about the optical axis thereof in a state where the first lens element L1 (the first lens frame 30) is tilted from the image-stabilizing initial state). On the other hand, since the spherical guide projection 39b of the pivot guide 39 is not prevented from either moving along the pair of facing surfaces 68a of the rotation prevention hole 68 or moving obliquely about a center B1 (see FIGS. 12 and 14 through 18) of the guide projection 39b, the pivot guide 39 does not interfere with the spherical swinging operation of the first lens frame 30, as shown in the spherical swinging operation in each of FIGS. 15, 17 and 18.

Both the spherical-swinging center A1 of the first lens frame 30 and the center B1 of the guide projection 39b lie on the first reference plane P1 (see FIG. 12). Therefore, as can be seen from FIGS. 14 and 15, when the first lens frame 30 is swung along the second reference plane P2, which is orthogonal to the first reference plane P1, the first lens frame 30 swings about the center B1 of the guide projection 39b without changing the position of the center B1 of the guide projection 39b. FIG. 15 shows a state where the first lens frame 30 is tilted toward the upper side of the imaging unit 10; the state in which the first lens frame 30 is tilted toward the lower side of the imaging unit 10 corresponds to the mirror image of the first lens frame 30 shown in FIG. 15. Whereas, as shown in FIGS. 16 through 18, when the first lens frame 30 is swung along the first reference plane P1, the pivot guide 39 moves in the swinging direction about the spherical-swinging center A1 while being guided by the pair of facing surfaces 68a of the rotation prevention hole 68 to thereby change the position of the center B1 of the guide projection 39b. The depth of the rotation prevention hole 68 in the forward/rearward direction is determined so that the guide projection 39b is prevented from coming off during the movement of the pivot guide 39 in the forward/rearward direction when the first lens frame 30 is swung along the first reference plane P1. Although FIGS. 14 through 18 each show a swing movement of the first lens frame 30 in a direction along the first reference plane P1 or the second reference plane P2, the first lens frame 30 can swing in directions along an infinite number of planes, including the first optical axis O1, in addition to the first and second reference planes P1 and P2.

The driver which drives the first lens frame 30 so that the first lens frame 30 performs the spherical swinging operation is an electromagnetic actuator which includes two voice coil motors (VCMs). One of the two voice coil motors is configured of a permanent magnet 81 and a coil 83 and the other is configured of a permanent magnet 82 and a coil 84. As shown in FIG. 13, the centers of the permanent magnets 81 and 82 are arranged on a common imaginary spherical surface J1 about the spherical-swinging center A1, and the centers of the coils 83 and 84 are arranged on a common imaginary spherical surface J2 about the spherical-swinging center A1. The imaginary spherical surface J2 is greater in radius than the imaginary spherical surface J1. When each of the imaginary spherical surfaces J1 and J2 is regarded as a sphere having a "pole" that intersecting with the first optical axis O1 (or an imaginary line as an extension of the first optical axis O1), the permanent magnets 81 and 82 are arranged on a common latitude line (parallel) of the imaginary spherical surface J1 with a predetermined distance therebetween; and the permanent magnets 81 and 82 are arranged to be substantially symmetrical with respect to the first reference plane P1 in the second quadrant V2 and the third quadrant V3, respectively, in the state shown in FIG. 12, in which the first lens element L1 is in the image-stabilizing initial state. Similarly, the coils 83 and 84 are arranged on a common latitude line (parallel) of the imaginary spherical surface J2 with a predetermined distance therebetween, and the coils 83 and 84 are arranged to be substantially symmetrical with respect to the first reference plane P1 in the second quadrant V2 and the third quadrant V3, respectively.

As shown in FIGS. 12 and 13, if a tangent plane to the imaginary spherical surface J1 with the tangent point thereof at the center of the permanent magnet 81 is set, and if a normal line K1 to the tangent plane at this tangent point (i.e., a straight line which passes through the center of the permanent magnet 81 and the spherical-swinging center A1) is set, the Hall sensor 85, the permanent magnet 81 and the coil 83 are aligned on the normal line K1 in that order from the inner diameter side that is closer to the spherical-swinging center A1, and the coil 83 and the Hall sensor 85 are positioned in the magnetic field of the permanent magnet 81. Likewise, if a tangent plane to the imaginary spherical surface J1 with the tangent point thereof at the center of the permanent magnet 82 is set, and if a normal line K2 to the tangent plane at this tangent point (i.e., a straight line which passes through the center of the permanent magnet 82 and the spherical-swinging center A1) is set, the Hall sensor 86, the permanent magnet 82 and the coil 84 are aligned on the normal line K2 in that order from the inner diameter side that is closer to the spherical-swinging center A1, and the coil 84 and the Hall sensor 86 are positioned in the magnetic field of the permanent magnet 82. Neither of the normal lines K1 and K2 is parallel to the third reference plane P3, and the directions of the normal lines K1 and K2 are set to proceed forward with respect to the third reference plane P3 in a direction away from the spherical-swinging center A1. In addition, when the first lens element L1 is in the image-stabilizing initial state, the normal lines K1 and K2 are symmetrically positioned with respect to the first reference plane P1 when the imaging unit 10 is viewed from the front along the first optical axis O1 as shown in FIG. 12, and the normal lines K1 and K2 are positioned to overlay each other when the imaging unit 10 is viewed from a side thereof along a direction orthogonal to the first optical axis O1 as shown in FIG. 13.

Each of the permanent magnets 81 and 82 has a structure such that the north and south poles on the opposite sides of magnetic-pole boundary lines thereof are aligned in a direction along meridian lines of the imaginary spherical surface J1. The coil 83 is arranged so that the pair of linear portions 83a thereof extend in a direction along latitude lines of the imaginary spherical surface J1 and the coil 84 is arranged so that the pair of linear portions 84a thereof extend in a direction along latitude lines (which are in common with those of the pair of linear portions 83a) of the imaginary spherical surface J1. Upon the coil 83 being energized, a driving force is generated in a direction orthogonal to the pair of linear portions 83a of the coil 83 and orthogonal to the magnetic-pole boundary line of the permanent magnet 81 according to Fleming's left-hand rule. Similarly, upon the coil 84 being energized, a driving force is generated in a direction orthogonal to the pair of linear portions 84a of the coil 84 and orthogonal to the magnetic-pole boundary line of the permanent magnet 82 according to Fleming's left-hand rule. The coils 83 and 84 are fixedly supported by a body part (i.e., the housing 13) of the imaging unit 10 via the cover member 32, and the permanent magnets 81 and 82 are supported by the first lens frame 30, which is a movable member, and accordingly, a driving force generated upon each coil 83 and 84 being energized acts as a force to move the first lens frame 30 in the meridian direction on the imaginary spherical surface J1. Since the two voice coil motors (a combination of the permanent magnet 81 and the coil 83 and a combination of the permanent magnet 82 and the coil 84) are arranged at different positions in the latitudinal direction on the imaginary spherical surfaces J1 and J2, the first lens frame 30 can be made to perform the spherical swinging operation in any arbitrary direction by a combination of controlling the passage of current through the two voice coil motors. Since the first lens frame 30 is prevented from rotating about the first optical axis O1 when performing the spherical swinging operation due to the engagement of the pivot guide 39 with the rotation prevention hole 68, as described above, the first lens frame 30 is prevented from moving excessively to a point where each permanent magnet 81 and 82 and the associated coil 83 or 84 do not face each other, which makes it possible to control the position of the first lens frame 30 at all times by the two voice coil motors.

Variation in position of the permanent magnet 81 in accordance with the spherical swinging operation of the first lens frame 30 causes the output of the Hall sensor 85 that faces the permanent magnet 81 to vary, and variation in position of the permanent magnet 82 in accordance with the spherical swinging operation of the first lens frame 30 causes the output of the Hall sensor 86 that faces the permanent magnet 82 to vary. The position of the first lens frame 30 during the spherical swinging operation thereof can be detected from the output variations of the two Hall sensors 85 and 86.

If the imaging unit 10, which has the above described structure, is pointed at an object located in front of the imaging unit 10, light reflected by the object (light emanating from the photographic object) enters the first prism L11 through the incident surface L11-a after passing through the first lens element L1 and is reflected at a substantially right angle by the reflection surface L11-c of the first prism L11 and travels toward the exit surface L11-b. Subsequently, the reflected light that emerges from the exit surface L11-b of the first prism L11 enters the second prism L12 from the incident surface L12-a after passing through the second lens element L2, the second lens group G2, the third lens group G3 and the fourth lens group G4, and is reflected at a substantially right angle by the reflection surface L12-c of the second prism L12 and travels toward the exit surface L12-b. Subsequently, the reflected light emerges from the exit surface L12-b and is captured (received) by the imaging surface of the image sensor 14. A zooming operation (power-varying operation) and a focusing operation of the imaging optical system of the imaging unit 10 are performed by moving the second lens group G2 and/or the third lens group G3 along the pair of rods 22 and 23 using the first motor M1 and the second motor M2.

In the imaging unit 10, an image-stabilizing (image shake correction/shake reduction) operation is performed using the first lens element L1 of the first lens group G1, which is positioned in front of the first prism L11. As described above, the image-stabilizing system drives the first lens frame 30 relative to the support members (the base member 31 and the sensor holder 34) that are fixed with respect to the housing 13. An advantage of selecting the first lens element L1 as an image-stabilizing optical element is that the imaging unit 10 can be constructed to be slim in the forward/rearward direction, even though the imaging unit 10 is equipped with an image-stabilizing system. For instance, unlike the present embodiment of the imaging unit 10, in the case of an image-stabilizing system which moves the second lens group G2 or the third lens group G3 in a direction orthogonal to the second optical axis O2, securement of the space for movement of the second lens group frame 20 or the third lens group frame 21 and the arrangement of the driver for the second lens group frame 20 or the third lens group frame 21 cause an increase in the space, in the forward/rearward direction, that is required in the housing 13, thus causing an increase of the thickness of the imaging unit 10. Additionally, according to the structure of the present embodiment of the imaging unit 10, only the first lens element L1 is driven when image-stabilizing control is performed rather than the entire first lens group G1, and accordingly, thus there being the advantage of the moving parts being compact, so that the driving load can accordingly be small. In typical image-stabilizing systems, an entire lens group usually driven to cancel out image shake. Whereas, in the first lens group G1 of the imaging unit 10, the distance between the first lens element L1 and the second lens element L2 is great because the first prism L11, which serves merely as a reflector which reflects the incident light rays, is disposed between the first lens element L1 and the second lens element L2, each of which has a refractive power; therefore, deterioration due to aberrations is small even though the first lens element L1 is solely driven to perform an image-stabilizing control. Accordingly, as an imaging optical system, aberrations are controlled by the entire first lens group G1, which ranges from the first lens element L1 to the second lens element L2; however, regarding the image-stabilizing system, only the first lens element L1 serves as an image-stabilizing optical element based on the findings that satisfactory optical performance can be achieved even if the first lens element L1 and the second lens element L2, which are widely spaced from each other in an optical axis direction with the first prism L11 positioned therebetween, are treated as substantially different lens groups.

The spherical swinging operation, which is performed when the first lens element L1 is driven to perform an image-stabilizing operation, allows the first lens element L1 to move widely within a small space (when the imaging unit 10 is viewed from the front along the first optical axis O1) compared with the case where the first lens element L1 moves linearly along a plane orthogonal to the first optical axis O1. Accordingly, the image-stabilizing performance can be improved by increasing the maximum vibration angle that an image-stabilizing operation can accommodate while making the imaging unit 10 compact not only with respect to the forward/rearward direction but also with respect to the upward/downward direction and the leftward/rightward direction (when the imaging unit 10 is viewed from the front).

Specifically, in the imaging unit 10, with attention focused on the fact that the imaging unit 10 is a bending optical system in which the first prism L11 is positioned behind the first lens element L1, the position of the spherical-swinging center A1 (which is positioned on a straight line extended from the first optical axis O1), about which the first lens frame 30 is made to swing when the spherical swinging operation is performed, is set in the rear space 55, which is positioned behind the reflection surface L11-c. With this structure, the space at the rear of the first prism L11 can be effectively utilized as the installation space for the support mechanism for the first lens frame 30, and the spherical swinging operation is achieved via a structure that is superior in space utilization. More specifically, portions such as the pivot projection 44 (the pivot arm 41c), the pivot recess 67 (the sensor holder 34), the leaf spring 36, the pivot guide 39 (the connecting portion 41b) and the rotation prevention hole 68 (the sensor holder 34), which are associated with supporting the first lens frame 30, are integrated and housed in the rear space 55 as shown in FIGS. 13 through 18.

As optical conditions for obtaining the effects of the spherical swinging operation by suppressing aberration fluctuations while achieving miniaturization of the imaging unit 10, it is desirable to satisfy the following conditions (1) and (2):

$$-0.6<(SC-R2)/f1<0.4 \quad (1)$$

$$SF<-0.5, \quad (2)$$

wherein SF=(R2+R1)/(R2−R1);

R1 designates the radius of curvature of the surface (the incident surface L1-a) closest to the object side of the front lens element (s) (the first lens element L1/at least one front lens element);

R2 designates the radius of curvature of the surface (the exit surface L1-b) closest to the image side of the front lens element(s);

SC designates the distance on the optical axis from the surface (the exit surface L1-b) closest to the image side of the front lens element (s) to the spherical-swinging center (A1) of the spherical swinging operation; and f1 designates the focal length of the front lens element(s).

The sign (+/−) of each symbol in the aforementioned conditions is defined with respect to the direction toward the image side from the object side being determined as positive (+).

Condition (1) specifies the position of the spherical-swinging center A1 normalized to the focal length of the first lens element L1. If the lower limit of condition (1) is exceeded (less than or equal to −0.6), the distance of the spherical-swinging center A1 from the first lens element L1 becomes excessively great, which makes it difficult to miniaturize the imaging unit 10 in the forward/rearward direction and increases aberration fluctuations. Furthermore, if the upper limit of condition (1) is exceeded (equal to greater than 0.4), the spherical-swinging center A1 becomes too close to the first lens element L1, so that the angle of deviation of the optical axis of the first lens element L1 during driving thereof becomes small (the amount of image deviation becomes small), so that an effective image-stabilizing effect cannot be obtained.

Condition (2) specifies the shape of the first lens element L1. If SF is outside the specified range of condition (2), namely, if SF is greater than or equal to −0.5 (i.e., SF>=−0.5), the amount of aberration fluctuations that occur during a spherical swinging operation becomes great even if the position of the spherical-swinging center A1 satisfies condition (1).

Figure 19:
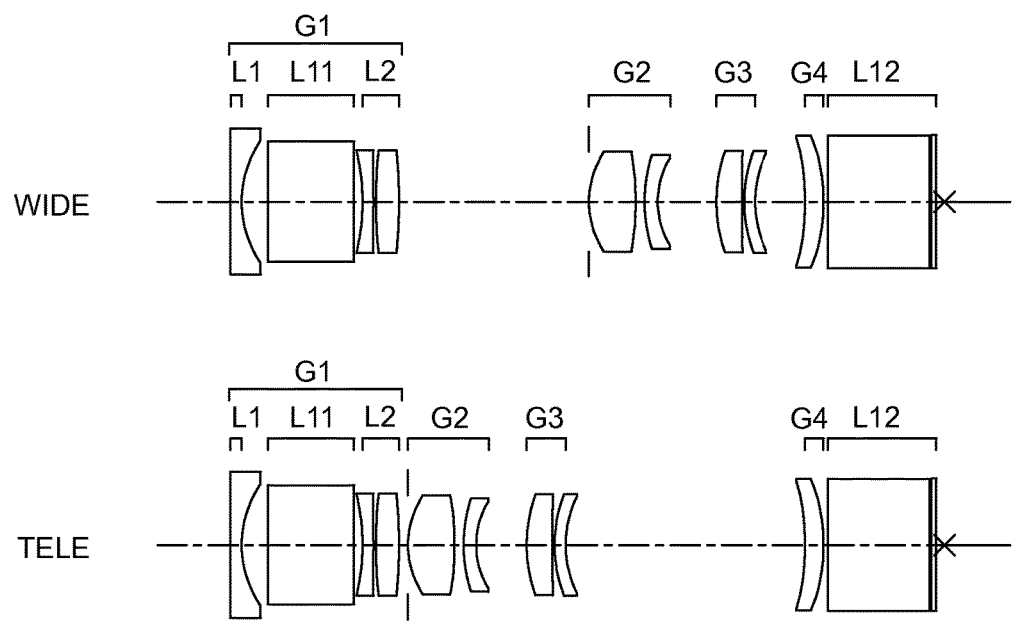
FIG. 19 is a schematic diagram illustrating a first example of the imaging optical system of the imaging unit, wherein an upper half of FIG. 19 shows the imaging optical system at the wide-angle extremity and a lower half of FIG. 19 shows the imaging optical system at the telephoto extremity.
Figure 20:
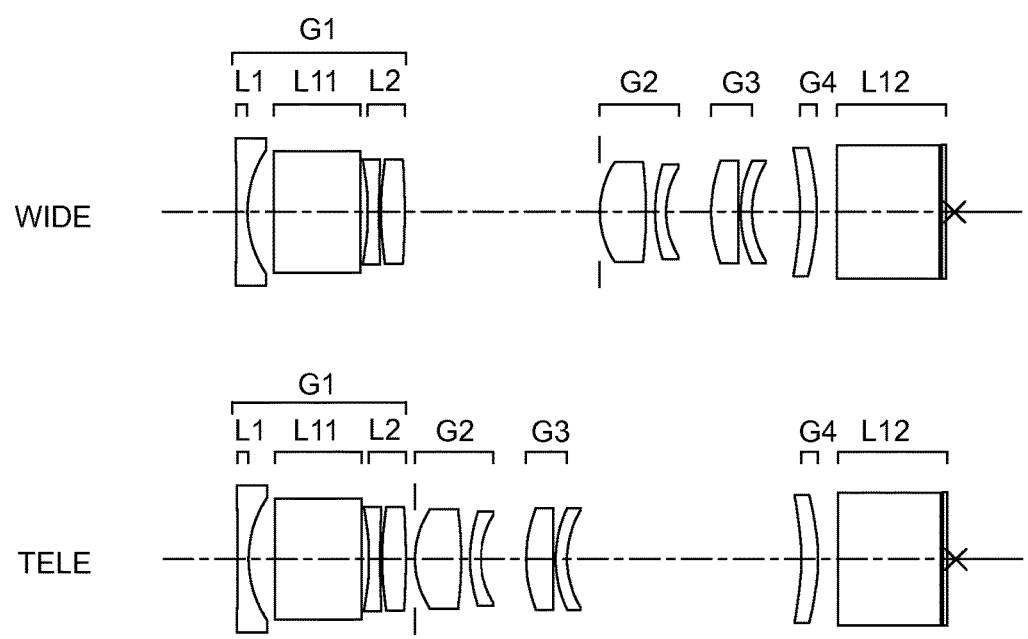
FIG. 20 is a schematic diagram illustrating a second example of the imaging optical system of the imaging unit, wherein an upper half of FIG. 20 shows the imaging optical system at the wide-angle extremity and a lower half of FIG. 20 shows the imaging optical system at the telephoto extremity.
Figure 21:
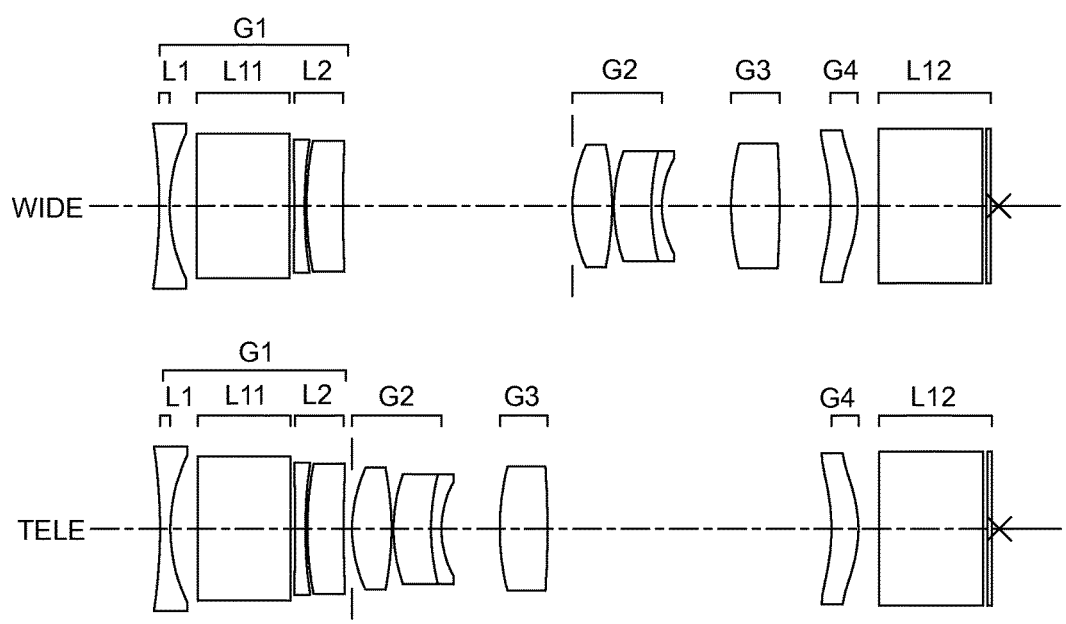
FIG. 21 is a schematic diagram illustrating a third example of the imaging optical system of the imaging unit, wherein an upper half of FIG. 21 shows the imaging optical system at the wide-angle extremity and a lower half of FIG. 21 shows the imaging optical system at the telephoto extremity.

FIGS. 19, 20 and 21 show first, second and third examples of the imaging optical system of the imaging unit 10 as actual examples which satisfy each of the aforementioned conditions (see TABLE 1). Upper and lower halves of FIG. 19 show the optical arrangement of the first example of the imaging optical system of the imaging unit 10 when the imaging optical system is at the wide-angle extremity and the telephoto extremity, respectively. Likewise, upper and lower halves of FIG. 20 show the optical arrangement of the second example of the imaging optical system of the imaging unit 10 when the imaging optical system is at the wide-angle extremity and the telephoto extremity, respectively, and upper and lower halves of FIG. 21 show the optical arrangement of the third example of the imaging optical system of the imaging unit 10 when the imaging optical system is at the wide-angle extremity and the telephoto extremity, respectively.

TABLE 1

|  |  | EX. 1 | EX. 2 | EX. 3 |
|---|---|---|---|---|
|  | R1 | 148.000 | Infinity | −26.958 |
|  | R2 | 4.756 | 4.900 | 8.204 |
|  | D | 0.500 | 0.500 | 0.500 |
|  | N1 | 1.00000 | 1.00000 | 1.00000 |
|  | N2 | 1.77250 | 1.77250 | 1.77250 |
|  | N3 | 1.00000 | 1.00000 | 1.00000 |
|  | f1 | −6.371 | −6.343 | −8.092 |
| COND. 1 | SF[(R2 + R1)/(R2 − R1)] < −0.5 | −1.066 | −1.000 | −0.533 |
|  | SC − R2 when aberration fluctuations are within an acceptable range | 1.0 | 1.5 | 0.3 |
| COND. 2 | −0.6 < (SC − R2)/f1 < 0.4 | −0.157 | −0.236 | −0.037 |

The first example of the imaging optical system is a type of optical system in which the first lens element L1 is formed as a concave meniscus lens wherein the incident surface L1-a is a convex surface and the exit surface L1-b is a concave surface (SF<−1). The second example of the imaging optical system is a type of optical system in which the first lens element L1 is formed as a plano-concave lens wherein the incident surface L1-a is a flat surface and the exit surface L1-b is a concave surface (SF=−1). The third example of the imaging optical system is a type of optical system in which the first lens element L1 is formed as a biconcave lens, wherein each of the incident surface L1-a and the exit surface L1-b is a concave surface (SF>−1).

Likewise with the examples shown in FIGS. 19, 20 and 21, it is desirable for the surface closest to the image plane (i.e., the exit surface L1-b) of the front lens element, which is driven to perform an image-stabilizing operation, to be a concave surface. Specifically, if the surface closest to the image plane of the front lens element is formed as a part of an imaginary spherical surface that is centered about the spherical-swinging center A1, the positional relationship between the surface closest to the image plane (the exit surface L1-*b*) of the front lens element and the focal point of the front lens element does not optically change even if a spherical swinging operation about the spherical-swinging center A1 is performed, which makes it possible to prevent coma which would otherwise be caused by this surface from occurring during the spherical swinging operation.

Additionally, including also the case of the incident surface L1-*a* being a flat surface like in the second example, it is desirable for the surface (the incident surface L1-*a*) closest to the object side of the front lens element (the first lens element L1), which performs the image-stabilizing operation, to be smaller in power (refractive power) than the surface (the exit surface L1-*b*) closest to the image side of the front lens element (the first lens element L1).

Instead of a single lens element such as the first lens element L1, a cemented lens or a plurality of lens elements can alternatively be used as the front lens element that is driven to perform an image-stabilizing operation. In the case where a plurality of front lens elements are used, it is desirable for the plurality of front lens elements to be integrally driven as a single sub-lens group when an image-stabilizing operation is performed to prevent optical performance from deteriorating. Additionally, in such a case, R1, R2, SC and f1 in the aforementioned conditions (1) and (2) would be replaced as follows: R1 designates the radius of curvature of the surface (incident surface) closest to the object side of the frontmost lens element that is closest to the object side of the plurality of front lens elements; R2 designates the radius of curvature of the surface (exit surface) closest to the image side of the rearmost lens element that is closest to the image side of the plurality of lens elements; SC designates the distance on the optical axis from the surface (exit surface) closest to the image side of the rearmost lens element that is closest to the image side of the plurality of lens elements to the spherical-swinging center (A1) of the spherical swinging operation; and f1 designates the combined focal length of the plurality of lens elements.

Regarding the arrangement of the image-stabilizing driver which drives the first lens frame 30 (the first lens element L1) to cancel out image shake, due to the arrangement of the permanent magnets 81 and 82 on the imaginary spherical surface J1 about the spherical-swinging center A1 and the arrangement of the coils 83 and 84 on the imaginary spherical surface J2 about the spherical-swinging center A1, the distance between the permanent magnet 81 and the coil 83 and the distance between the permanent magnet 82 and the coil 84 vary little, respectively, which makes it possible to achieve a stable image-stabilizing control with high precision when the first lens frame 30 is driven to perform the spherical swinging operation about the spherical-swinging center A1.

Additionally, in the case where a voice coil motor(s) is used as the image-stabilizing driver, it is desirable to adopt a large coil (s) to make the coil generate a large driving force. Hence, in the illustrated embodiments, the coils 83 and 84 are large in size (especially in the lengthwise direction thereof) relative to the permanent magnets 81 and 82. In addition, the permanent magnets 81 and 82, which are relatively small in size, are arranged in the first lens-group unit 12 at an inner diameter side (on the aforementioned common imaginary spherical surface J1) that is closer to the spherical-swinging center A1 in directions along the normal lines K1 and K2, respectively. The coils 83 and 84, which are relatively large in size, are arranged in the first lens-group unit 12 at an outer diameter side (on the aforementioned common imaginary spherical surface J2) that is farther from the spherical-swinging center A1 in directions along the normal lines K1 and K2, respectively. Such an arrangement of the permanent magnets 81 and 82 and the coils 83 and 84, in which the large coils 83 and 84 are arranged in an outer diameter side in the first lens-group unit 12, on which component installation space can be easily secured, and in which the small permanent magnets 81 and 82 are arranged in an inner diameter side in the first lens-group unit 12, on which components are densely arranged, is advantageous with regard to space utilization, thus contributing to miniaturization of the imaging unit 10.

For instance, unlike the present embodiment of the imaging apparatus, the first lens frame 30 can be driven by a moving-coil electromagnetic actuator in which the permanent magnets 81 and 82 are arranged on the aforementioned outer diameter side (farther from the spherical-swinging center A1 in directions along the normal lines K1 and K2, respectively) and supported by the cover member 32 and in which the coils 83 and 84 are arranged on the aforementioned inner diameter side (closer to the spherical-swinging center A1 in directions along the normal lines K1 and K2, respectively) and supported by the first lens frame 30. However, as can be understood from FIGS. 3 and 4, the pair of side walls 51 of the base member 31 are positioned in the close vicinity of the sides of the pair of magnet holding portions 42 and 43, respectively, and if the coils 83 and 84, which are greater in size than the permanent magnets 81 and 82, are arranged in the positions where the pair of magnet holding portions 42 and 43 are supposed to be arranged, there is a possibility of the coils 83 and 84 interfering with the pair of side walls 51. To prevent the coils 83 and 84 from interfering with the pair of side walls 51, countermeasures such as widening the space between the pair of side walls 51 are required, which causes an increase in size of the imaging unit 10. However, the present embodiment of the imaging apparatus is free from such disadvantages.

In addition, the configuration in which the Hall sensors 85 and 86, which are smaller in size than the permanent magnets 81 and 82, are positioned in an inner diameter side in the first lens-group unit 12 which is closer to the spherical-swinging center A1 in directions along the normal lines K1 and K2, respectively, also contributes to an improvement in space utilization. As can be seen from FIG. 13, the pair of sensor support projections 61 and 62 that support the small Hall sensors 85 and 86 can be inserted into the narrow space surrounded by the lens holding portion 40 (the circular frame portion 40*b*) and the pair of magnet holding portions 42 and 43 of the first lens frame 30 and the spring support 58 of the base member 31, so that the small Hall sensors 85 and 86 are space-efficiently arranged. In addition, the permanent magnets 81 and 82, the coils 83 and 84 and the Hall sensors 85 and 86 are installed in the side space 56 (the second quadrant V2 and the third quadrant V3) in the base member 31. The side space 56 is formed in a section (first section) on the opposite side of the second reference plane P2 from the side on which the traveling direction of the light rays deflected by the first prism L11 (the traveling direction of the second optical axis O2), and none of the optical elements of the imaging optical system which are positioned optically rearward from the first prism L11 (rightward with respect to FIG. 7) are arranged in the side space 56, and accordingly, the arrangement of the permanent magnets 81 and 82, the coils 83 and 84 and the Hall sensors 85 and 86 is not easily subjected to space restrictions. For instance, it is possible to drive the first lens element L1 even if the permanent magnets 81 and 82 and the coils 83 and 84 are arranged in a second section on the right side of the second reference plane P2 which includes the first quadrant V1 and the fourth quadrant V4; however, the second lens element L2 is positioned in the first quadrant V1 and the fourth quadrant V4 at a position adjacent to the exit surface L11-*b* of the first prism L11, so that in this case there is a problem of it being difficult to secure space for installing the entire electromagnetic actuator without interfering with the second lens element L2. Whereas, there is no such a restriction in the arrangement of the illustrated embodiment in which a combination of the permanent magnet 81 and the coil 83 provided in the second quadrant V2 and a combination of the permanent magnet 82 and the coil 84 provided in the third quadrant V3.

Additionally, the second lens group G2 and the third lens group G3 that are movable along the second optical axis O2 are provided on an optical path extending from the first prism L11, the first motor M1 and the second motor M2, which constitute members of the drive mechanism for moving the second lens group G2 and the third lens group G3 along the second optical axis O2, contain metal parts, and the pair of rods 22 and 23 are also metal parts. If these metal parts are made of a magnetic material and positioned near the electromagnetic actuator, there is a possibility of such metal parts exerting an adverse influence on the image-stabilizing driving operation of the electromagnetic actuator. Specifically, in the moving-magnet electromagnetic actuator in which the permanent magnets 81 and 82 are supported on the moveable first lens frame 30, in order to make the electromagnetic actuator perform drive control with high precision, it is required to remove the adverse influence caused by external magnetic materials on the magnetic fields of the permanent magnets 81 and 82. The permanent magnets 81 and 82 and the coils 83 and 84 that are arranged in the second quadrant V2 and the third quadrant V3 are farther in distance from each motor M1 and M2 and each rod 22 and 23 than in the case where the permanent magnets 81 and 82 and the coils 83 and 84 were to be arranged in the first quadrant V1 and the fourth quadrant V4; therefore, the parts of the motors M1 and M2 and the rods 22 and 23 do not easily adversely-influence the driving of the electromagnetic actuator even if these parts contain magnetic metals.

In the first lens frame 30 of the imaging unit 10, a high degree of strength is demanded in order to control the position of the first lens element L1 to a high degree of accuracy during an image shake correction operation while achieving a favorable optical quality. In particular, a sufficient amount of strength is demanded for the support portion 41, which is formed into a cantilever projecting from the lens holding portion 40. Furthermore, in order to contribute to miniaturization of the imaging unit 10, in the first lens frame 30, a space efficient arrangement of the support portion 41 (projecting from the lens holding portion 40) and of the magnet holding portions 42 and 43 is demanded.

As can be understood from FIGS. 3 and 8, with respect to the upward/downward direction of the imaging unit 10, the size (diameter) of the lens holding portion 40 of the first lens frame 30 is substantially the same as the width occupied by the magnet holding portions 42 and 43, and the magnet holding portions 42 and 43 do not project by a large amount in the upward/downward direction. In other words, the first lens frame 30 is formed in a compact (miniaturized) manner with respect to the upward/downward direction. Furthermore, in the first lens frame 30, the pair of leg portions 41*a* of the support portion 41 are provided at positions that are closer to the second reference plane P2 than the magnet holding portions 42 and 43. More specifically, with respect to a circumferential direction centered about the first optical axis O1, the pair of leg portions 41*a* are spaced apart by a wider distance than the distance by which the magnet holding portions 42 and 43 are spaced apart, and circumferential positions of the magnet holding portions 42 and 43 are located between the pair of leg portions 41*a*. Furthermore, since the thickness in the forward/rearward direction of the first prism L11 gradually increases toward the right direction (the light-ray traveling direction along the second optical axis O2 after being reflected by the reflection surface L11-*c* of the first prism L11) of the imaging unit 10 (the rear space 55 narrows) so that space restrictions for providing the support portion 41 occur, it is desirable for the pair of leg portions 41*a* to be provided leftward with respect to the second reference plane P2 (in the opposite direction to the light-ray traveling direction along the second optical axis O2 after being reflected by the reflection surface L11-*c* of the first prism L11).

As shown in FIGS. 16 through 18, the position at which the pair of leg portions 41*a* of the first lens frame 30 are provided, with respect to the leftward/rightward direction of the imaging unit 10, partially overlap the positions at which the first prism L11, the spring support 58 and the leaf spring 36 are provided. Therefore, as shown in FIGS. 14 and 15, the pair of leg portions 41*a* are formed apart from each other in the upward/downward direction so that the pair of leg portions 41*a* respectively pass over the pair of side surfaces L11-*d* of the first prism L11 in order to prevent these members (the first prism L11, the spring support 58 and the leaf spring 36) from interfering with the pair of leg portions 41*a*. In other words, when viewed along the first optical axis O1, the pair of leg portions 41*a* are located at positions that do not overlap with the position of the first prism L11. Since the lens holding portion 40 which holds the large-diameter first lens element L1 has a larger diameter than the width (the distance between the pair of side surfaces L11-*d*), in the upward/downward direction, of the first prism L11, the pair of leg portions 41*a* can be provided on the respective sides of the pair of side surfaces L11-*d* of the first prism L11 by configuring the pair of leg portions 41*a* to project from the rear surface of the lens holding portion 40 (i.e., without increasing the size of the first lens frame 30 in the upward/downward direction). Furthermore, the pivot projection 44 is positioned on an extension of the first optical axis O1 due to the configuration in which the pair of leg portions 41*a*, which are located apart from each other in the upward/downward direction, are connected to each other by the connecting portion 41*b*, and in which the pivot arm 41*c* projects from the connecting portion 41*b*. As shown in FIGS. 16 through 18, the connecting portion 41*b* and the pivot arm 41*c* are inserted into the rear space 55 provided rearwardly from the underside of the reflection surface L11-*c* of the first prism L11. Furthermore, as shown in FIGS. 14 through 18, the left end edge of the prism holding wall 53, part of the left end edge of the first prism L11, part of the spring support 58 and part of the leaf spring 36 enter into the opening 41*s* formed in the first lens frame 30. As shown in FIG. 14, with the first lens frame 30 in the image-stabilizing initial state, the pair of leg portions 41*a* are positioned substantially symmetrical to the first reference plane P1 on either side thereof, and a clearance in the upward/downward direction is provided between each leg portion 41*a* and the associated side surface L11-*d* (and between each leg portion 41*a* and the spring support 58). As shown in FIG. 15, when the first lens frame 30 is spherically swung, the pair of leg portions 41a are prevented from interfering with the first prism L11 and the spring support 58 due to the above-described clearances.

In the first lens frame 30, the rigidity of the entire support portion 41 is improved (increased) by connecting the pair of leg portions 41a with the connecting portion 41b, which is beam shaped and extends in a direction (upward/downward direction) that is substantially orthogonal to both the projecting direction of the pair of leg portions 41a and to the projecting direction of the pivot arm 41c (leftward/rightward direction). By forming the support portion 41 as a frame structure in which the pair of leg portions 41a which are provided on either side of the first prism L11 are connected by the connecting portion 41b in the above-described manner, the support portion 41 can be provided in a space-efficient manner so as not to interfere with the magnet holding portions 42 and 43 and the first prism L11, etc., while achieving a favorable degree of strength in the support portion 41 and supporting the first lens element L1, which performs an image-stabilizing operation, with high precision.

The structure which supports the first lens frame 30 in a manner to enable an spherical swinging operation of the first lens frame 30 is not limited to that (which is the first embodiment of the support mechanism for the first lens frame 30) of the first embodiment of the imaging unit 10 which has been illustrated in FIGS. 1 through 21. Different embodiments of the support mechanism for the first lens frame 30 of the imaging unit 10 will be hereinafter discussed with reference to FIGS. 22 through 39. Components/members shown in FIGS. 22 through 39 which are similar to those in the first embodiment of the imaging unit 10 are designated by the same reference numerals, and descriptions of these similar elements will be omitted.

Figure 22:
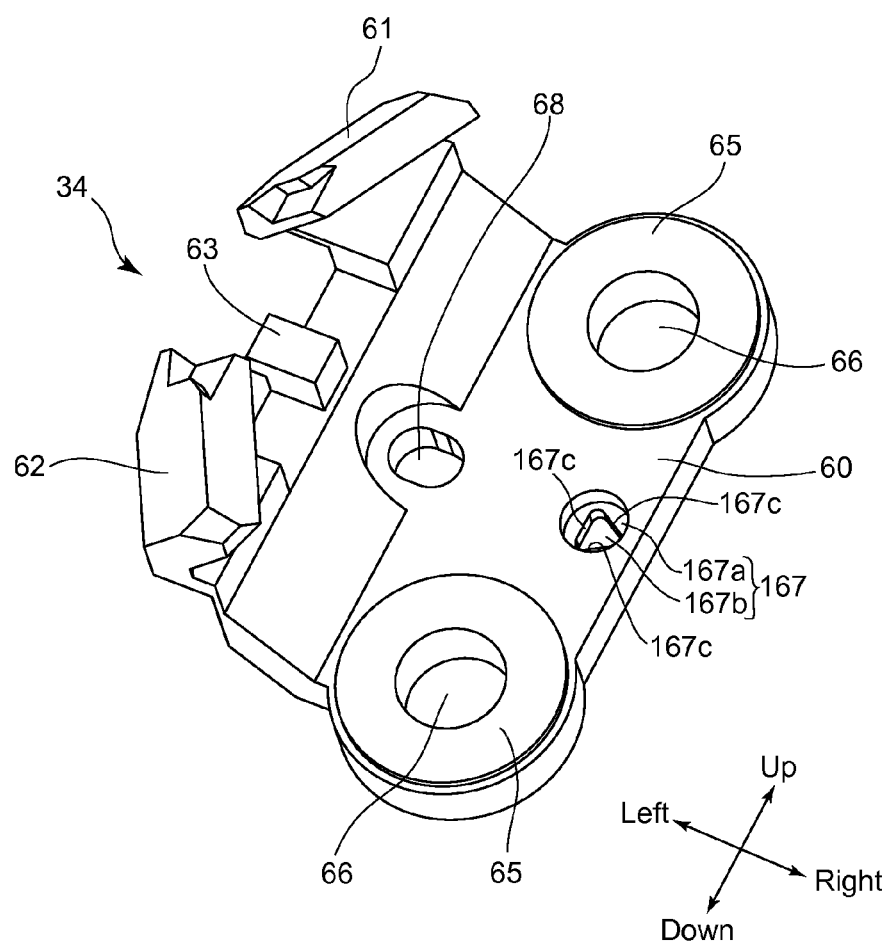
FIG. 22 is a perspective view of a sensor holder which constitutes an element of a second embodiment of the imaging unit.
Figure 23:
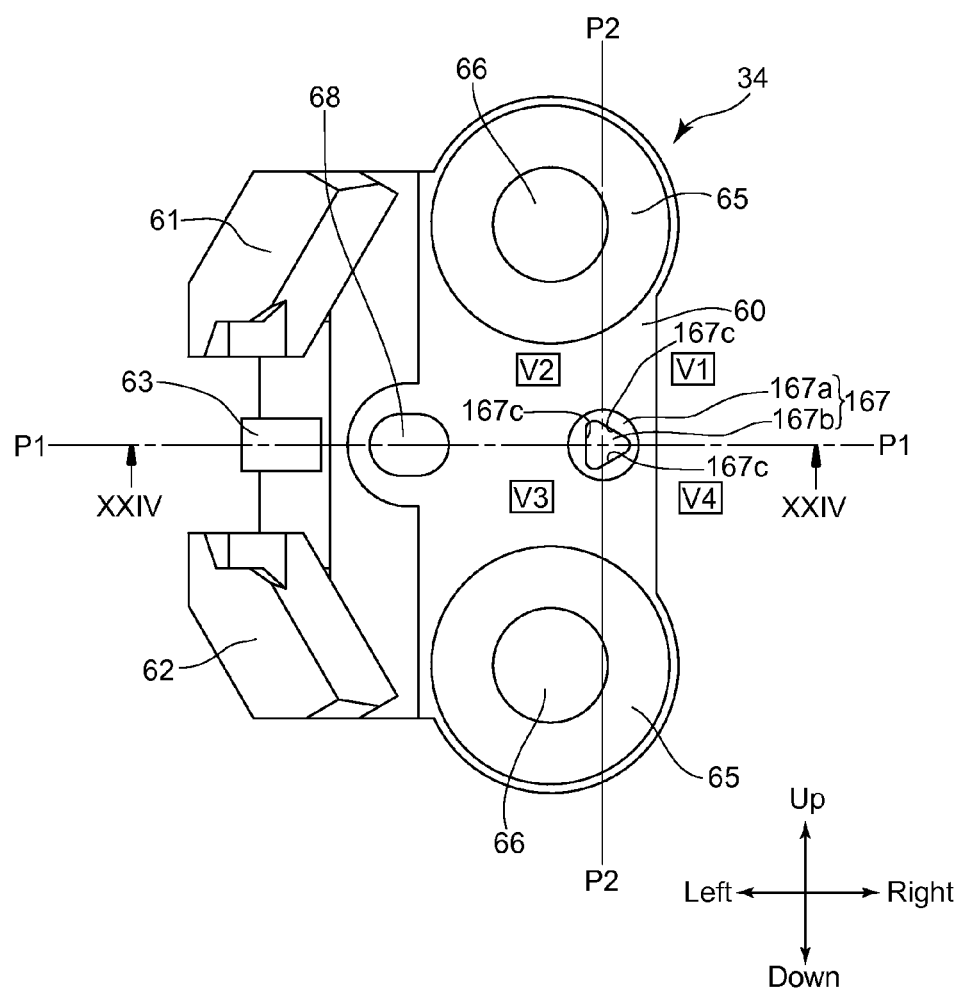
FIG. 23 is a front elevational view of the sensor holder shown in FIG. 22, viewed from the object side.
Figure 24:
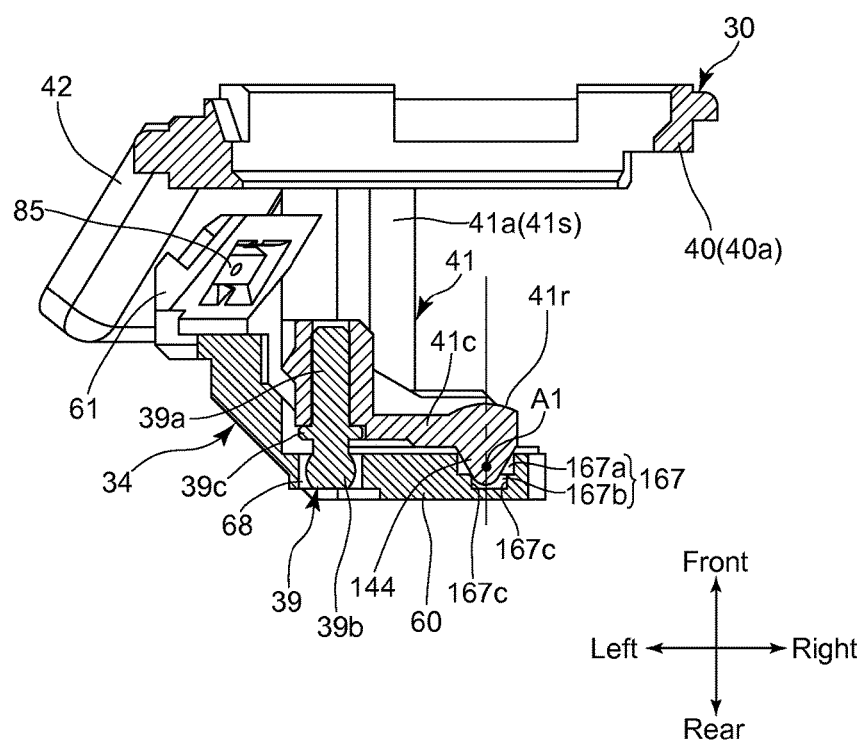
FIG. 24 is a sectional view of the sensor holder and the first lens frame, taken along the line XXIV-XXIV shown in FIG. 23.

In the second embodiment shown in FIGS. 22 through 24, a pivot recess (contacting portion/spherical-swinging support portion) 167, which is different in shape from the pivot recess 67 in the first embodiment of the imaging unit 10, is formed in the base plate portion 60 of the sensor holder 34. The pivot recess 167 is provided therein with a circular opening 167a and is provided in the base of the opening 167a (in the rearward direction of the imaging unit 10) with a triangular recess 167b which has three movement limit sides (inner side walls) 167c. The corners formed by the three movement limit sides 167c are each formed into a smooth rounded corner. When the triangular recess 167b is viewed from front along the first optical axis O1 as shown in FIG. 23, the three movement limit sides 167c are formed to substantially form three sides of a regular triangle, and the inner center of this triangle is positioned on an extension of the first optical axis O1.

In the second embodiment shown in FIGS. 22 through 24, a pivot projection (projecting portion) 144 which is formed on the first lens frame 30 has a shape corresponding to the shape of the pivot projection 44 of the first embodiment of the imaging unit 10, and the outer periphery of the pivot projection 144 comes into contact with the boundary between the bottom surface of the opening 167a and the three movement limit sides 167c to thereby be supported at three points when the pivot projection 144 is inserted into the pivot recess 167. This support structure makes it possible for the first lens frame 30 to perform the spherical swinging operation about the spherical-swinging center A1 that is positioned on an extension of the first optical axis O1.

Figure 25:
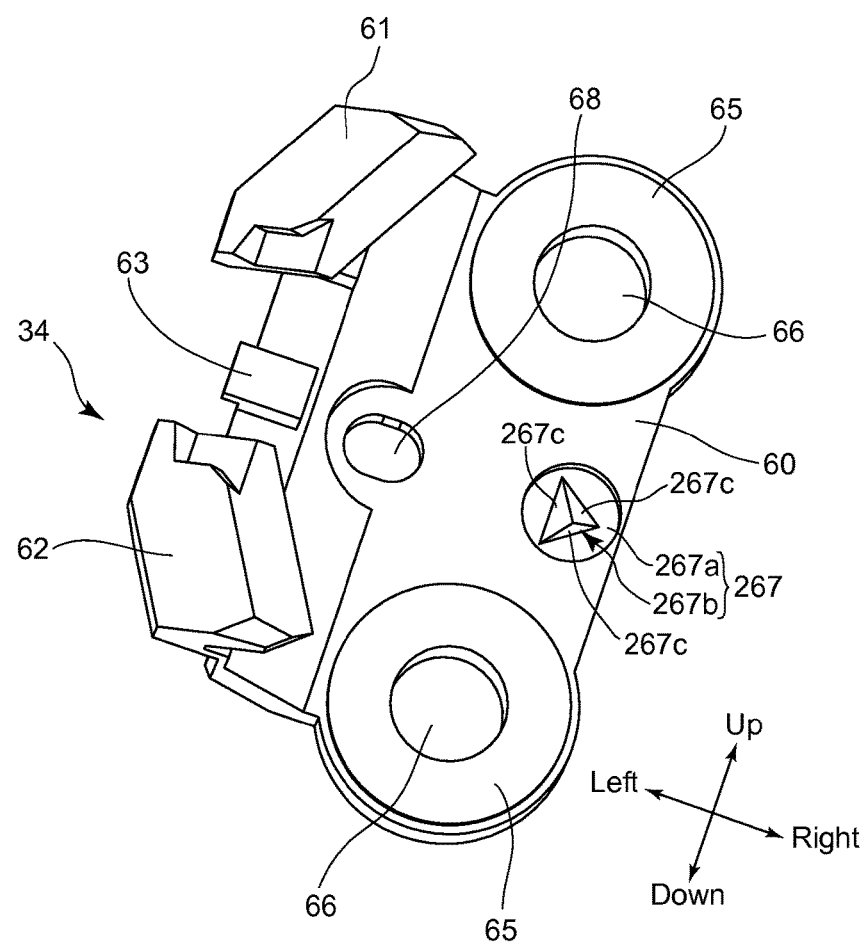
FIG. 25 is a perspective view of a sensor holder which constitutes an element of a third embodiment of the imaging unit.
Figure 26:
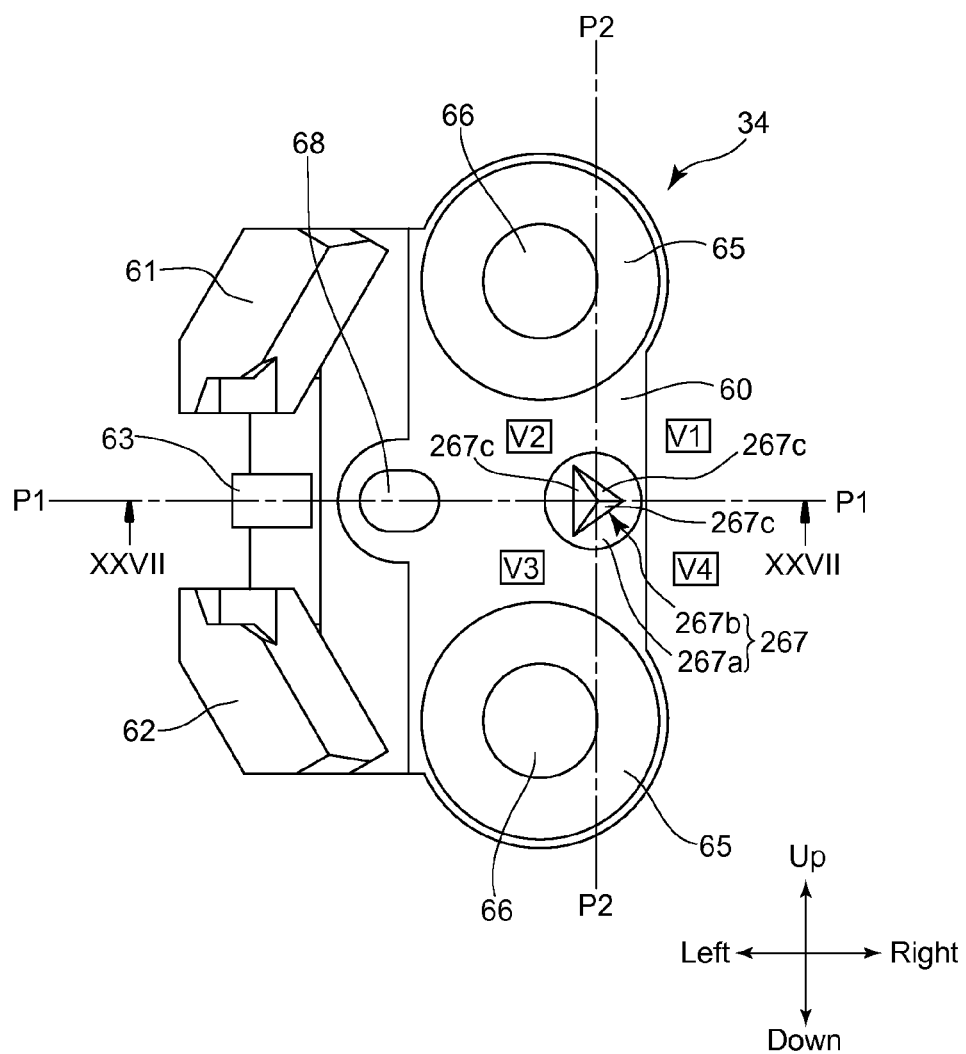
FIG. 26 is a front elevational view of the sensor holder shown in FIG. 25, viewed from the object side.
Figure 27:
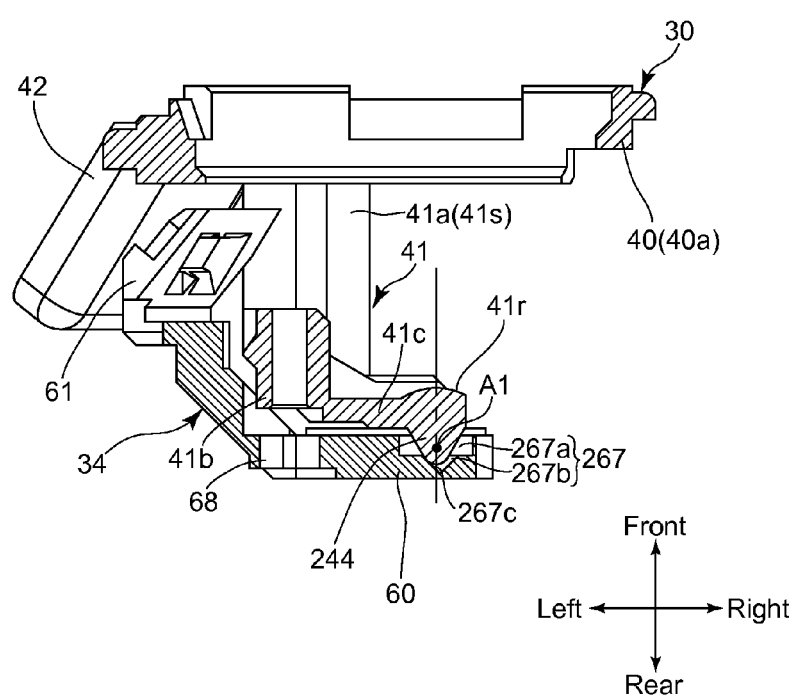
FIG. 27 is a sectional view of the sensor holder and the first lens frame, taken along the line XXVII-XXVII shown in FIG. 26.

In the third embodiment shown in FIGS. 25 through 27, a pivot recess (contacting portion/spherical-swinging support portion) 267 which is different in shape from either of the pivot recesses 67 and 167 is formed in the base plate portion 60 of the sensor holder 34. The pivot recess 267 is provided therein with a circular opening 267a and is provided in the base of the opening 267a (in the rearward direction of the imaging unit 10) with a triangular (three-sided) pyramid-shaped recess 267b which has three movement limit sides (inner side walls) 267c. When the triangular pyramid-shaped recess 267b is viewed from front along the first optical axis O1 as shown in FIG. 26, the center of the inscribed sphere which touches each of the three movement limit sides 267c is positioned on an extension of the first optical axis O1.

In the third embodiment shown in FIGS. 25 through 27, a pivot projection (projecting portion) 244 which is formed on the first lens frame 30 has the same shape as each of the pivot projections 44 and 144, and the outer periphery of the pivot projection 244 comes into contact with the three movement limit sides 267c, respectively, to thereby be supported at three points when the pivot projection 244 is inserted into the pivot recess 267. This support structure makes it possible for the first lens frame 30 to perform the spherical swinging operation about the spherical-swinging center A1 that is positioned on an extension of the first optical axis O1.

Figure 28:
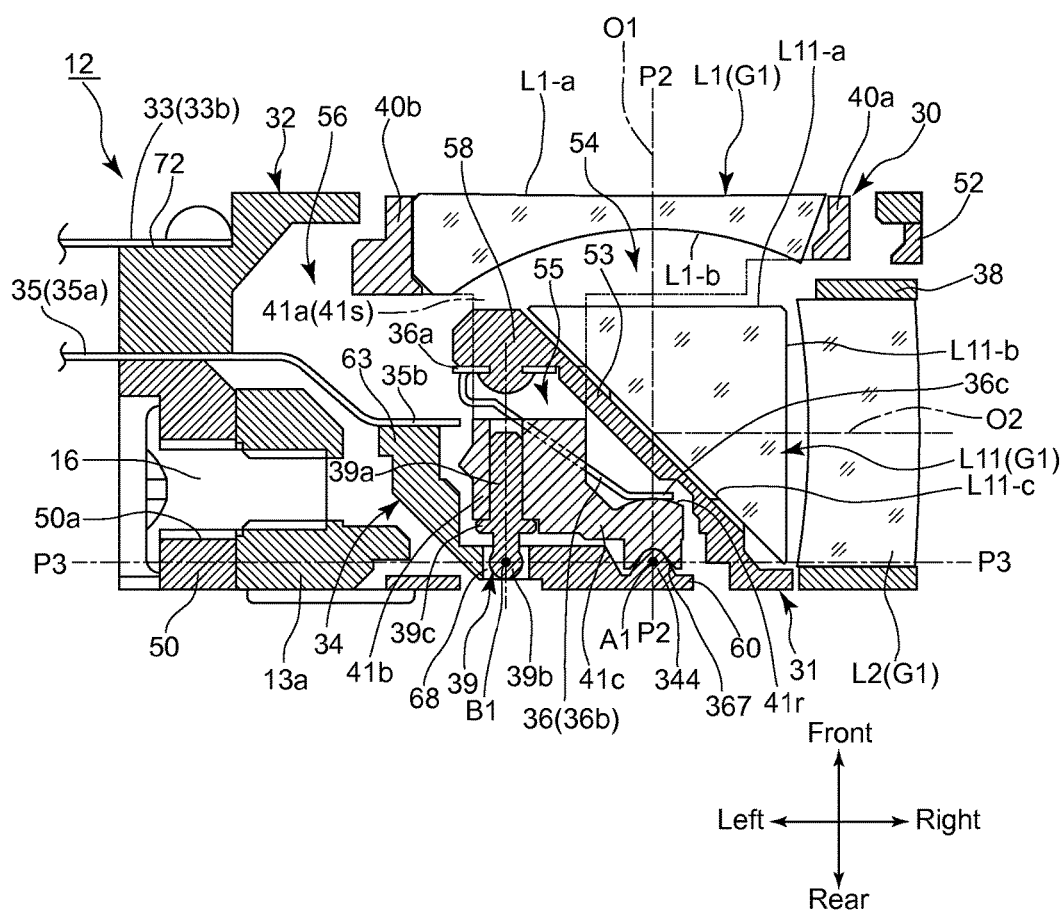
FIG. 28 is a sectional view of the first lens-group unit of the imaging unit, according to a fourth embodiment, taken along a plane including the first optical axis and the second optical axis.

In the fourth embodiment shown in FIG. 28, the members on which a pivot recess and a pivot projection (which correspond to the pivot recess 67, 167 or 267 and the pivot projection 44, 144 or 244, respectively) are formed are reversed compared with the first through third embodiments; specifically, a pivot projection (projecting portion/spherical-swinging support portion) 344 is formed on the base plate portion 60 of the sensor holder 34, and a pivot recess (contacting portion/supported portion) 367 is formed on the pivot arm 41c of the first lens frame 30. The pivot projection 344 and the pivot recess 367 are identical in shape to the pivot projection 44 and the pivot recess 67 of the first embodiment of the imaging unit 10, and the first lens frame 30 can be made to perform the spherical swinging operation about the spherical-swinging center A1, which is positioned on an extension of the first optical axis O1, with the pivot projection 344 fitted into the pivot recess 367.

Figure 29:
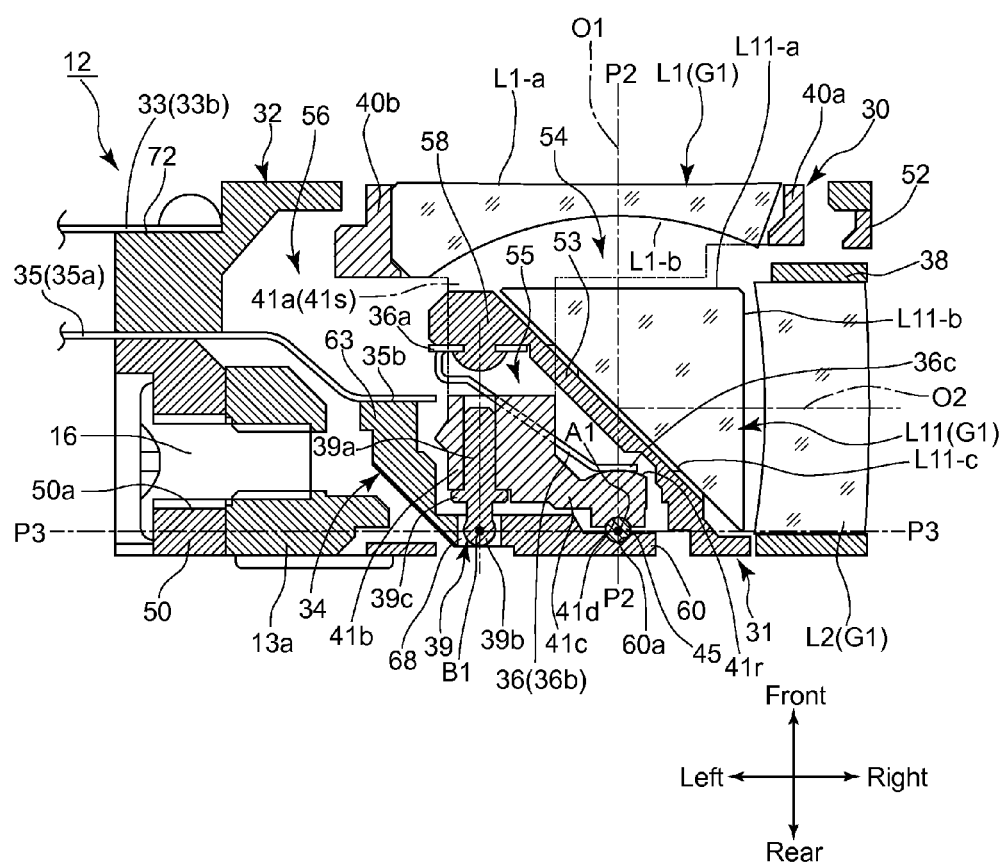
FIG. 29 is a sectional view of the first lens-group unit of the imaging unit, according to a fifth embodiment, taken along a plane including the first optical axis and the second optical axis.

In the fifth embodiment of the support mechanism shown in FIG. 29, a pivot recess (supported portion) 41d and a pivot recess (spherical-swinging support portion) 60a, the inner surfaces of which face each other, are formed on the pivot arm 41c of the first lens frame 30 and the base plate portion 60 of the sensor holder 34, respectively, and a spherical support ball (spherical-swinging support portion) 45 is sandwiched between the pivot recesses 41d and 60a and is rotatable therebetween. The center of the support ball 45 is coincident with the spherical-swinging center A1, and the first lens frame 30 can be made to perform the spherical swinging operation about the spherical-swinging center A1 by making the inner surfaces of the pivot recesses 41d and 60a come into sliding contact with the periphery of the support ball 45.

Figure 30:
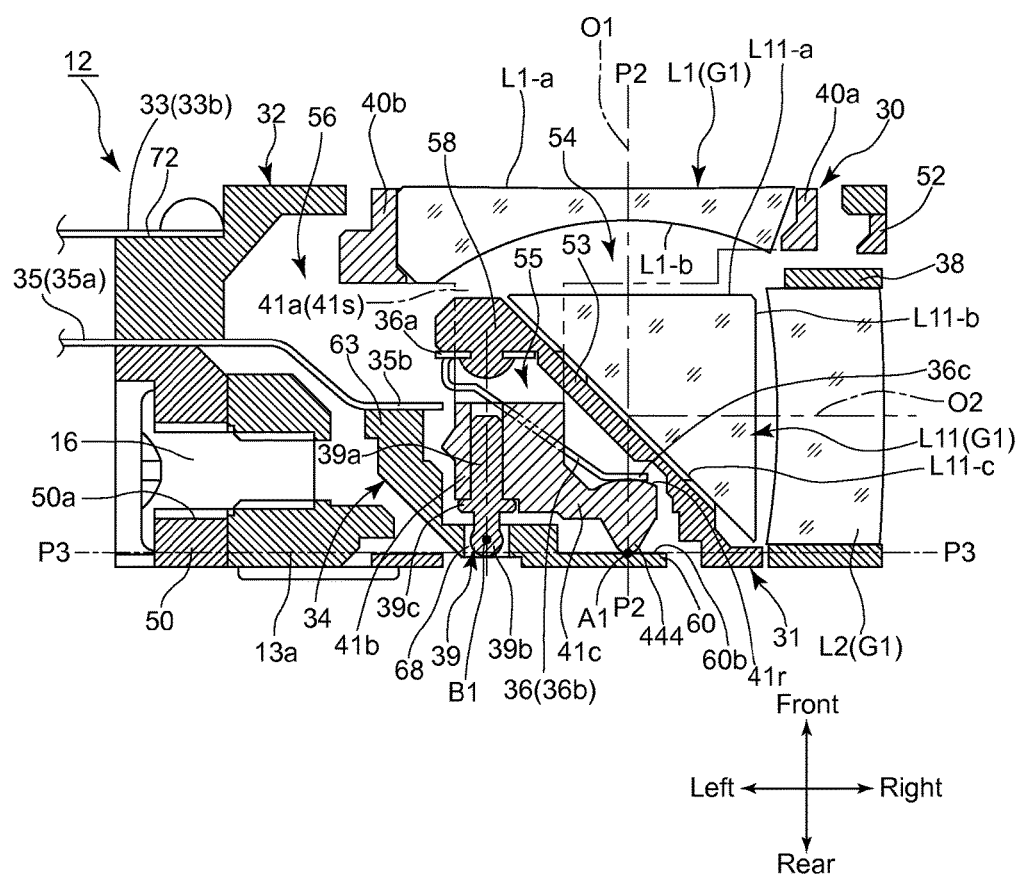
FIG. 30 is a sectional view of the first lens-group unit of the imaging unit, according to a sixth embodiment, taken along a plane including the first optical axis and the second optical axis.

In the sixth embodiment of the support mechanism shown in FIG. 30, the end (rear end) of a pivot projection (projecting portion/supported portion) 444 which is formed to project from the first lens frame 30 is made to contact a planar abutting surface (contacting portion/spherical-swinging support portion) 60b of the base plate portion 60 of the sensor holder 34, which is the front surface of the base plate portion 60. The abutting surface 60b is a plane parallel to the third reference plane P3, and the rear end of the pivot projection 444 is formed into a hemisphere. The pivot projection 444 which is pressed against the abutting surface 60b by the spring load of the leaf spring 36 operates (moves obliquely) while rolling, without sliding, on the abutting surface 60b along the hemispherical shape of the pivot projection 444. According to this structure, in the case where the swing angle is very small, the first lens frame 30 can be made to perform the spherical swinging operation with the position of the contact point between the pivot projection 444 and the abutting surface 60b when the first lens frame 30 is the image-stabilizing initial state being approximately regarded as the spherical-swinging center A1.

Figure 31:
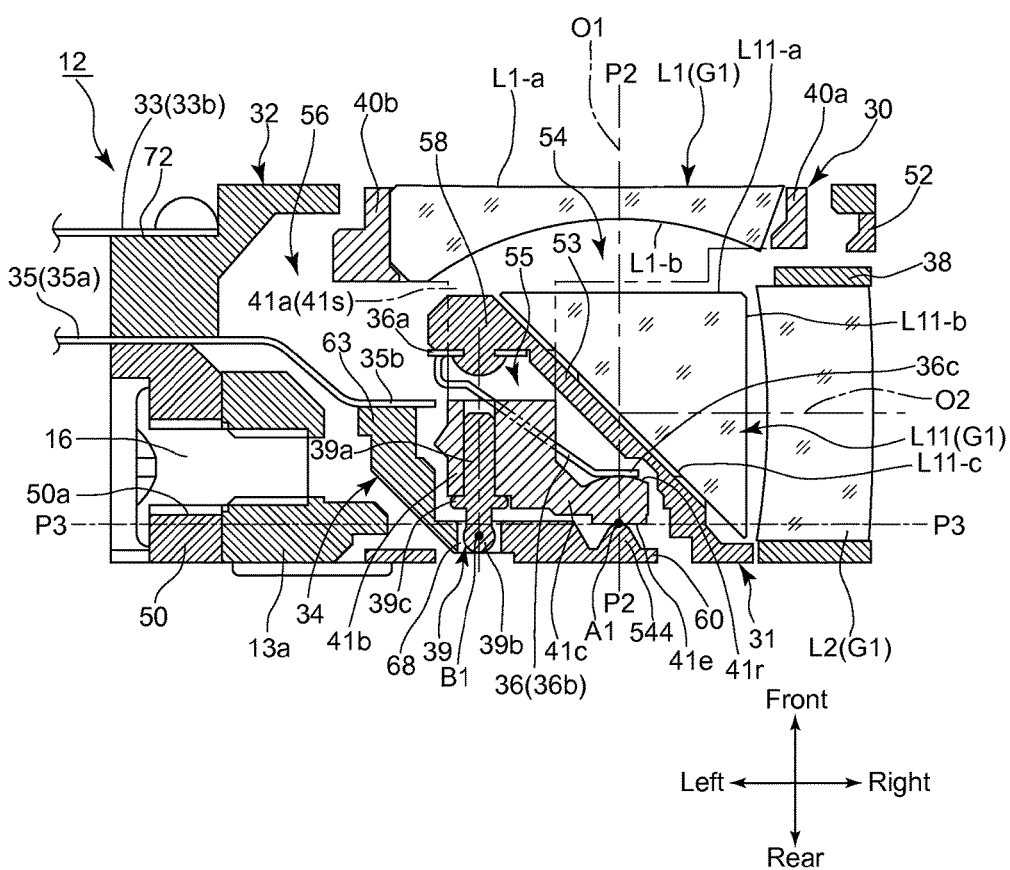
FIG. 31 is a sectional view of the first lens-group unit of the imaging unit, according to a seventh embodiment, taken along a plane including the first optical axis and the second optical axis.
Figure 32:
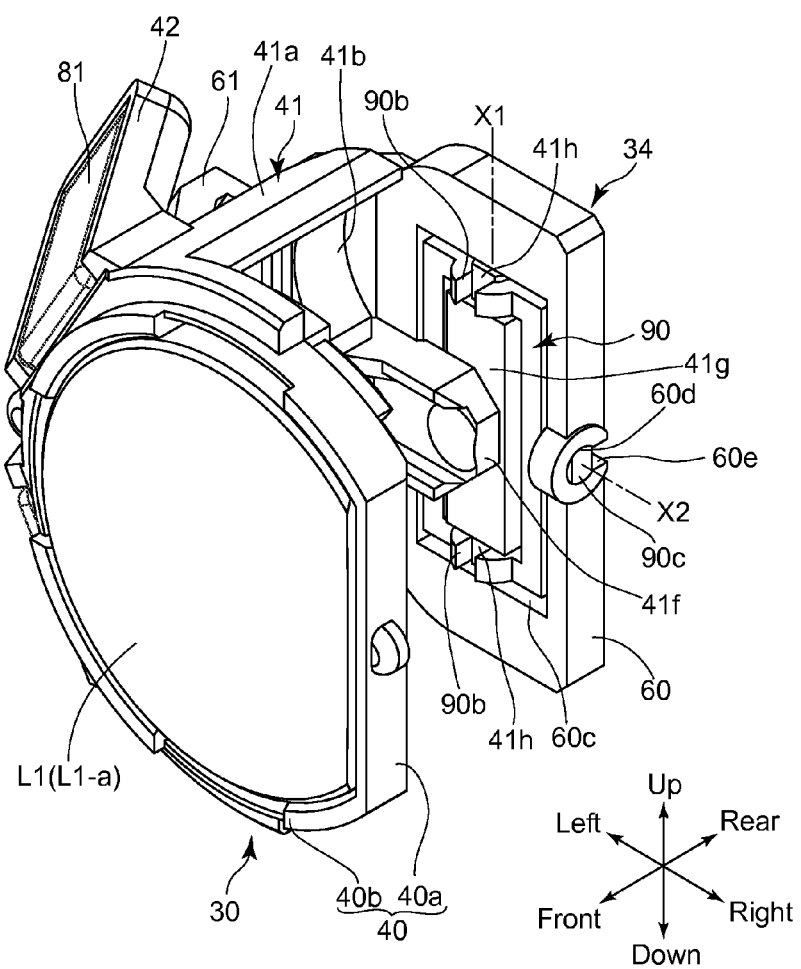
FIG. 32 is a front perspective view of the support mechanism for the first lens element of the imaging unit, according to an eighth embodiment.
Figure 33:
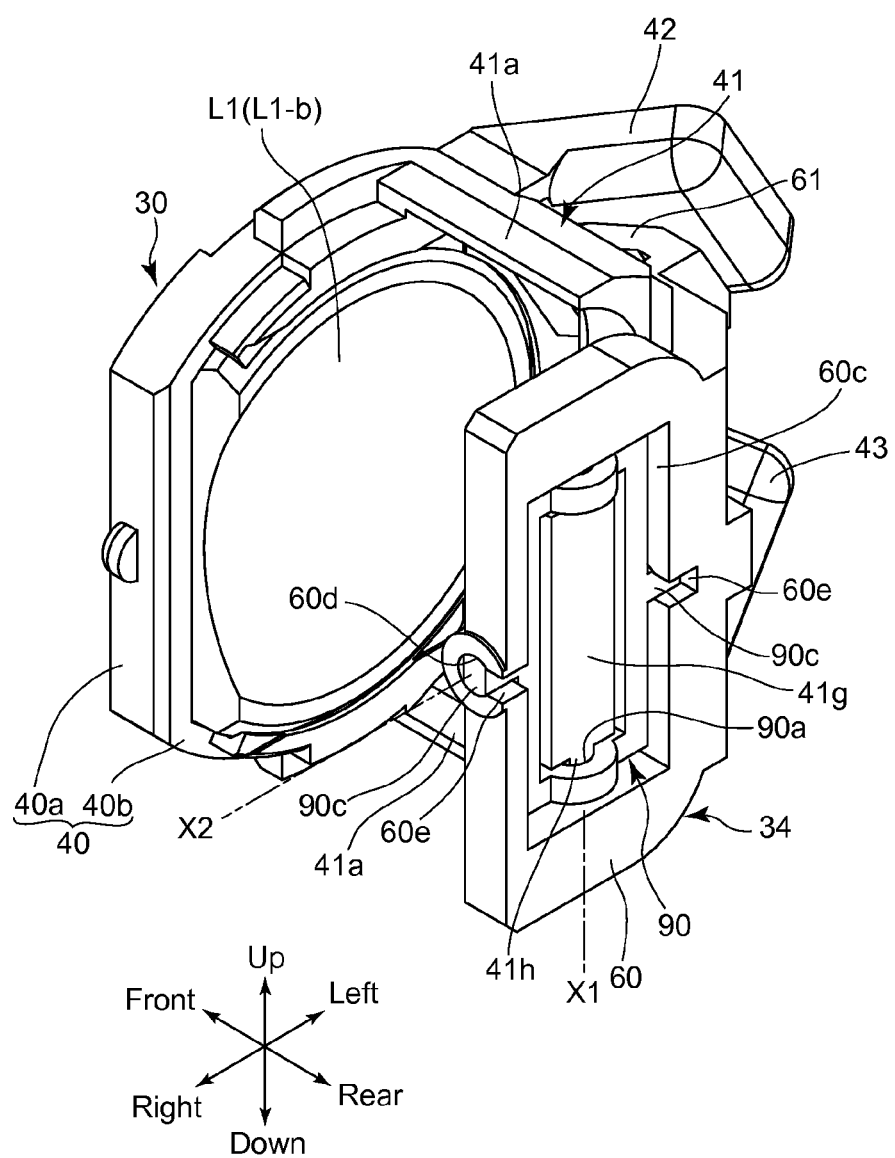
FIG. 33 is a rear perspective view of the support mechanism shown in FIG. 32.

In the seventh embodiment shown in FIG. 31, the end (front end) of a pivot projection (projecting portion/spherical-swinging support portion) 544 which is formed to project from the base plate portion 60 of the sensor holder 34 is made to contact a planar abutting surface (contacting portion/supported portion) 41e, which is formed on the pivot arm (pivoted arm) 41c of the first lens frame 30 to face rearward. The abutting surface 41e is a plane parallel to the third reference plane P3, and the front end of the pivot projection 544 is formed into a hemisphere. The abutting surface 41e which is pressed against the pivot projection 544 by the spring load of the leaf spring 36 operates (moves obliquely) while rolling, without sliding, on the pivot projection 544 along the hemispherical shape of the pivot projection 544. According to this structure, in the case where the swing angle is very small, the first lens frame 30 can be made to perform the spherical swinging operation with the position of the contact point between the abutting surface 41e and the pivot projection 544 when the first lens frame 30 is the image-stabilizing initial state being approximately taken as the spherical-swinging center A1.

In the above illustrated first through fifth embodiments of the support mechanism for the first lens frame 30, the concave-convex fitting structure is used at the pivoted portion between the first lens frame 30 and the sensor holder 34, and slips occur at the concave-convex contact point when the first lens frame 30 is made to operate the spherical swinging operation; however, each of the first through fifth embodiments of the support mechanism for the first lens frame 30 is designed so that the position of the spherical-swinging center A1, which is a spherical-swinging center, predetermined at the design stage, does not vary. Conversely, in the sixth and seventh embodiments shown in FIGS. 30 and 31, the end of a projection formed on one of the first lens frame 30 and the sensor holder 34 is made to abut against an abutting surface formed on the other, and the first lens frame 30 is made to perform the spherical swinging operation with the contact point therebetween being approximately taken as the spherical-swinging center A1.

Figure 34:
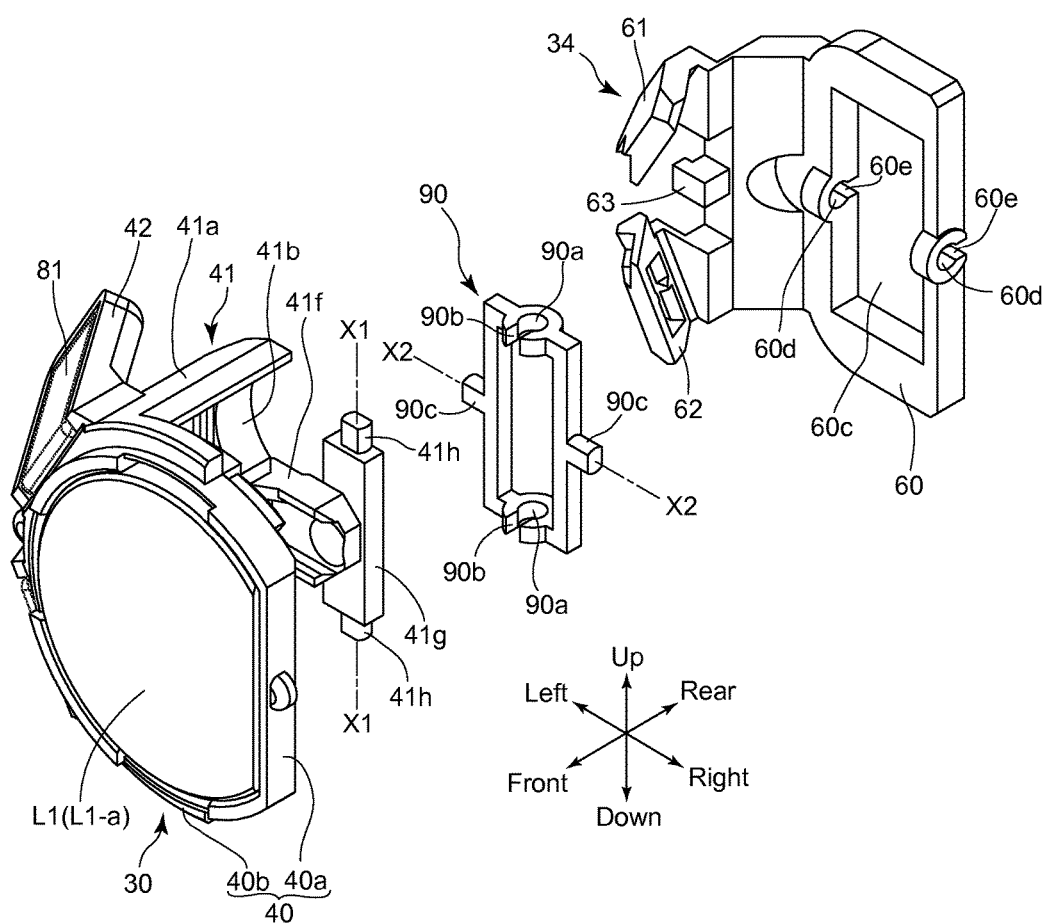
FIG. 34 is a front exploded perspective view of the support mechanism shown in FIG. 32.
Figure 35:
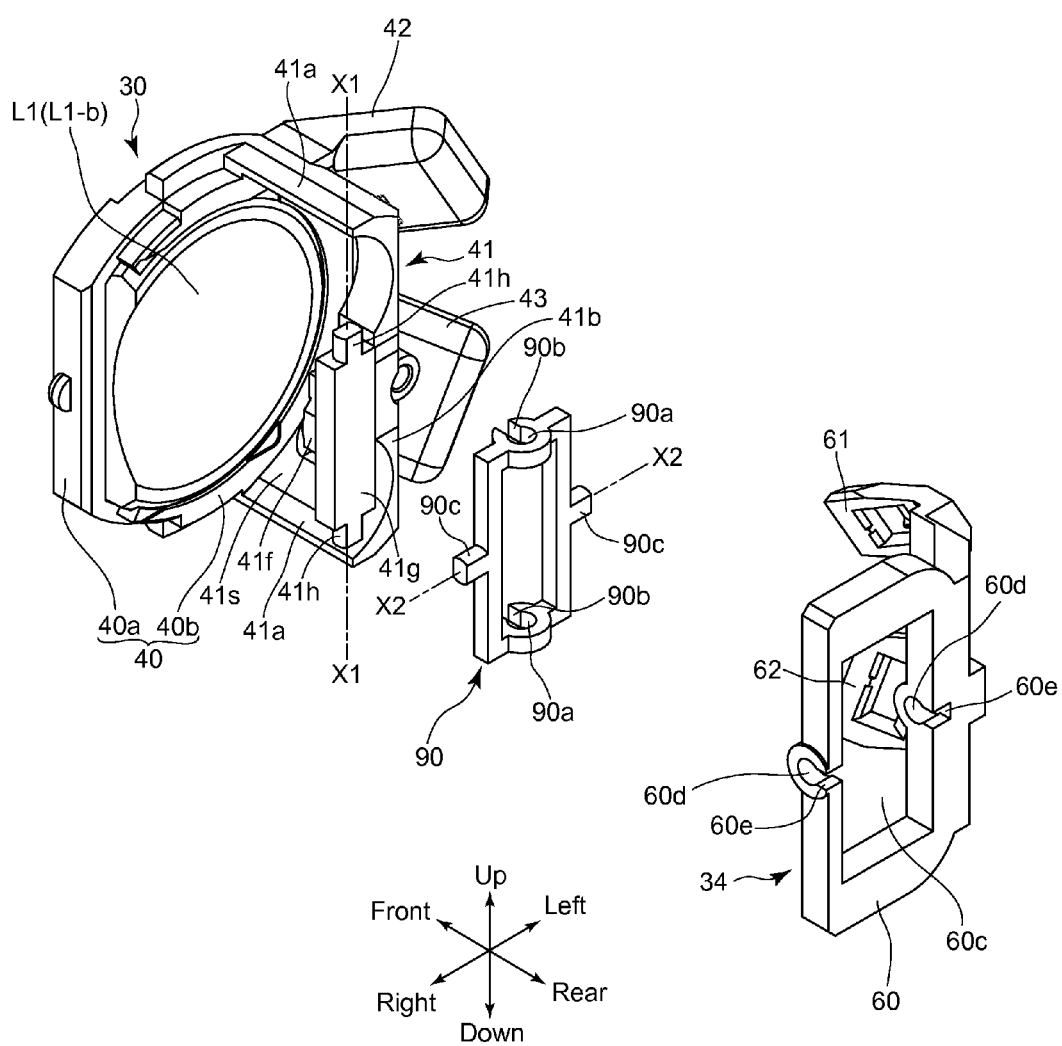
FIG. 35 is a rear exploded perspective view of the support mechanism shown in FIG. 32.
Figure 36:
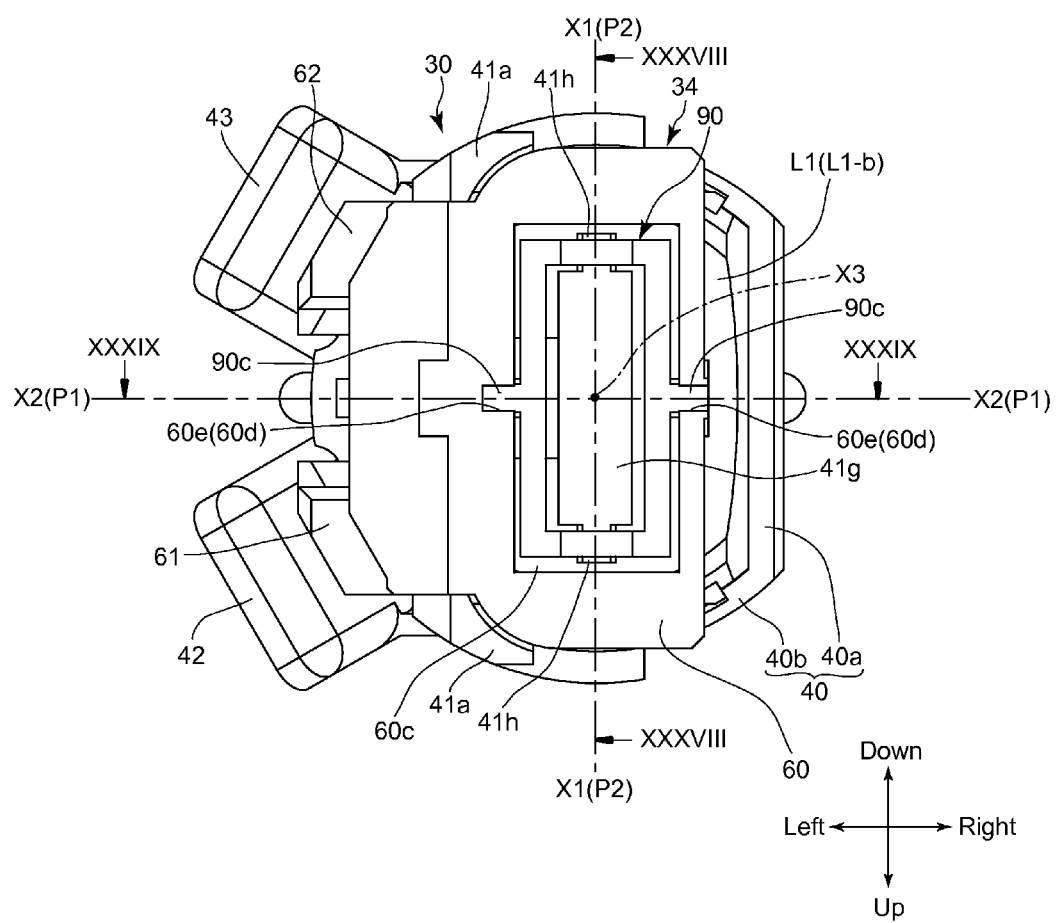
FIG. 36 is a rear elevational view of the support mechanism shown in FIG. 32, viewed from the opposite side from the object side.
Figure 37:
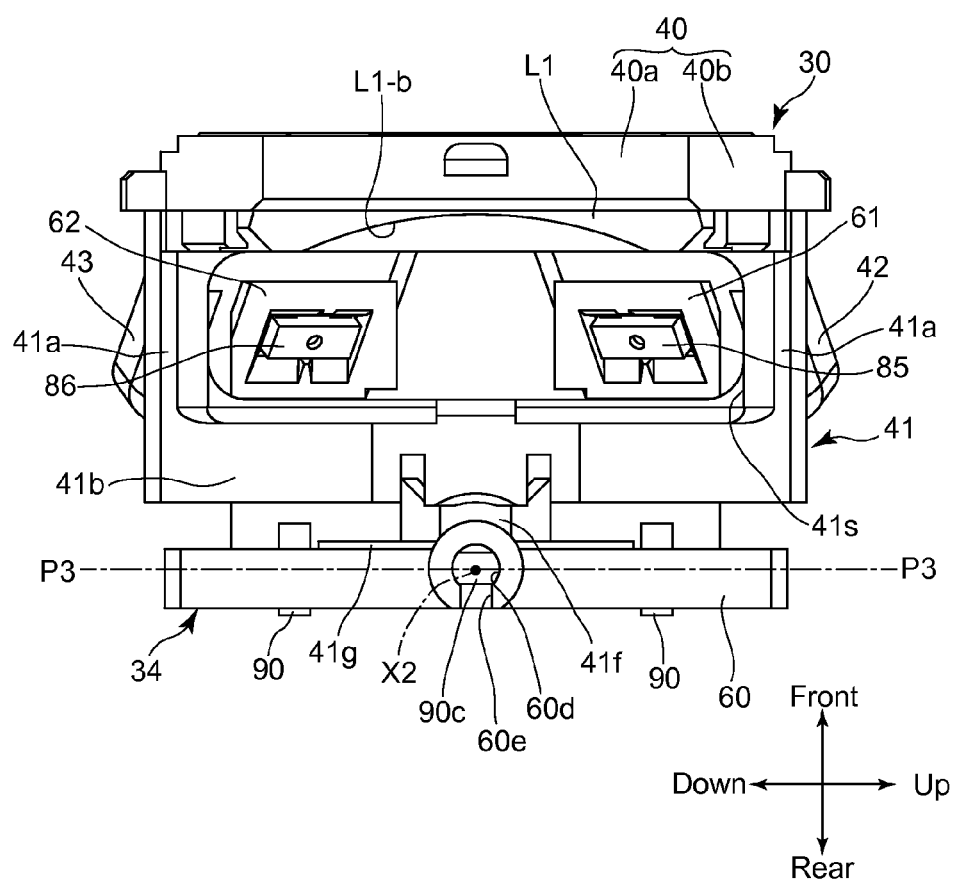
FIG. 37 is a side elevational view of the support mechanism shown in FIG. 32, viewed from the side on which the second optical axis extends.
Figure 38:
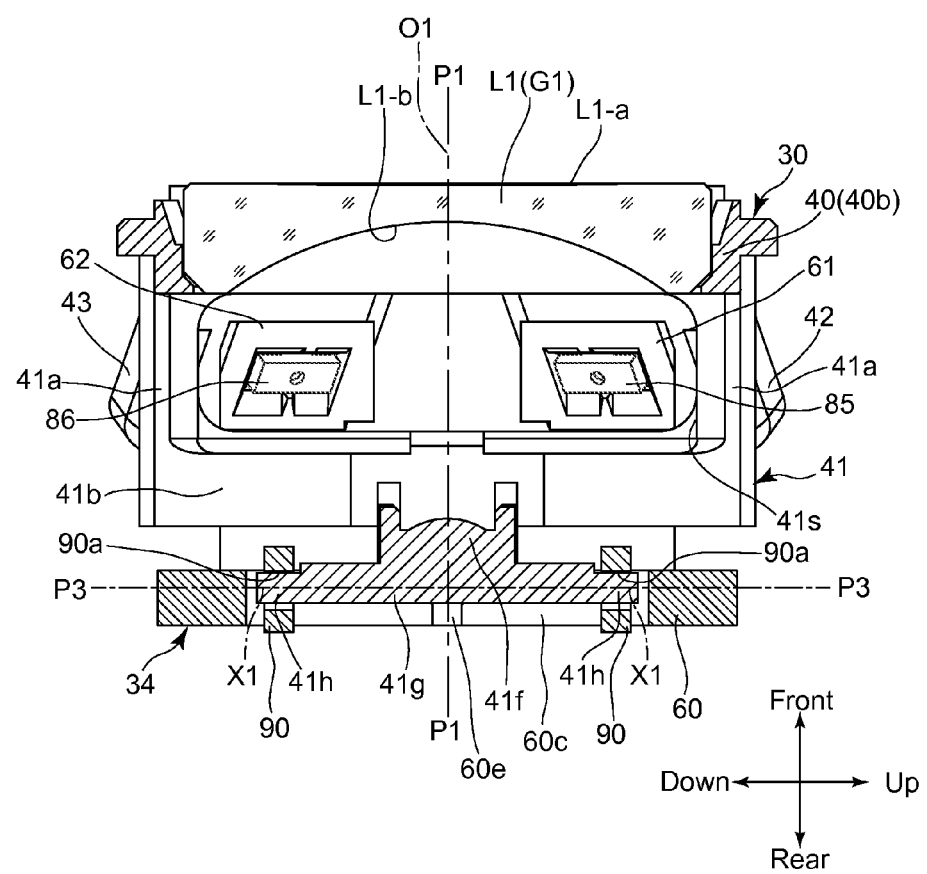
FIG. 38 is a sectional view of the support mechanism shown in FIG. 32, taken along the line XXXVIII-XXXVIII shown in FIG. 36.
Figure 39:
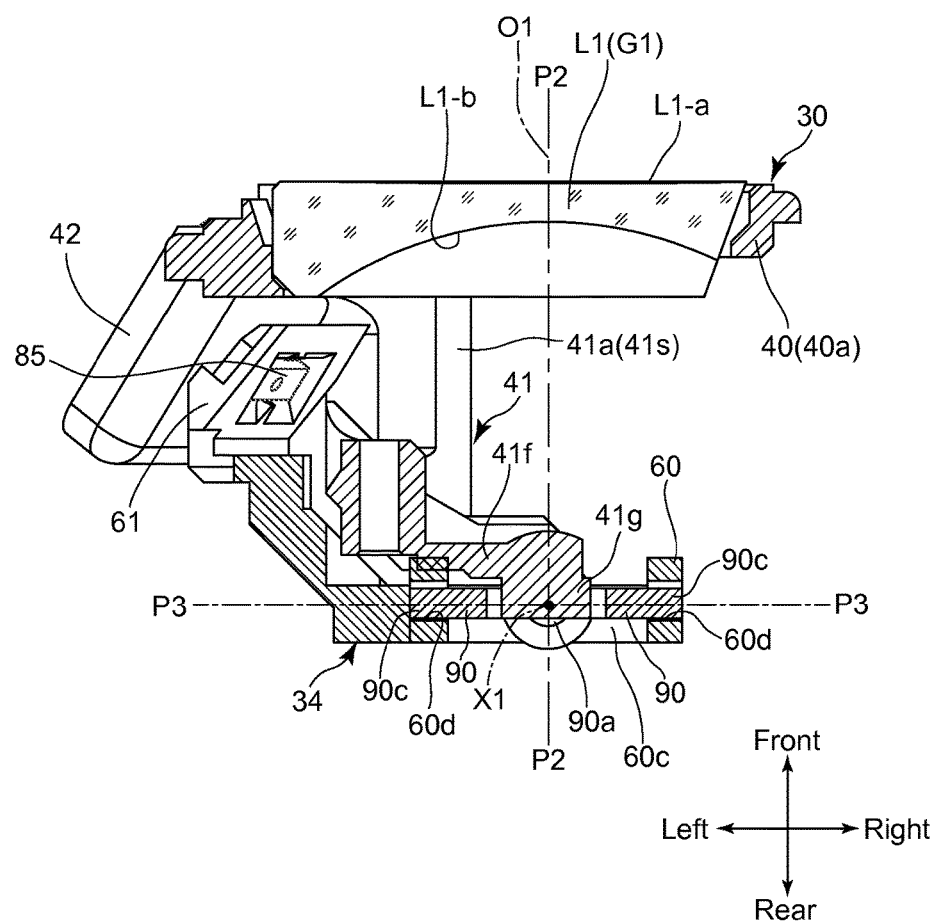
FIG. 39 is a sectional view of the support mechanism shown in FIG. 32, taken along the line XXXIX-XXXIX shown in FIG. 36.

In the eighth embodiment shown in FIGS. 32 through 39, an intermediate member 90 is interposed between the first lens frame 30 and the sensor holder 34. As shown in FIGS. 34 and 35, the first lens frame 30 is provided with a pivotally supporting portion 41g at the end of a support arm 41f, which constitutes part of the support portion 41 of the first lens frame 30. The support arm 41f projects from approximately a central position of the connecting portion 41b (which connects the pair of leg portions 41a), with respect to the elongated direction thereof (upward/downward direction), in a direction to approach the second reference plane P2 (first optical axis O1). The pivotally supporting portion 41g is narrow and elongated in the upward/downward direction and is provided with a pair of pivot projections 41h which project from opposite ends thereof in the upward/downward direction; the pair of pivot projections are aligned in the upward/downward direction while sharing a common axis (first axis) X1. Each pivot projection 41h is shaped such that radially opposite ends of a cylindrical column, having the axis X1 as a shaft center thereof, have cut-off parallel flat sides, respectively.

The intermediate member 90 is shaped into a substantially rectangular frame which surrounds the pivotally supporting portion 41g and is provided, on the short sides of the intermediate member 90 at the opposite ends thereof with respect to the upward/downward direction, with a pair of pivot holes 90a, respectively, which support the pair of pivot projections 41h in a manner to allow the pair of pivot projections 41h to rotate about the axis X1. Each short side of the intermediate member 90 includes a C-shaped cross sectional portion, through which the pivot hole 90a is formed, and is provided with a slit (gap) 90b (via which the associated pivot hole 90a is exposed radially outwards to be communicatively connected therewith) to allow the pair of pivot projections 41h to be fitted into and disengaged from the pair of pivot holes 90a through the slits 90b. In addition, the intermediate member 90 is provided with a pair of pivot projections 90c which project in the opposite directions from a pair of long sides of the intermediate member 90, respectively. Each pivot projection 90c is shaped such that radially opposite ends of a cylindrical column, having an axis (second axis) X2 as a shaft center thereof, have cut-off parallel flat sides, respectively.

The sensor holder 34 is provided on the base plate portion 60 with a housed portion 60c, in which the intermediate member 90 is housed. The base member 60 is provided with a pair of pivot holes 60d which support the pair of pivot projections 90C in a manner to allow the pair of pivot projections 90c to rotate about the axis X2. The pair of pivot holes 60d are communicatively connected with the housed portion 60c. The base plate portion 60 includes C-shaped cross-sectional portions, through which the pair of pivot holes 60d are formed, and are each provided with a slit (gap) 60e (via which the associated pivot hole 60d is exposed radially outwards to be communicatively connected therewith) to allow the pair of pivot projections 90c to be fitted into and disengaged from the pair of pivot holes 60d through the slits 60e.

FIGS. 32, 33 and 36 through 39 show a state where the pair of pivot projections 41h are pivotally supported by the pair of pivot holes 90a and the pair of pivot projections 90c are pivotally supported by the pair of pivot holes 60d; each of these drawings shows a state where first lens element L1 is in the image-stabilizing initial state. In this pivotally supported state (the image-stabilizing initial state), the axis X1 of the pair of pivot projections 41h extends in the upward/downward direction of the imaging unit 10, the axis X2 of the pair of pivot projections 90c extend in the leftward/rightward direction of the imaging unit 10, and the axes X1 and X2 are orthogonal to each other and lie in the third reference plane P3. A point of intersection X3 (see FIG. 36) between the axes X1 and X2 is positioned on an extension of the first optical axis O1. The intermediate member 90 and the first lens frame 30 can swing about the axis X2 due to the engagement between the pair of pivot holes 60d and the pair of pivot projections 90c. Additionally, the first lens frame 30 can swing relative to the intermediate member 90 about the axis X1 due to the engagement between the pair of pivot holes 90a and the pair of pivot projections 41h. A combination of these swing movements about the axes X1 and X2 makes it possible for the first lens frame 30 to perform the spherical swinging operation about the point of intersection X3 between the axes X1 and X2. Each slit 90b and 60e is provided for assembly purposes, and is formed to have a predetermined width at a predetermined position so as not to allow each pivot projection 41h and 90c to be disengaged from the associated slit 90b and 60e when the first lens frame 30 performs the spherical swinging operation during an image-stabilizing operation or when in the image-stabilizing initial state.

In the eighth embodiment of the support mechanism shown in FIGS. 32 through 39, a rotation limiter such as the pivot guide 39 or the rotation prevention hole 68 of each of the above illustrated embodiments is not required because the first lens frame 30 is prevented from rotating about the first optical axis O1 by the pivoted portions (the pair of pivot holes 90a and the pair of pivot projections 90c) of the intermediate member 90.

Although the present invention has been described based on the above illustrated embodiments, the present invention is not limited solely thereto; various modifications to the above illustrated embodiment are possible without departing from the scope of the invention. For instance, although the imaging optical system of the above described imaging apparatus uses a prism as a reflector element which bends an optical path, the prism can be replaced by a mirror, or the like, as a reflector element. Additionally, the present invention can also be applied to a type of imaging apparatus which has an L-shaped optical path without including a reflector element corresponding to the second prism L12 in the imaging optical system. Alternatively, the present invention can be applied to an imaging apparatus which contains a bending optical system including one or more additional reflector elements in addition to the first prism L11 and the second prism L12. In any case, the bending angle (reflecting angle) of an optical axis by a reflector element of the bending optical system can be any angle other than 90 degrees.

As described above, various modification can be made to the front lens element (the first lens element L1) that is positioned on the object side of the reflector element (which corresponds to the first prism L11 in the above illustrated embodiments) to perform an image-stabilizing operation. For instance, a plurality of front lens elements can be provided instead of a single lens element.

The first lens element L1 in the above illustrated embodiments has a D-cut shape that is formed with a portion of the outer edge of the first lens element L1 cut out, which contributes to miniaturization of the first lens-group unit 12 in a direction along the second optical axis O2. However, the front elevational shape of the front lens element in the present invention is not limited to that of a D-cut lens element; the present invention is also applicable to an imaging apparatus which includes a front lens element having a shape (e.g., circular shape) different in front elevational view from a D-cut lens.

In the above illustrated embodiments, a combination of the base member 31 and the sensor holder 34 is used as a support member which supports the first lens frame 30 in a manner to allow the first lens frame 30 to perform the spherical swinging operation. This structure makes it possible to achieve an excellent effect in assembling workability; however, a support member with which the base member 31 and the sensor holder 34 are integrally formed can also be used. Unlike the above illustrated embodiment of the imaging unit 10, it is possible for the housing 13 (which holds the imaging sensor 14, the second prism L12 and other members) and the base member 31 (which holds the first prism L11) to be integrally formed to serve as an integrated support member and for the first lens frame 30 to be supported by this integrated support member.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An imaging apparatus comprising:
a front lens group which constitutes part of an imaging optical system of said imaging apparatus and includes at least one front lens element and a reflector, in that order from an object side, wherein said reflector includes a reflection surface which reflects light rays, exiting from said front lens element, toward a different direction, and wherein said imaging apparatus performs an image-stabilizing operation by driving said front lens element in response to vibrations applied to said imaging optical system in order to reduce image shake on said image plane;
at least one rear lens group which constitutes another part of said imaging optical system and is positioned closer to an image plane than said front lens group;
a movable frame which holds said front lens element;
a support member which supports at least said reflector and is immovable relative to an optical axis of said front lens element in a reference state in which said imaging apparatus does not drive said front lens element when said image-stabilizing operation is not performed; and
a support mechanism which supports said movable frame in a manner to allow said movable frame to spherically swing along an imaginary spherical surface about a spherical-swinging center which is positioned on an extension of said optical axis, of said front lens element, extending behind an underside of said reflection surface of said reflector.

2. The imaging apparatus according to claim 1, wherein a surface closest to the image side of said front lens element comprises a concave surface.

3. The imaging apparatus according to claim 1, wherein a surface closest to the object side of said front lens element is smaller in refractive power than that of a surface closest to the image side of said front lens element.

4. The imaging apparatus according to claim 1, wherein said imaging apparatus satisfies the following condition (1):

$$-0.6 < (SC-R2)/f1 < 0.4 \tag{1}$$

wherein R2 designates a radius of curvature a surface closest to the image side of said front lens element,
SC designates a distance along said optical axis from said surface closest to the image side of said front lens element to said spherical-swinging center, and
f1 designates a focal length of said front lens element.

5. The imaging apparatus according to claim 4, wherein said imaging apparatus satisfies the following condition (2):

$$SF < -0.5, \tag{2}$$

wherein $SF=(R2+R1)/(R2-R1)$, and
R1 designates a radius of curvature of a surface closest to the object side of said front lens element.

6. The imaging apparatus according to claim 1, wherein said front lens element comprises a single lens element.

7. The imaging apparatus according to claim 1, further comprising:
an image sensor which receives said light rays that are passed through said imaging optical system; and a housing which is immovable relative to said optical axis of said front lens element in said reference state, wherein said image sensor is fixedly mounted to said housing.

8. The imaging apparatus according to claim 1, further comprising a second reflector provided at a position closer to the image side than said rear lens group, said second reflector including a reflection surface which reflects said light rays, which are passed through said rear lens group, toward a different direction.

9. The imaging apparatus according to claim 1, wherein said reflector comprises a prism.

10. The imaging apparatus according to claim 1, wherein said support mechanism makes a projecting portion, which is formed on one of said movable frame and said support member, abut against a contacting portion formed on the other of said movable frame and said support member, and wherein said support mechanism makes said movable frame spherically swing about said spherical-swinging center by obliquely moving said projecting portion relative to said contacting portion.

11. The imaging apparatus according to claim 10, wherein said contacting portion comprises a recess in which said projecting portion is engaged.

12. The imaging apparatus according to claim 10, wherein said contacting portion comprises a flat surface with which an end of said projecting portion is in contact.

13. The imaging apparatus according to claim 1, wherein said extension of said optical axis, of said front lens element, extends through part of said support mechanism.

14. The imaging apparatus according to claim 1, wherein said support mechanism comprises:
a pair of recessed portions, each having a hemispherical inner surface which are respectively formed on said movable frame and said support member to face each other; and
a spherical guide member which is installed between said pair of recessed portions,
wherein said support mechanism makes said movable frame spherically swing about said spherical-swinging center by said hemispherical inner surfaces of said pair of recessed portions being in sliding contact with said spherical guide member.

15. The imaging apparatus according to claim 1,
wherein said support mechanism comprises an intermediate member which supports said movable frame in a manner to allow said movable frame to swing about a first axis, and is supported to be allowed to swing relative to said support member about a second axis orthogonal to said first axis, and
wherein said support mechanism makes said movable frame spherically swing about said spherical-swinging center by making said movable frame and said intermediate member swing about said first axis and said second axis, respectively.

16. The imaging apparatus according to claim 1, wherein said support mechanism includes a spherical-swinging support portion provided on said support member, and a supported portion which is formed on said movable frame and abuts against said spherical-swinging support portion, wherein said movable frame includes a pressed surface which is formed as a spherical surface that is centered about said spherical-swinging center, said pressed surface positioned rearwardly from said underside of said reflection surface of said reflector with respect to a direction along said optical axis of said front lens element, and wherein said imaging apparatus includes a biaser which is supported by said support member and is provided with a pressing portion, which abuts against said pressed surface of said movable frame, said biaser applying a biasing force against said movable member to cause said supported portion to abut against said spherical-swinging support portion via said pressing portion and said pressed surface.

17. The imaging apparatus according to claim 16, wherein said pressed surface of said movable frame comprises a convex spherical surface facing toward the object side in a direction along said optical axis of said front lens element, wherein said biaser biases said movable frame by pressing said pressed surface in a direction that is opposite to the direction toward the object side along said optical axis of said front lens element.

18. The imaging apparatus according to claim 16, wherein said biaser comprises a mount which is mounted onto said support member at a position that is offset, from said optical axis of said front lens element, in a direction that is opposite to the light-ray traveling direction after light rays are reflected by said reflection surface of said reflector.

19. The imaging apparatus according to claim 16, wherein said biaser comprises a mount which is mounted onto said support member at a position that is offset, from a second optical axis along which light rays travel toward said rear lens group after being reflected by said reflection surface of said reflector, toward the object side in a direction along said optical axis of said front lens element.

20. The imaging apparatus according to claim 16, wherein said biaser comprises a leaf spring which is provided with a mount which is mounted onto said support member, and an elastically deformable portion, wherein said elastically deformable portion projects from said mount, to be elastically deformable relative thereto, said pressing portion being provided on a free end of said elastically deformable portion, and wherein said pressing portion abuts against said pressed surface of said movable frame by elastically deforming said elastically deformable portion.

21. The imaging apparatus according to claim 16,
wherein said pressed surface, of said movable frame, is formed on an end portion of a support portion, which is formed into a cantilever projecting from a lens holding portion, which holds said front lens element.

22. The imaging apparatus according to claim 1, wherein said movable frame is provided with a frame-shaped lens holding portion, which supports said front lens element, and a support portion which projects from said lens holding portion and is supported on said support member to spherically swing about said spherical-swinging center, wherein said support portion comprises:
a pair of first projecting portions which are provided at different positions in a circumferential direction centered about said optical axis of said front lens element, project from said lens holding portion toward a direction that is opposite to the direction toward the object side along said optical axis of said front lens element, and respectively pass along opposite sides of said reflector;
a connecting portion which connects common end portions of said pair of first projecting portions; and
a second projecting portion provided on said connecting portion, projects therefrom in a direction that intersects with a projecting direction of said pair of first projection portions, and is inserted at a position that is rearward from said underside of said reflection surface of said reflector to be supported by said support member, wherein said pair of first projection portions is provided at a position that is offset, from said optical axis of said front lens element, in a direction that is opposite to the light-ray traveling direction after light rays are reflected by said reflection surface of said reflector.

23. The imaging apparatus according to claim 22, wherein said second projecting portion projects in a direction that is orthogonal to said optical axis of said front lens element.

24. The imaging apparatus according to claim 22, further comprising an actuator which applies a driving force to said movable frame to spherically swing said movable frame about said spherical-swinging center in response to vibrations applied to said imaging optical system, wherein said movable frame includes a pair of actuator support portions which project from said lens holding portion at different positions, with respect to a circumferential direction centered about said optical axis of said front lens element, and respectively support actuator components of said actuator, and wherein said pair of first projection portions are provided at circumferential positions that are further apart than the circumferential positions of said pair of actuator support portions.

25. The imaging apparatus according to claim 22, wherein said reflector comprises a prism, said prism including, in addition to said reflection surface, an incident surface which faces toward said front lens element, an exit surface which faces toward said rear lens group, and a pair of side surfaces which connect said incident surface, said exit surface and said reflection surface, wherein said pair of first projection portions are respectively positioned on either side of said pair of side surfaces of said prism, and wherein part of said prism enters into an opening that is defined by said pair of first projection portions and said connecting portion.

* * * * *